(12) United States Patent
Quaid

(10) Patent No.: US 8,931,359 B2
(45) Date of Patent: Jan. 13, 2015

(54) PARALLELOGRAM BASED ACTUATING DEVICE

(71) Applicant: Vivero One Research, LLC, Hollywood, FL (US)

(72) Inventor: Arthur Quaid, Hollywood, FL (US)

(73) Assignee: Vivero One Research, LLC, Hollywood, FL (US)

( * ) Notice: Subject to any disclaimer, the term of this patent is extended or adjusted under 35 U.S.C. 154(b) by 94 days.

(21) Appl. No.: 13/795,266

(22) Filed: Mar. 12, 2013

(65) Prior Publication Data

US 2013/0192396 A1 Aug. 1, 2013

Related U.S. Application Data

(63) Continuation-in-part of application No. 13/236,245, filed on Sep. 19, 2011, now Pat. No. 8,464,603, and a continuation-in-part of application No. PCT/US2012/054724, filed on Sep. 12, 2012.

(51) Int. Cl.
*F16H 21/44* (2006.01)
*F16H 21/54* (2006.01)
(Continued)

(52) U.S. Cl.
CPC .............. *F16H 21/44* (2013.01); *B25J 9/1065* (2013.01)
USPC ............. 74/96; 74/490.03; 74/89.2; 74/89.18

(58) Field of Classification Search
USPC .............. 74/7, 11, 96, 89.11, 89.16–18, 89.2, 74/569, 490.01, 490.03, 490.05; 901/16, 901/21, 28; 200/341; 267/158, 182
See application file for complete search history.

(56) References Cited

U.S. PATENT DOCUMENTS 5,046,375 A * 9/1991 Salisbury et al. ............ 74/89.22
5,097,105 A    3/1992 Boin et al.
(Continued)

FOREIGN PATENT DOCUMENTS

EP    1870214    12/2007
EP    1878544    1/2008
(Continued)

OTHER PUBLICATIONS

Xu et al., Design of a New Decoupled XYZ Compliant Parallel Micropositioning Stage with Compact Structure, Proceedings of the 2009 IEEE International Conference on Robotics and Biomimetics, Dec. 19-23, 2009, Guilin, China, pp. 901-906.
(Continued)

*Primary Examiner* — Justin Krause
*Assistant Examiner* — Alexander Vu
(74) *Attorney, Agent, or Firm* — Bell & Manning, LLC

(57) ABSTRACT

An actuating device includes a first actuating device mounted to a second actuating device. Each of the first and second actuating devices includes a base link, a first link, a second link, a translating link, a shaft, and a drive. The base link includes a first joint, a second joint, and a base plate extending between them. The first link is mounted for rotation to the first joint, and the second link is mounted for rotation to the second joint. The translating link includes a third joint, a fourth joint, and a translating plate extending between them. The drive includes an arc surface and is mounted to the translating link such that, when operating the actuating device, a position of the arc surface is fixed relative to the translating plate. The shaft is mounted to the arc surface to cause translation of the translating link as the shaft rotates.

20 Claims, 41 Drawing Sheets

(51) Int. Cl.
*F16H 25/18* (2006.01)
*B25J 9/10* (2006.01)

(56) References Cited

U.S. PATENT DOCUMENTS

| | | | |
|---|---|---|---|
| 5,587,937 | A | 12/1996 | Massie et al. |
| 5,907,971 | A * | 6/1999 | Sato et al. ............... 74/96 |
| 5,931,244 | A * | 8/1999 | Renfroe et al. ........... 180/6.32 |
| 6,183,239 | B1 | 2/2001 | Belous |
| 6,330,837 | B1 | 12/2001 | Charles et al. |
| 6,336,374 | B1 * | 1/2002 | Brogardh et al. .......... 74/490.03 |
| 6,516,681 | B1 * | 2/2003 | Pierrot et al. ............. 74/490.01 |
| 6,985,133 | B1 * | 1/2006 | Rodomista et al. ........ 345/156 |
| 7,181,988 | B2 | 2/2007 | Nagai et al. |
| 7,524,181 | B2 | 4/2009 | Chiang |
| 7,673,537 | B2 * | 3/2010 | Lessard et al. ............ 74/490.01 |
| 7,735,385 | B2 * | 6/2010 | Wilson et al. ............. 74/89.18 |
| 8,307,732 | B2 * | 11/2012 | Kinoshita et al. ......... 74/490.01 |
| 8,464,603 | B2 * | 6/2013 | Quaid ...................... 74/490.03 |
| 2002/0029610 | A1 | 3/2002 | Chrystall et al. |
| 2003/0235460 | A1 | 12/2003 | Moon et al. |
| 2006/0191364 | A1 | 8/2006 | Linke et al. |
| 2007/0113700 | A1 | 5/2007 | Khajepour et al. |
| 2008/0000317 | A1 | 1/2008 | Patton et al. |
| 2008/0085176 | A1 * | 4/2008 | Statkus .................... 414/462 |
| 2008/0179919 | A1 | 7/2008 | Yoshida et al. |
| 2009/0019960 | A1 | 1/2009 | Nabat et al. |
| 2009/0158674 | A1 * | 6/2009 | Guerrero et al. .......... 52/81.2 |
| 2009/0217596 | A1 | 9/2009 | Neundorf et al. |
| 2010/0170361 | A1 | 7/2010 | Bennett et al. |
| 2010/0170362 | A1 | 7/2010 | Bennett et al. |
| 2011/0003656 | A1 | 1/2011 | Bennett et al. |
| 2011/0031424 | A1 | 2/2011 | Hanlon et al. |
| 2013/0192396 | A1 * | 8/2013 | Quaid ...................... 74/96 |

FOREIGN PATENT DOCUMENTS

| | | |
|---|---|---|
| EP | 2133181 | 12/2009 |
| JP | 2011088262 | 5/2011 |
| WO | WO 2008/103425 | 8/2008 |

OTHER PUBLICATIONS

Bendjedia et al., Sensorless Control of Hybrid Stepper Motor, 2007 European Conference on Power Electronics and Applications, Sep. 2-5, 2007.

Lawrence et al., Low Cost Actuator and Sensor for High-Fidelity Haptic Interfaces, Proceedings of the 12th International Symposium on Haptic Interfaces for Virtual Environment and Teleoperator Systems, 2004, IEEE.

Hoover et al., A Rapidly Prototyped 2-Axis Positioning Stage for Microassembly Using Large Displacement Compliant Mechanisms, International Conference on Robotics and Automation, 2006, IEEE.

Zhang, Towards an Affordable Multi-DOF Force Feedback Motion Control Input Device, A Thesis Submitted in Partial Fulfillment of the Requirements for the Degree of Master of Applied Science in the Faculty of Gradate Studies, The University of British Columbia, Sep. 2000.

International Search Report and Written Opinion issued in PCT/US2012/054724, Feb. 18, 2013.

Supplementary European Search Report for EPO Pat. Appl. No. 12883620.3, mailed on Jul. 1, 2014, 4 pp.

* cited by examiner

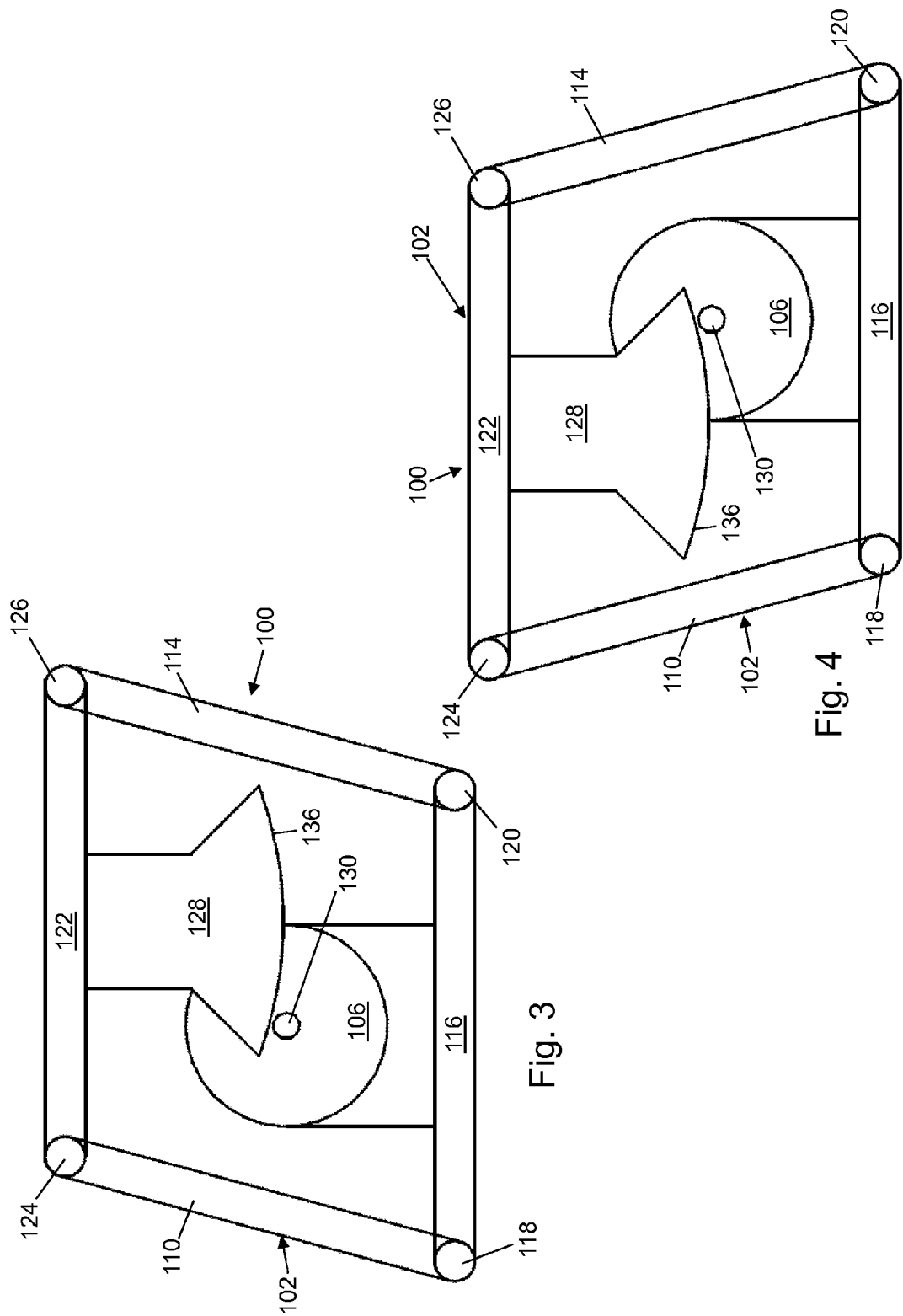

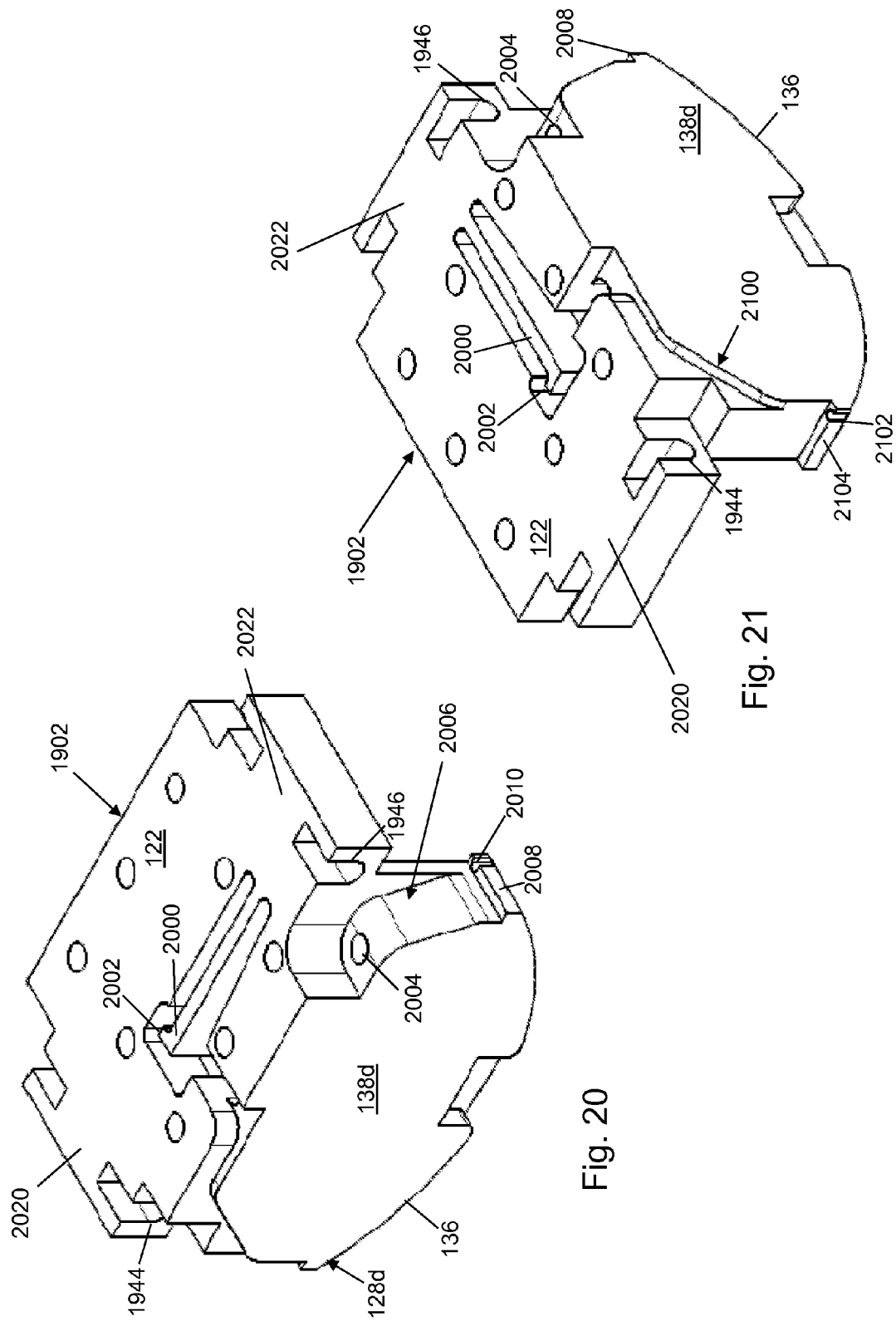

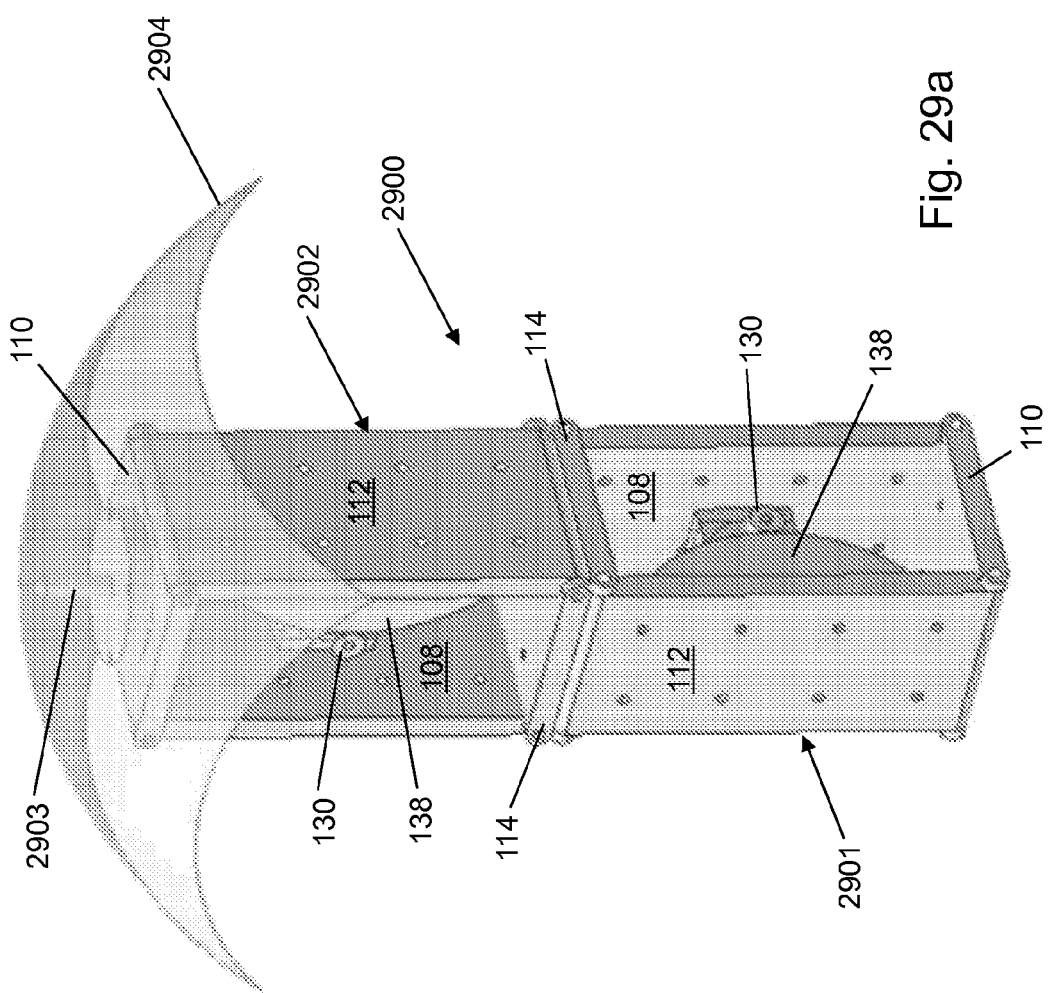

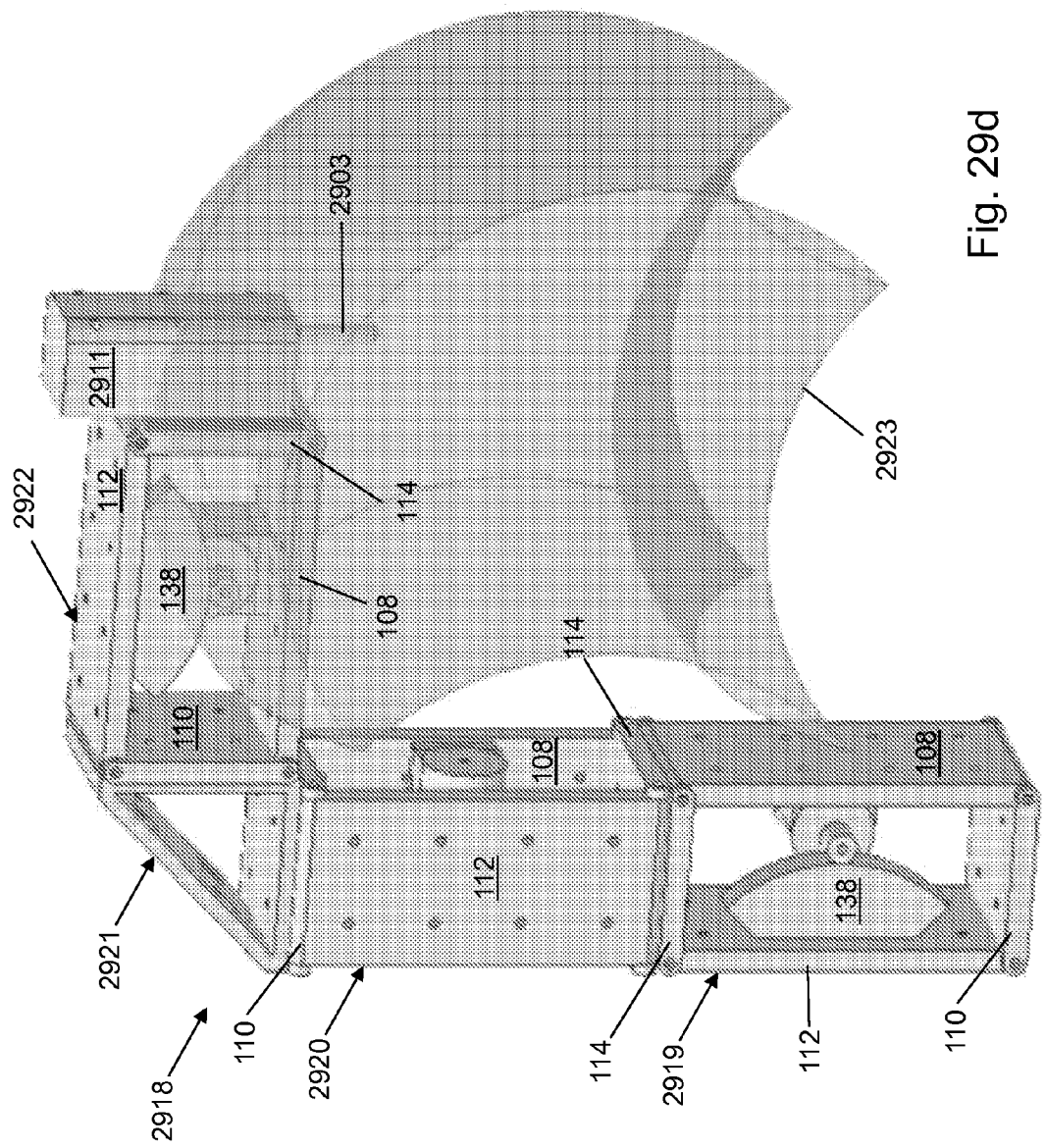

PARALLELOGRAM BASED ACTUATING DEVICE

CROSS-REFERENCE TO RELATED APPLICATIONS

The present application claims priority as a continuation-in-part to U.S. patent application Ser. No. 13/236,245 titled PARALLELOGRAM BASED ACTUATING DEVICE that was filed Sep. 19, 2011, the entire contents of which is hereby incorporated by reference. The present application further claims priority as a continuation-in-part to PCT/US2012/054724 titled PARALLELOGRAM BASED ACTUATING DEVICE that was filed Sep. 12, 2012, the entire contents of which is hereby incorporated by reference.

BACKGROUND

A common application for robotics is to position an object without changing its orientation. In some cases "Cartesian" robots with multiple serial prismatic joints are used. However, prismatic joints present significant design challenges. Unlike revolute joints, which can use compact, precise, and low-cost anti-friction rotational bearings, linear guides are larger, heavier, more expensive, and more difficult to maintain. For example, linear guide surfaces must maintain their surface properties and geometry over the entire length of motion. These surfaces are also susceptible to wear, dirt, and moisture, and are difficult to cover and protect.

In practice, serial-chain robots with revolute joints are more commonly used for these tasks. However, these revolute joint robots require extra joints to keep the object's orientation from changing. For example, to translate an object in two dimensions without changing its orientation, only two prismatic joints are required. For the same task, three revolute joints are required, increasing the cost and complexity of the device.

For precision positioning of objects over small distances, such as micromanipulators, four-bar linkages with leaf-spring flexures are often used instead. When restricted to motion ranges that are small relative to the lengths of the leaf-spring flexure elements, these devices produce near-linear motion. At higher motion ranges, however, the motion deviates significantly from linear, and the leaf-spring forces increase proportionally, making them less effective.

Actuation for these devices is also complicated for larger motion ranges. Typically some form of linear actuator is used to push a drive surface connected to the output portion of the device. At large motion ranges, these linear actuators are no longer aligned with the motion direction, reducing efficiency. The linear actuator tip must also slide along the drive surface an increasingly large amount as the motion range increases, resulting in increased wear, parasitic friction, and side loading of the actuator, none of which is desirable in precision applications.

U.S. Pat. No. 5,587,937 describes a four-bar linkage with cable drive actuation to drive an adjacent link. This configuration has the advantage of keeping the motor bulk and mass on the distal end of the device, but does not allow the bulk and mass to be located in the middle of the linkage, which is preferable for a modular actuator. In addition, this configuration applies forces to one end of the linkage while interaction forces are applied at the opposite end, increasing moment loading and necessitating stiffer bearings and linkages.

SUMMARY

In an example embodiment, an actuating device is provided. The actuating device includes, but is not limited to, a first actuating device and a second actuating device. Each of the first actuating device and the second actuating device include a base link, a first link, a second link, a translating link, a shaft, and a drive. The base link includes a base plate, a first joint, and a second joint. The base plate extends between the first joint and the second joint. The first link is mounted to the first joint to allow rotation of the first link relative to the base plate at the first joint. The second link is mounted to the second joint to allow rotation of the second link relative to the base plate at the second joint. The translating link includes a translating plate, a third joint, and a fourth joint. The translating plate extends between the third joint and the fourth joint. The first link is mounted to the third joint to allow rotation of the first link relative to the translating plate at the third joint. The second link is mounted to the fourth joint to allow rotation of the second link relative to the translating plate at the fourth joint. The shaft is configured to mount to an actuator such that the actuator causes rotation of the shaft. When operating the actuating device, a position of the shaft is fixed relative to the base plate. The drive includes an arc surface and is mounted to the translating link such that, when operating the actuating device, a position of the arc surface is fixed relative to the translating plate. The shaft is mounted to the arc surface to cause translation of the translating link relative to the base link as the shaft rotates. The second actuating device is mounted to the first actuating device.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3 depicts the front schematic diagram of the actuating device of FIG. 1 in a first translated position.

FIG. 4 depicts the front schematic diagram of the actuating device of FIG. 1 in a second translated position.

FIG. 20 depicts a right, top, front perspective diagram of a translating part of the actuating device of FIG. 18.

FIG. 21 depicts a left, top, front perspective diagram of the translating part of the actuating device of FIG. 18.

FIGS. 29a-29i depict schematic diagrams of a plurality of combinations of the actuating devices of FIG. 1 arranged to control a position and an orientation of a tool within a workspace volume.

FIGS. 29j-29l depict schematic diagrams of a plurality of combinations of the actuating devices of FIG. 1 arranged to provide locomotion.

DETAILED DESCRIPTION

Figure 1:
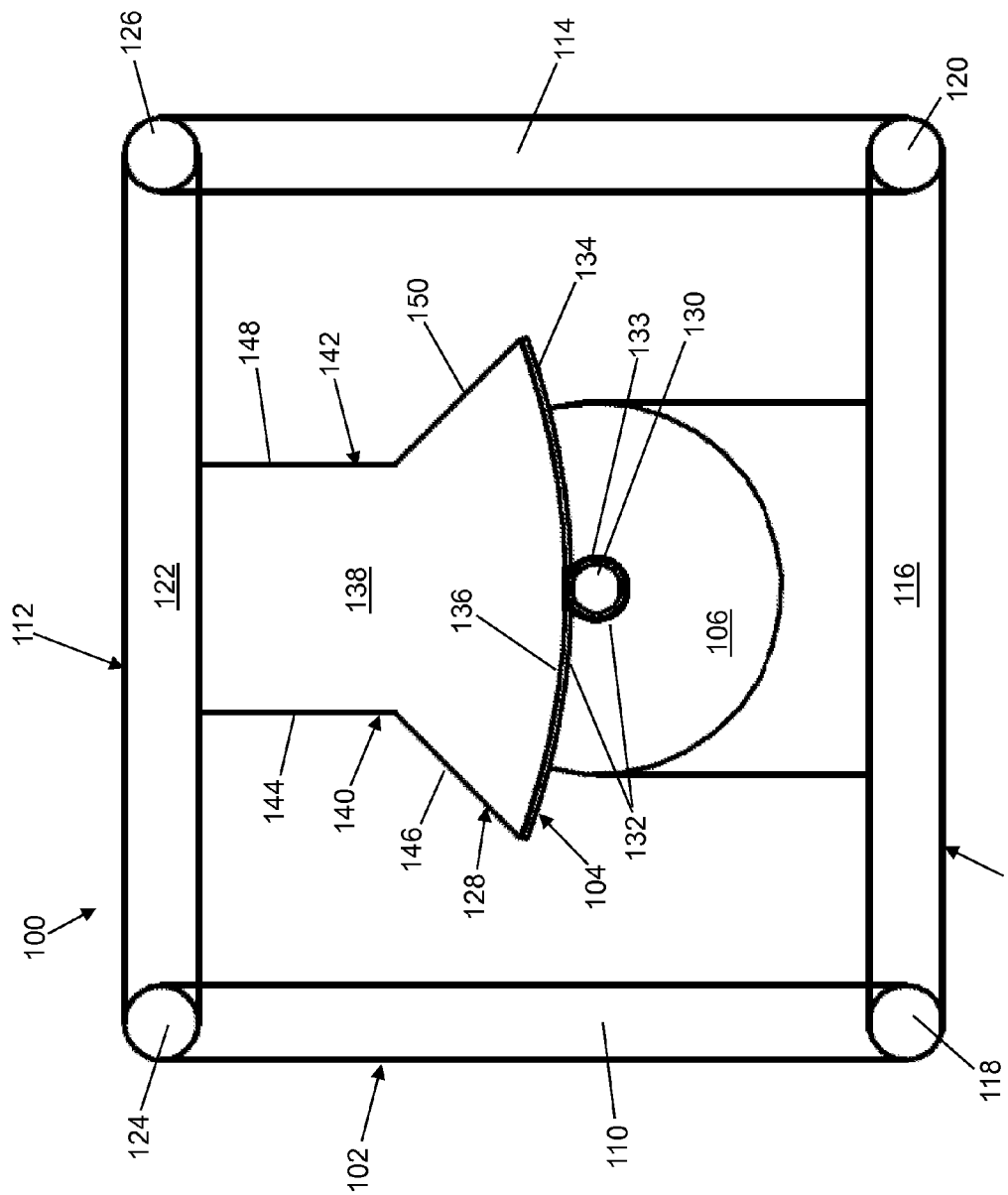
FIG. 1 depicts a front schematic diagram of an actuating device in a center position in accordance with a first illustrative embodiment.

With reference to FIG. 1, a block diagram of an actuating device 100 is shown in accordance with a first illustrative embodiment. In the illustrative embodiment, actuating device 100 includes a 4-bar linkage 102, a drive system 104, and an actuator 106. 4-bar linkage 102 may include a base link 108, a first link 110, a translating link 112, and a second link 114. As used in this disclosure, the term "link" includes any shaped structure used to connect two or more other structures. Actuating device 100 can be mounted to actuate another object in any direction. Thus, the directional references used herein, such as left side, right side, top, bottom, back, front, up, down, etc., are for illustration only based on the orientation in the drawings.

Base link 108 may include a base plate 116 that extends between a first joint 118 and a second joint 120. Base plate 116 may extend directly between first joint 118 and second joint 120 or may be joined to first joint 118 and second joint 120 through intermediate links. Base link 108 may be mounted to another object in any direction. Base link 108, including base plate 116, may include one or more non-flat surfaces and holes of various shapes and sizes, for example, to accommodate various mounting devices and/or to accommodate mounting of actuator 106 adjacent or to base link 108.

As used in this disclosure, the term "joint" includes any type of structure used to join two or more other structures for rotation of one structure relative to the one or more other structures. As examples, first joint 118 and second joint 120 may include hinge joints, ball bearings, bushings, "flex-pivot" joints, "living hinge" plastic flexures, ball and socket joints, etc.

Translating link 112 may include a translating plate 122 that extends between a third joint 124 and a fourth joint 126. Translating plate 122 may extend directly between third joint 124 and fourth joint 126 or may be joined to third joint 124 and fourth joint 126 through intermediate links. Translating link 112 may be mounted to another object in any direction. Translating link 112, including translating plate 122, may include one or more non-flat surfaces and holes of various shapes and sizes, for example, to accommodate various mounting devices. As examples, third joint 124 and fourth joint 126 may include hinge joints, ball bearings, bushings, "flex-pivot" joints, "living hinge" plastic flexures, ball and socket joints, etc.

First link 110 is mounted to first joint 118 to allow rotation of first link 110 relative to base plate 116 at first joint 118. Second link 114 is mounted to second joint 120 to allow rotation of second link 114 relative to base plate 116 at second joint 120. First link 110 is mounted to third joint 124 to allow rotation of first link 110 relative to translating plate 122 at third joint 124. Second link 114 is mounted to fourth joint 126 to allow rotation of second link 114 relative to translating plate 122 at fourth joint 126. As a result, first link 110 and second link 114 constrain motion of translating link 112 such that it translates along an arc and does not rotate relative to base plate 116.

As used in this disclosure, the term "mount" includes join, unite, connect, associate, insert, hang, hold, affix, attach, fasten, bind, paste, secure, bolt, screw, rivet, solder, weld, glue, mold, thermoform, couple, etc. The phrases "mounted on" and "mounted to" include any interior or exterior portion of the support member referenced. Additionally, use of the term "mount" may indicate a direct or an indirect connection between the described components/devices.

In the illustrative embodiment of FIG. 1, drive system 104 may include a drive 128, a shaft 130, and a cable 132. Shaft 130 mounts to actuator 106 such that actuator 106 causes rotation of shaft 130. Shaft 130 is mounted to drive 128, which is mounted to translating link 112 to cause translation of translating link 112 as shaft 130 rotates. As a result, drive system 104 "drives" translation of translating link 112 under control of actuator 106. When operating actuating device 100, a position of shaft 130 is fixed relative to base plate 116.

In the illustrative embodiment of FIG. 1, shaft 130 is mounted to drive 128 by cable 132. Cable 132 may be selected to have a low creep rate, high strength, high fatigue resistance, and high flex resistance. Cable 132 may be formed of a variety of materials that provide the strength and flexibility needed to provide translation of drive 128 based on the size of actuating device 100, the loads to be translated by actuating device 100, the precision with which the loads are to be translated/rotated, etc. as understood by a person of skill in the art. For example, depending on the size of actuating device 100, working environment, storage environment, and lifetime requirements, stainless steel, tungsten, Ultra-High Molecular Weight Polyethylene (UHMwPE) (e.g. Spectra®, Dyneema®), liquid crystal polymer (e.g. Vectran®), or Aramid (e.g. Kevlar®, Twaron®, Technora®), or a composite blend of a high modulus polyethylene material and a liquid crystal polymer may be suitable materials.

Cable 132 may include a shaft cable portion 133 and an arc cable portion 134. Shaft cable portion 133 winds around at least a portion of shaft 130. Arc cable portion 134 extends along at least a portion of an arc surface 136 of drive 128. Cable 132 may be selected to provide a low-friction and low-backlash transmission for drive system 104.

In the illustrative embodiment of FIG. 1, drive 128 may further include a front drive surface 138, a first side surface 140, a second side surface 142, and a back drive surface (not shown). Front drive surface 138, first side surface 140, second side surface 142, and the back drive surface mount to translating plate 122 along first edges. Arc surface 136 forms an arc shaped surface and extends between second edges of front drive surface 138, first side surface 140, second side surface 142, and the back drive surface. Drive 128 may be hollow or solid.

In the illustrative embodiment of FIG. 1, first side surface 140 includes a first attachment side surface 144 and a second attachment side surface 146 that extends at an angle from first attachment side surface 144. First attachment side surface 144 extends in a generally perpendicular direction from translating plate 122 though this is not required. Second side surface 142 includes a third attachment side surface 148 and a fourth attachment side surface 150 that extends at an angle from third attachment side surface 148. Third attachment side surface 148 extends in a generally perpendicular direction from translating plate 122 though this is not required. Second attachment side surface 146 and fourth attachment side surface 150 form a wedge shape from which arc surface 136 is formed. When operating actuating device 100, a position of arc surface 136 is fixed relative to translating plate 122. Front drive surface 138, first side surface 140, second side surface 142, and the back drive surface may have a variety of shapes and sizes and be formed of a variety of materials to provide sufficient strength to translate translating link 112 and the loads to be translated by actuating device 100.

In other illustrative embodiments, shaft 130 may be mounted to drive 128 using friction. For example, shaft 130 may include a first frictional surface and arc surface 136 may include a second frictional surface. Shaft 130 is mounted to arc surface 136 using the frictional force between the first frictional surface and the second frictional surface. As another example, a belt may be mounted to shaft 130 and to drive 128 so that shaft 130 is mounted to rotate arc surface 136 using the belt.

Actuator 106 may include an electric motor such as a brushed or brushless dc motor or an ac motor, a servo motor, a stepper motor, a piezoelectric motor, a pneumatic actuator, a gas motor, an induction motor, a gear motor with an integral or external epicyclical, harmonic, cable, worm or other gear drive, etc. Actuator 106 can be used with or without sensors. A calibration procedure such as that described in Lawrence, D. A. et al, "Low Cost Actuator and Sensor for High-Fidelity Haptic Interfaces", International Symposium on Haptic Interfaces for Virtual Environment and Teleoperator Systems, pp. 74-81 (Mar. 27-28, 2004) may also be used to provide a smooth force output suitable for fine manipulation, haptic, and force-control applications when applied to a stepper motor.

Figure 2:
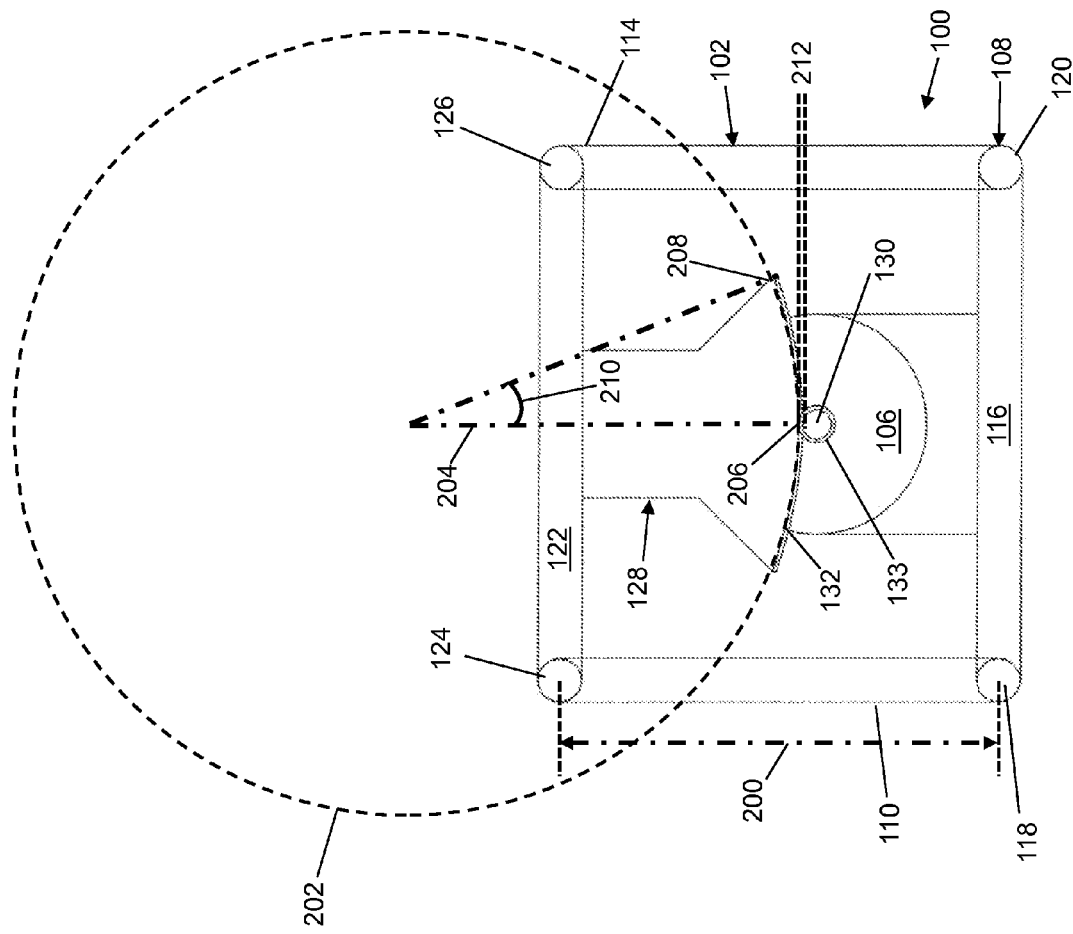
FIG. 2 depicts the front schematic diagram of the actuating device of FIG. 1 including design parameters.

With reference to FIG. 2, design parameters of actuating device 100 are shown. A length 200 of first link 110 and second link 114 is measured perpendicular to base plate 116 and between first joint 118 and third joint 124. Length 200 is approximately equal to $R_1+R_2+G$, where $R_1$ is a radius of shaft 130, $R_2$ is an arc circle radius 204 of an arc circle 202 on which arc surface 136 forms a part of the circumference of arc circle 202, and G, is a cable offset distance 212 between arc surface 136 and a surface of shaft 130 measured parallel to length 200 at an arc surface center 206. Cable offset distance 212 may approximately be a diameter of cable 132 plus a manufacturing tolerance. Thus, length 200 of first link 110 and second link 114 measured between centers of first joint 118 and third joint 124 is approximately equal to a distance measured between a center of shaft 130 and a center of arc circle 202.

Actuator 106 and arc surface 136 are mounted such that a line connecting the center of shaft 130 and the center of arc circle 202 is parallel to length 200 connecting the centers of first joint 118 and third joint 124 to form a centered position of actuating device 100. An arc surface edge 208 defines an arc surface half angle 210 that is a maximum rotation point for drive 128. First link 110 and second link 114 are of approximately equal length, and base plate 116 and translating plate 122 are of approximately equal length.

With reference to FIG. 3, actuating device 100 is shown in a first translated position. Actuator 106 rotates shaft 130 which in turn translated arc surface 136 of drive 128 along an arc. Thus, as shaft 130 rotates, the tangent of arc surface 136 nearest actuator 106 stays aligned with the direction of motion, allowing efficient use of the actuator torque and precision. Rotation of arc surface 136 of drive 128 results in translation of translating plate 122 at third joint 124 and fourth joint 126 while base plate 116 remains fixed. With reference to FIG. 4, actuating device 100 is shown in a second translated position in a direction opposite that of FIG. 3.

While a single actuating device 100 may not produce linear translational motion, a plurality of actuating devices can be combined to provide two- or three-dimensional translational motion. For example, a plurality of actuating devices may be mounted in series and oriented such that each actuating device's nominal translating direction is orthogonal to the others. True motion along a line can then be achieved by coordinated simultaneous motion of multiple actuators.

Figure 5:
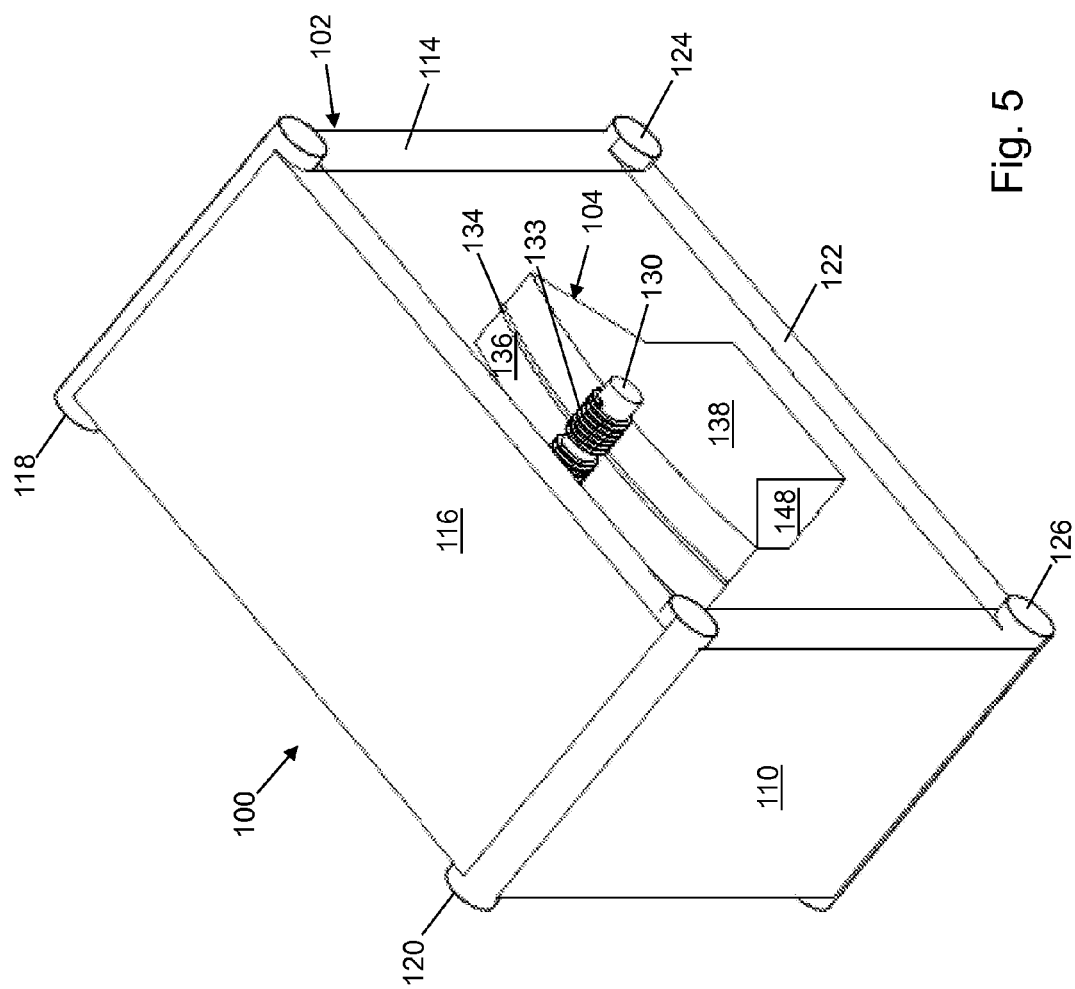
FIG. 5 depicts a bottom, front, perspective diagram of the actuating device of FIG. 1.
Figure 6:
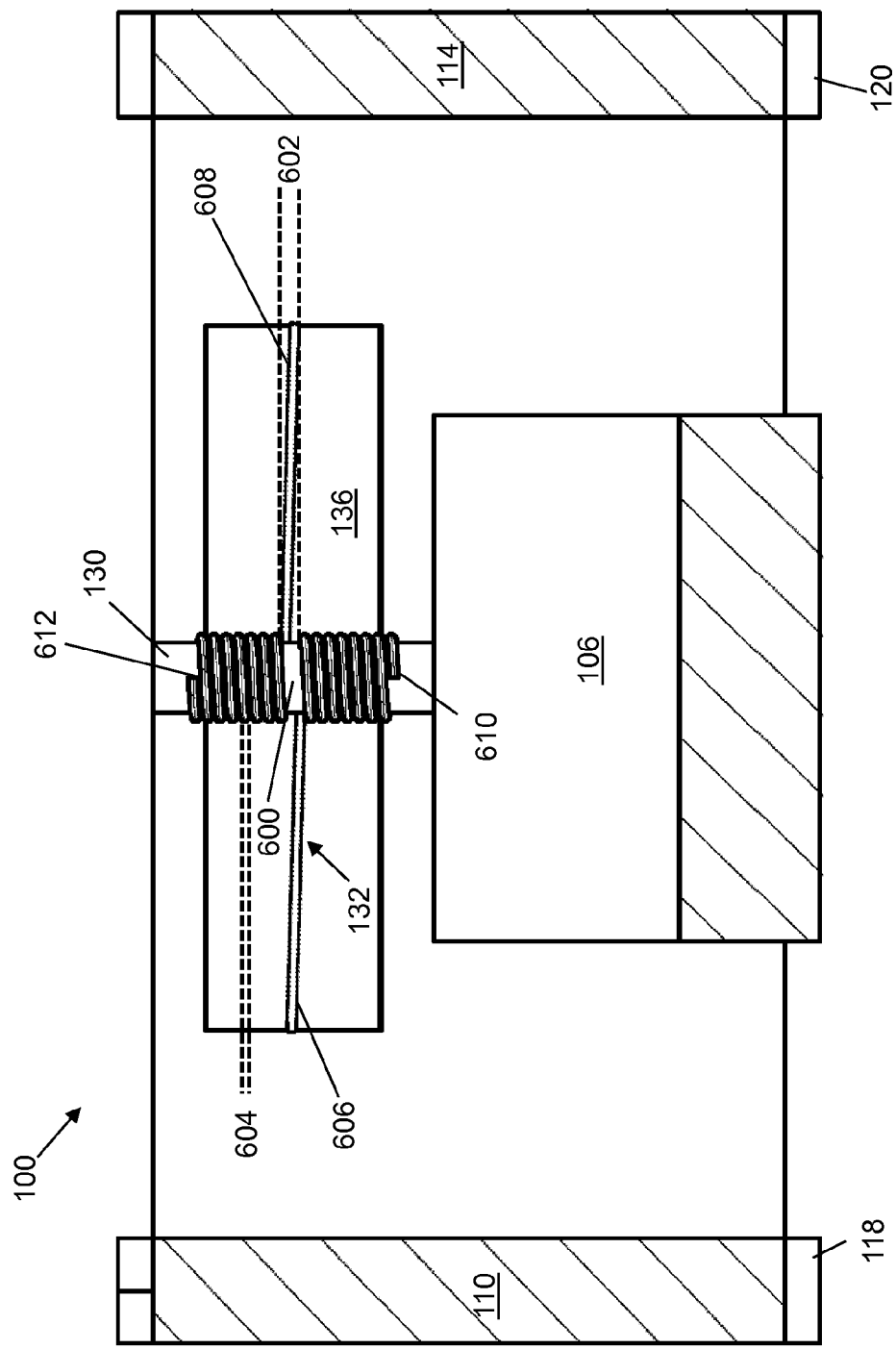
FIG. 6 depicts a bottom schematic cross-section diagram of the actuating device of FIG. 1.

With reference to FIGS. 5 and 6, bottom, front, perspective and bottom schematic diagrams of actuating device 100 are shown to illustrate an example mounting of cable 132. In the illustrative embodiment of FIGS. 5 and 6, cable 132 includes a first cable 606 and a second cable 608. First cable 606 is used for a first drive direction (translation as shown in FIG. 3), and second cable 608 is used for a second drive direction (translation as shown in FIG. 4). First cable 606 has a first end 610 terminated on shaft 130, ensuring that it does not slip. Second cable 608 has a first end 612 terminated on shaft 130, ensuring that it does not slip. The other ends of first cable 606 and second cable 608 are terminated on drive 128 or translating link 112 after extending from shaft 130 along arc surface 136 on opposite sides of shaft 130. Example termination mechanisms include a set screw, adhesive, or threading of cable 132 through a hole in shaft 130 provided for that purpose.

As an example, the illustrative embodiment of FIGS. 5 and 6 is suitable for cases where there is vibration or impact loading of actuating device 100. To minimize loading of the actuator bearings or bushings, cable 132 may be wrapped such that it leaves shaft 130 adjacent to arc surface 136 and not when it is on the opposite side of shaft 130, which would result in a significant upward force on shaft 130 due to the cable preload force and in increasing friction. To prevent bunching and jamming of cable 132 in between arc surface 136 and the surface of shaft 130, notches in extremes of arc surface 136 may be included to help guide cable 132 as it wraps and unwraps on shaft 130. A cable margin 600 is defined between where first cable 606 and second cable 608 mount to shaft 130. A cable offset 602 is the distance between a cable notch and the location where cable 132 leaves shaft 130 so that cable 132 is more likely to wrap and unwrap in a single layer as arc surface 136 moves back and forth, and may be approximately equal to $$\frac{\theta p(R_2 + G)}{2\pi(R_1 + G)},$$

where $\theta$ is arc surface half angle 210 and p is a cable pitch 604 of cable 132 on shaft 130.

Shaft 130 or arc surface 136 may also include spiral grooves to help guide cable 132 as it wraps and unwraps on shaft 130. These grooves have the additional benefit of relieving stress on cable 132 by providing support to the sides of cable 132, preventing cable 132 from flattening against shaft 130 or arc surface 136.

Figure 7:
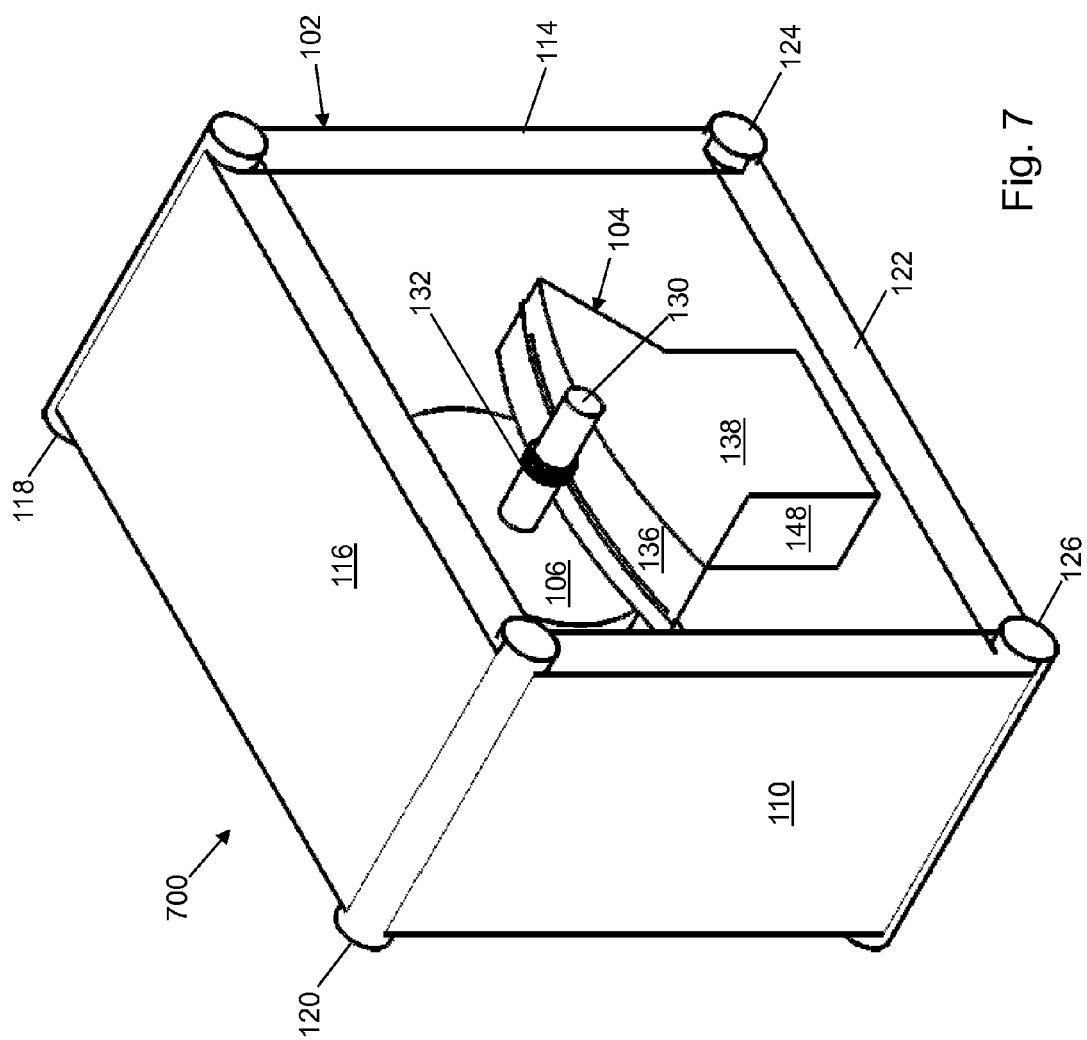
FIG. 7 depicts a bottom, front, perspective diagram of an actuating device in a center position in accordance with a second illustrative embodiment.
Figure 8:
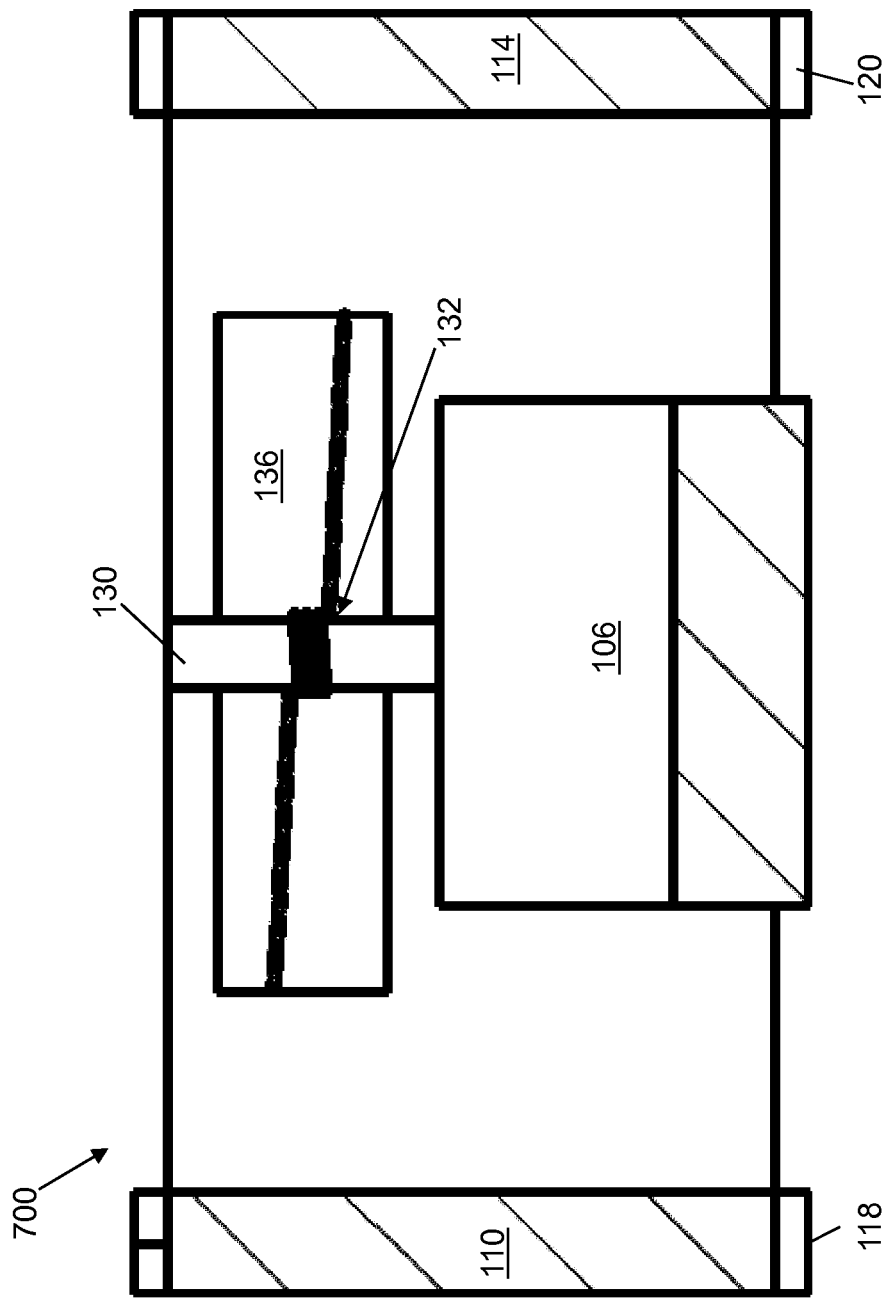
FIG. 8 depicts a bottom schematic cross-section diagram of the actuating device of FIG. 7.

With reference to FIGS. 7 and 8, bottom, front, perspective and bottom schematic diagrams of a second actuating device 700 are shown to illustrate a second example mounting of cable 132. The illustrative embodiment of FIGS. 7 and 8 is suitable for cases where there is minimal vibration or impact loading, or where occasional slippage of cable 132 on shaft 130 may not matter. In this case, cable 132 is comprised of a single cable that is wrapped around shaft 130 for several turns. With enough turns, the friction between cable 132 and shaft 130 is sufficient to prevent slippage. The required number of turns can be determined experimentally for second actuating device 700, or estimated by using the well-known capstan equation and estimates of the cable pre-tension force and coefficient of friction.

Figure 9:
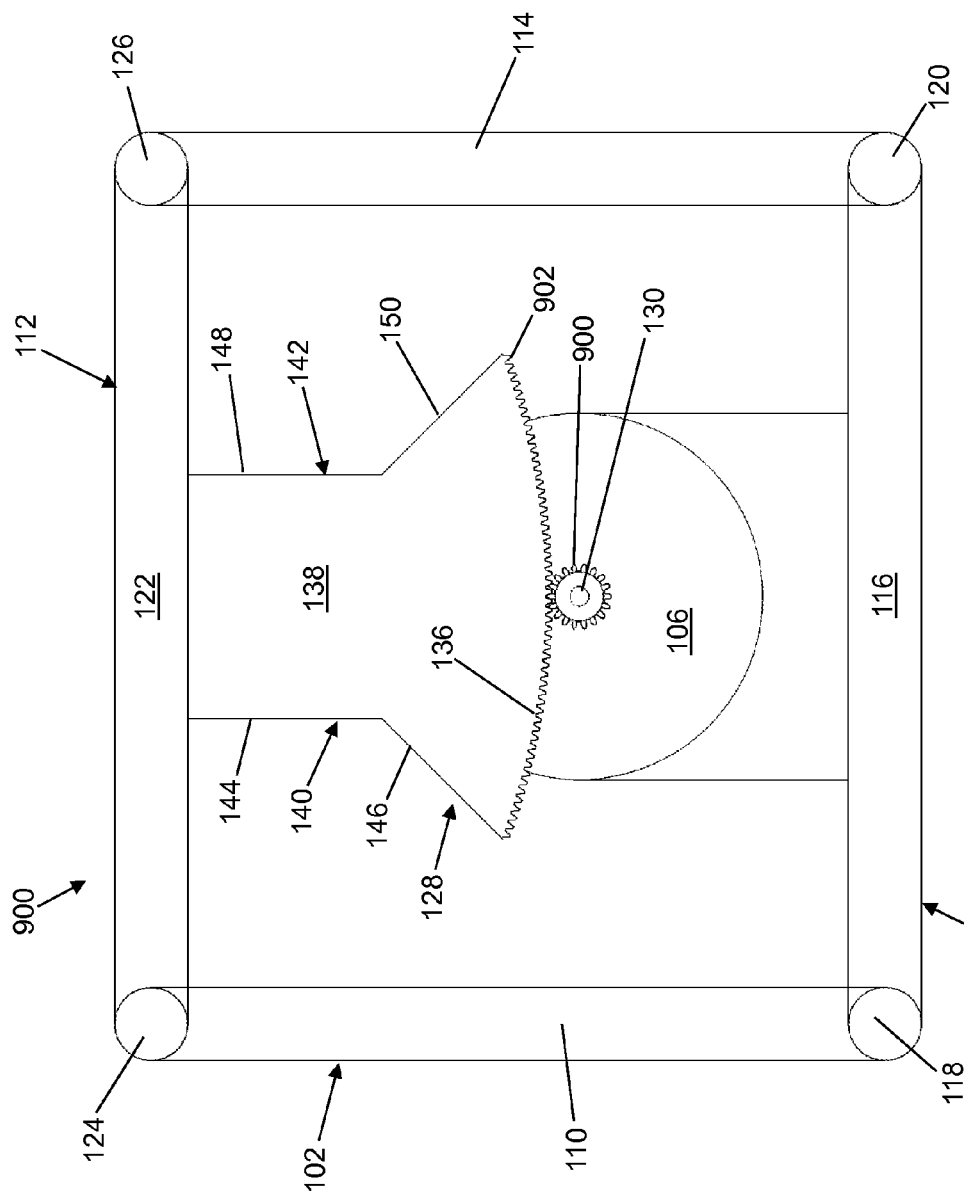
FIG. 9 depicts a front schematic diagram of an actuating device in a center position in accordance with a third illustrative embodiment.

With reference to FIG. 9, a third actuating device 900 is shown to illustrate a third example mounting of shaft 130 to arc surface 136. In the illustrative embodiment of FIG. 9, shaft 130 includes a first plurality of teeth 900 that extend from a surface of shaft 130. Arc surface 136 includes a second plurality of teeth 902 that extend from arc surface 136, wherein the first plurality of teeth 900 mesh with the second plurality of teeth 902 to mount shaft 130 to arc surface 136 and to thereby translate translating link 112 under control of actuator 106.

Figure 10:
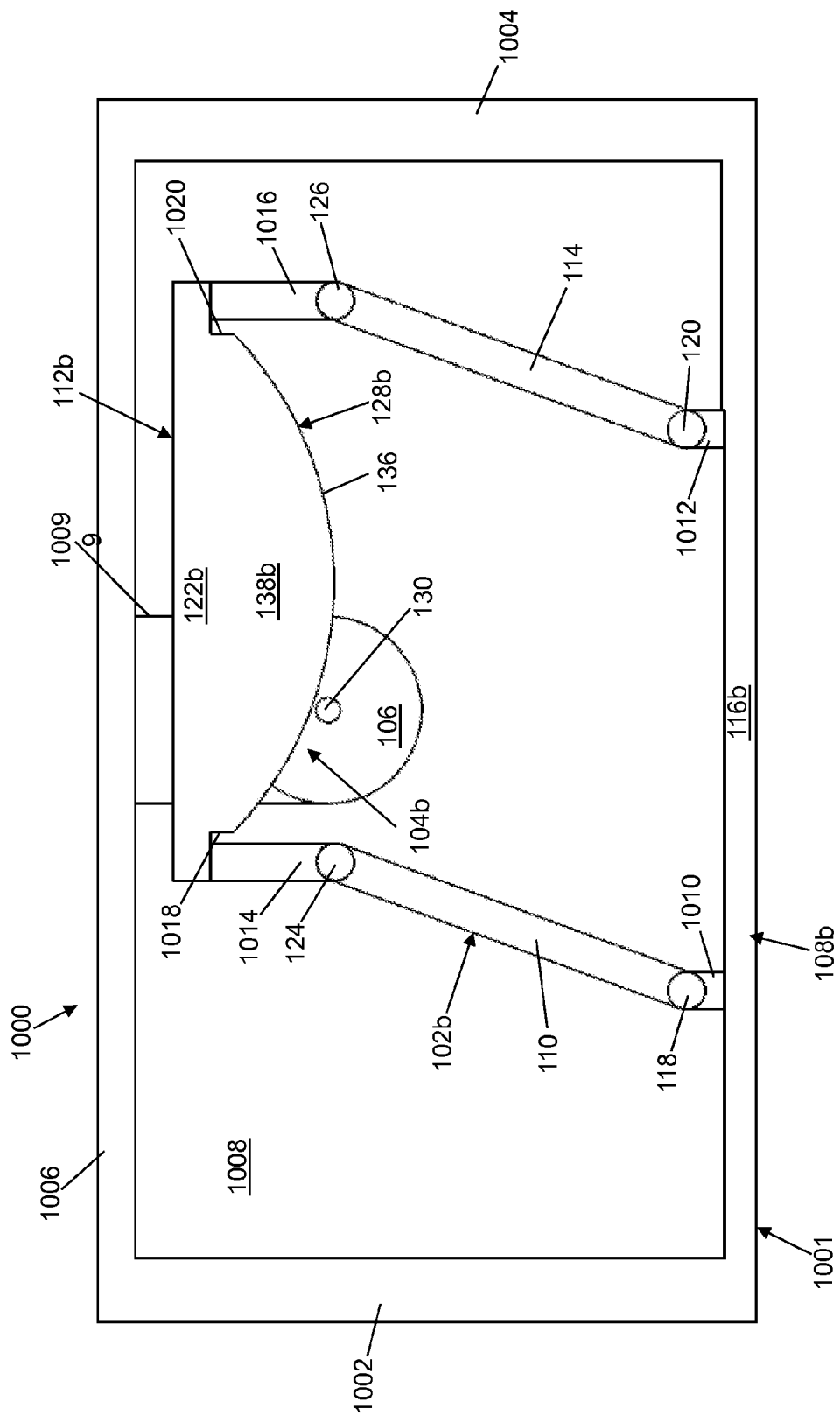
FIG. 10 depicts a front schematic diagram of an actuating device in a translated position in accordance with a fourth illustrative embodiment.

With reference to FIG. 10, a fourth actuating device 1000 is shown in accordance with a fourth illustrative embodiment. Fourth actuating device 1000 may include a housing 1001, a second 4-bar linkage 102b, a second drive system 104b, and actuator 106. Housing 1001 may include a second base link 108b, a first side wall 1002, a second side wall 1004, a top wall 1006, and a back wall 1008. First side wall 1002 extends from a first end of second base link 108b. Second side wall 1004 extends from a second end of second base link 108b opposite the first end of second base link 108b. Top wall 1006 extends between first side wall 1002 and second side wall 1004 above second base link 108b. As used in this disclosure, the term "wall" may include any shaped structure and may be curved. Back wall 1008 includes an actuator support surface 1009 cut in a surface of back wall 1008 to support actuator 106 relative to arc surface 136. Alternatively, actuator support surface 1009 may be attached to top wall 1006 and back wall 1008 may not be required.

Second 4-bar linkage 102b may include second base link 108b, first link 110, a second translating link 112b, and second link 114. Second base link 108b may include a second base plate 116b that extends between first joint 118 and second joint 120. First joint 118 mounts to second base link 108b through a first joint support 1010 that extends up from second base link 108b. Second joint 120 mounts to second base link 108b through a second joint support 1012 that extends up from second base link 108b.

Second translating link 112b may include a second translating plate 122b that extends between third joint 124 and fourth joint 126. Third joint 124 mounts to second translating plate 122b through a first joint connector 1014 that extends up from third joint 124. Fourth joint 126 mounts to second translating plate 122b through a second joint connector 1016 that extends up from fourth joint 126.

In the illustrative embodiment of FIG. 10, second drive system 104b may include a second drive 128b, shaft 130, and any of the mechanisms for mounting arc surface 136 to shaft 130 discussed herein. Second drive 128b may include arc surface 136, a second front drive surface 138b, a fifth attachment side surface 1018, a sixth attachment side surface 1020, and a back drive surface (not shown). Second front drive surface 138b, fifth attachment side surface 1018, sixth attachment side surface 1020, and the back drive surface mount to second translating plate 122b along first edges. Arc surface 136 forms an arc shaped surface and extends between second edges of front drive surface 138b, fifth attachment side surface 1018, sixth attachment side surface 1020, and the back drive surface. Drive 128b may be hollow or solid. In the illustrative embodiment of FIG. 10, fifth attachment side surface 1018 and sixth attachment side surface 1020 extend generally perpendicular from second translating plate 122b.

Figure 11:
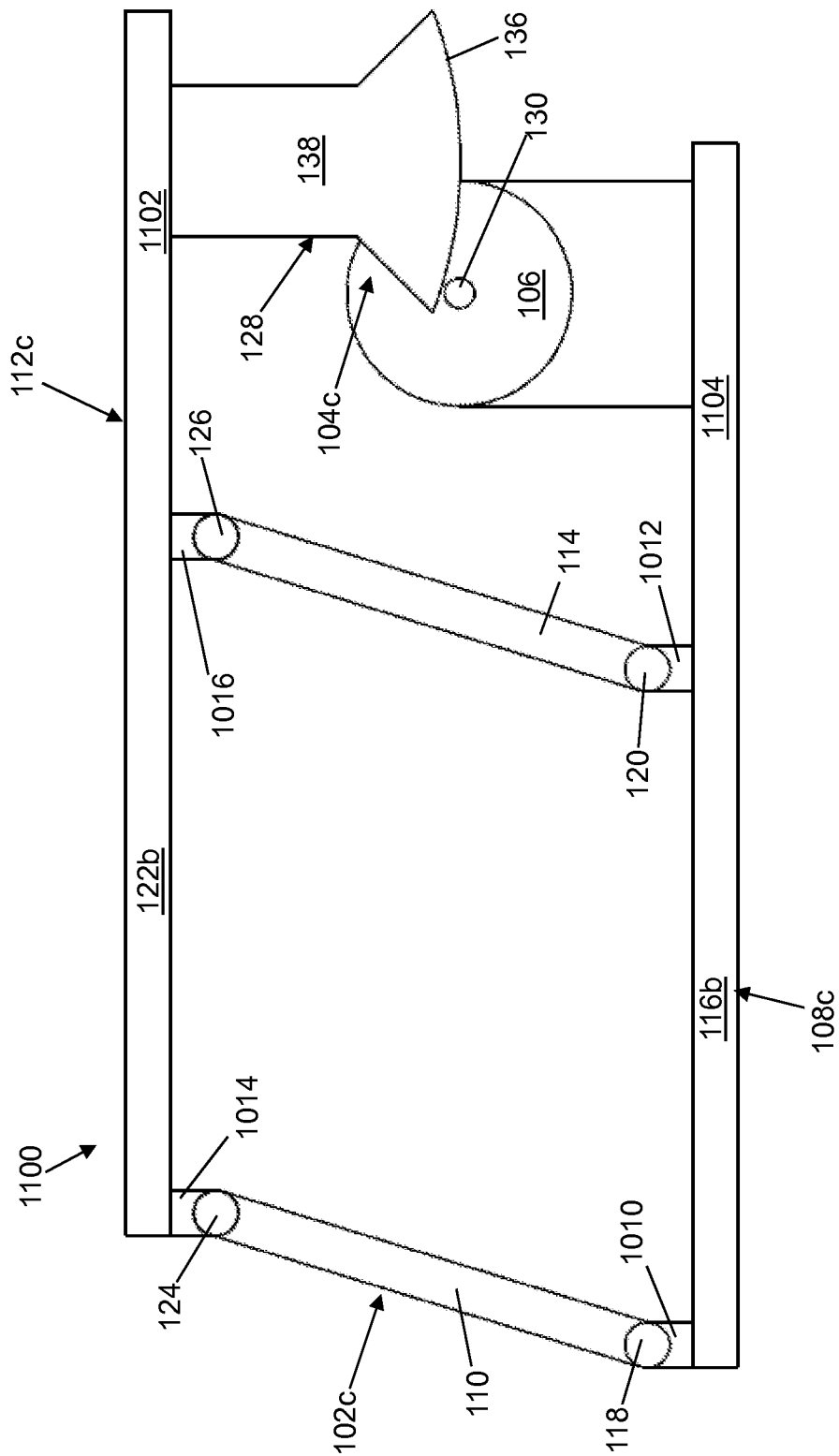
FIG. 11 depicts a front schematic diagram of an actuating device in a translated position in accordance with a fifth illustrative embodiment.

With reference to FIG. 11, a fifth actuating device 1100 is shown in accordance with a fifth illustrative embodiment. Fifth actuating device 1100 may include a third 4-bar linkage 102c, a third drive system 104c, and actuator 106. Third 4-bar linkage 102c may include a third base link 108c, first link 110, a third translating link 112c, and second link 114. Third base link 108c may include second base plate 116b that extends between first joint 118 and second joint 120. First joint 118 mounts to third base link 108c through first joint support 1010 that extends up from third base link 108c. Second joint 120 mounts to third base link 108c through second joint support 1012 that extends up from third base link 108c. Third base link 108c further may include a base extension plate 1104 that extends from second base plate 116b at second joint support 1012 and is generally parallel to second base plate 116b. Actuator 106 is mounted adjacent or to base extension plate 1104.

Third translating link 112c may include second translating plate 122b that extends between third joint 124 and fourth joint 126. Third joint 124 mounts to second translating plate 122b through first joint connector 1014 that extends up from third joint 124. Fourth joint 126 mounts to second translating plate 122b through second joint connector 1016 that extends up from fourth joint 126. Third translating link 112c further may include an extension plate 1102 that extends from second translating plate 122b at second joint connector 1016 and is generally parallel to second translating plate 122b. Drive 128 mounts to extension plate 1102 in a direction towards shaft 130. In the illustrative embodiment of FIG. 11, third drive system 104c may include drive 128, shaft 130, and any of the mechanisms for mounting arc surface 136 to shaft 130 discussed herein.

Figure 12:
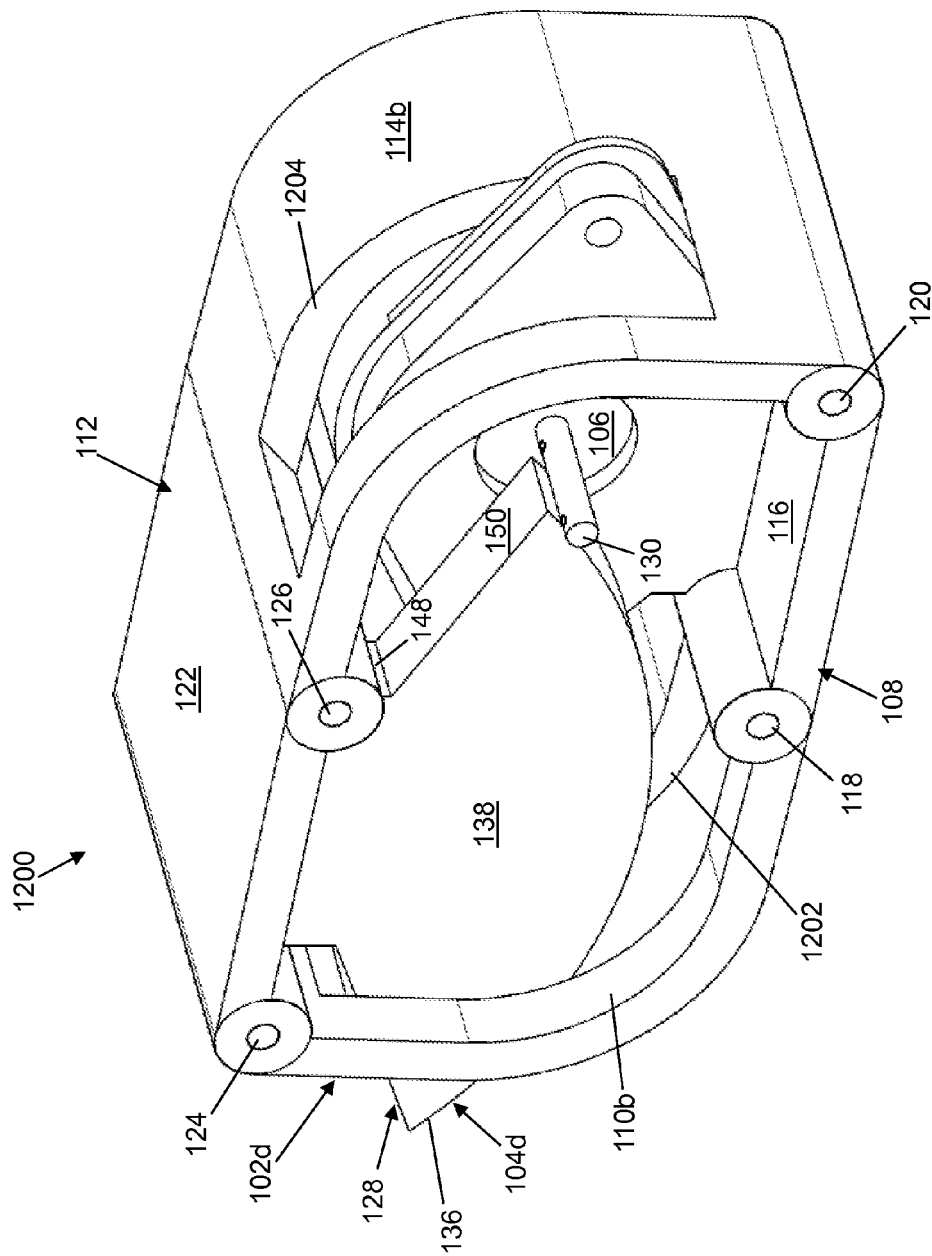
FIG. 12 depicts a side, front perspective diagram of an actuating device in a first translated position in accordance with a sixth illustrative embodiment.

With reference to FIG. 12, a sixth actuating device 1200 is shown in accordance with a sixth illustrative embodiment in a first translated position. Sixth actuating device 1200 may include a fourth 4-bar linkage 102d, a fourth drive system 104d, and actuator 106. Fourth 4-bar linkage 102d may include base link 108, a first curved link 110b, translating link 112, and a second curved link 114b. First curved link 110b forms a curved surface between first joint 118 and third joint 124. First curved link 110b further includes a first slot 1202 that allows drive 128 and/or a body of actuator 106 to extend through first curved link 110b. Second curved link 114b forms a curved surface between second joint 120 and fourth joint 126. Second curved link 114b further includes a second slot 1204 that allows drive 128 and/or the body of actuator 106 to extend through second curved link 114b. First curved link 110b and second curved link 114b have the same curvature though mounted to curve in opposite directions as more clearly shown in FIG. 13. First curved link 110b and second curved link 114b may be curved to avoid collisions with the body of actuator 106, drive 128, and/or actuator mounting flanges. In the illustrative embodiment of FIG. 12, fourth drive system 104d may include drive 128, shaft 130, and any of the mechanisms for mounting arc surface 136 to shaft 130 discussed herein.

Figure 13:
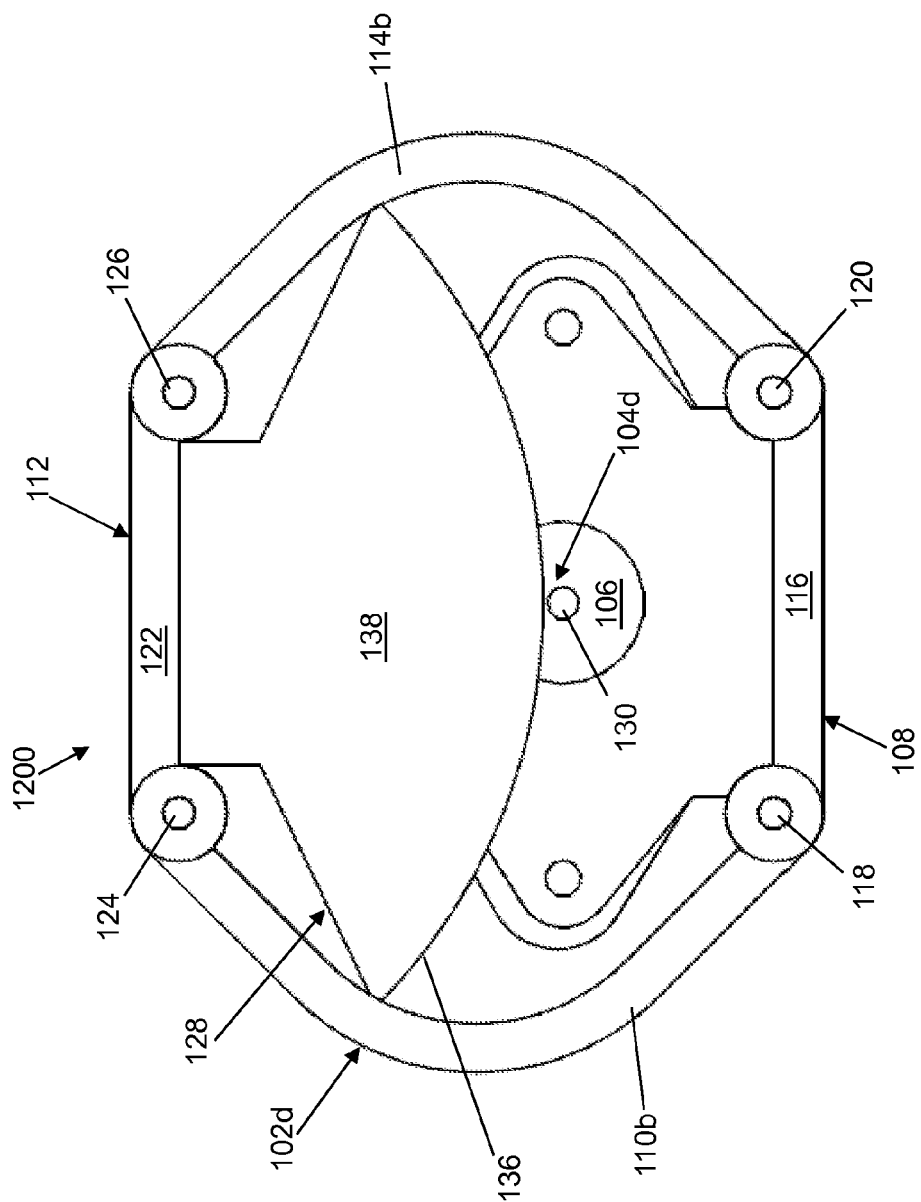
FIG. 13 depicts a front schematic diagram of the actuating device of FIG. 12 in a center position.
Figure 14:
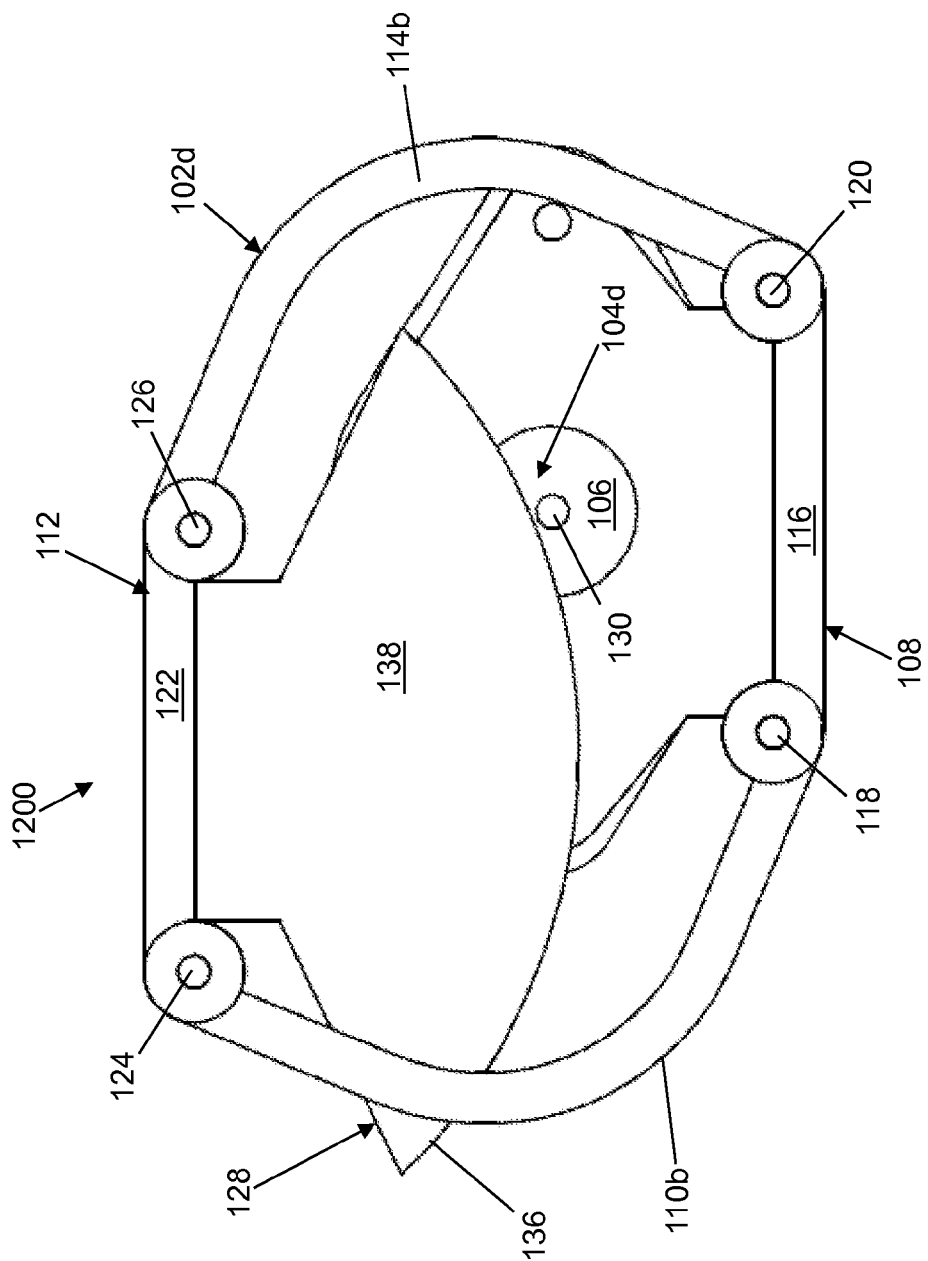
FIG. 14 depicts a front schematic diagram of the actuating device of FIG. 12 in a second translated position.
Figure 15:
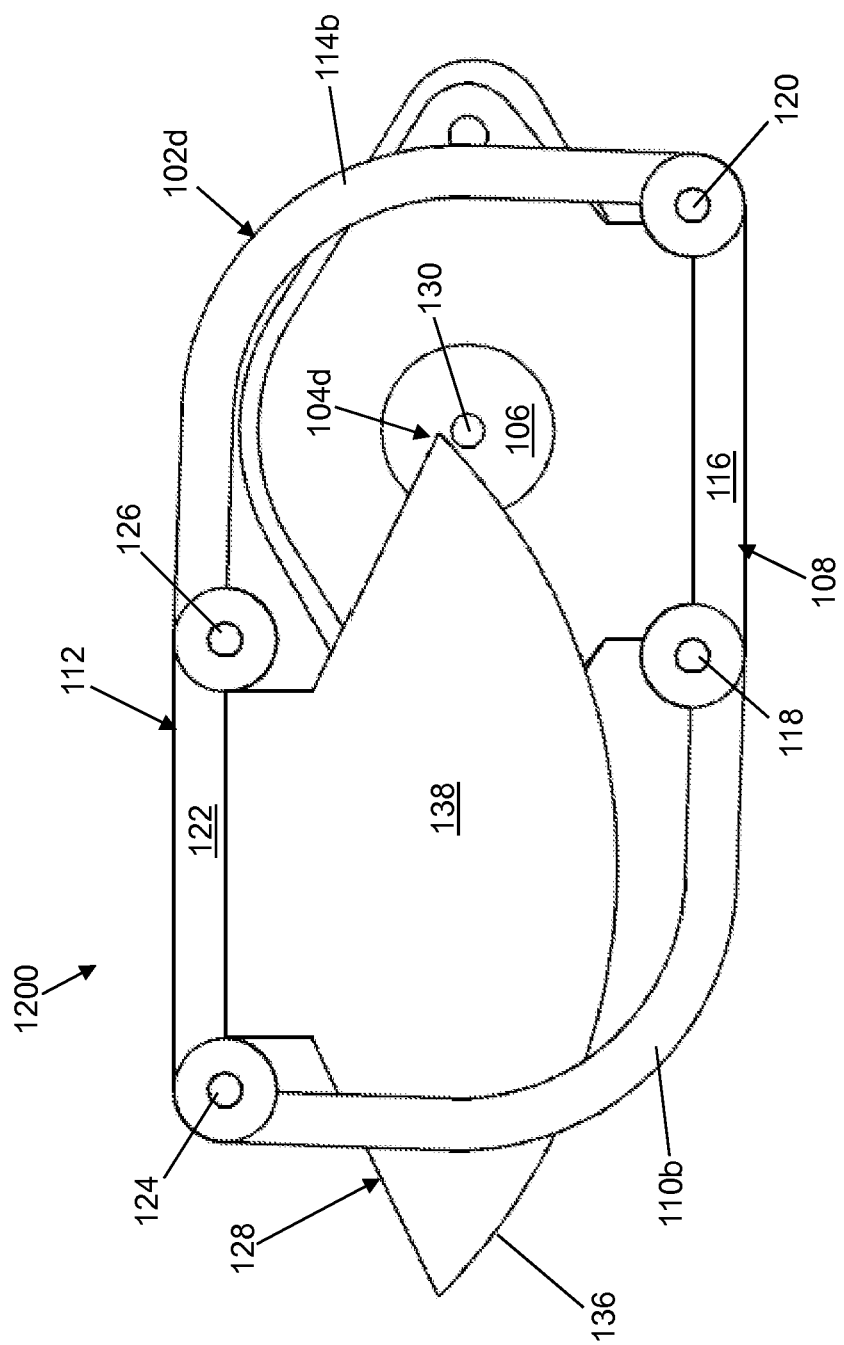
FIG. 15 depicts a front schematic diagram of the actuating device of FIG. 12 in the first translated position.

With reference to FIG. 13, a front schematic view of sixth actuating device 1200 is shown in a center position. With reference to FIG. 14, a front schematic view of sixth actuating device 1200 is shown in a second translated position relative to that of FIG. 12. With reference to FIG. 15, a front schematic view of sixth actuating device 1200 is shown in the first translated position of FIG. 12.

Figure 16:
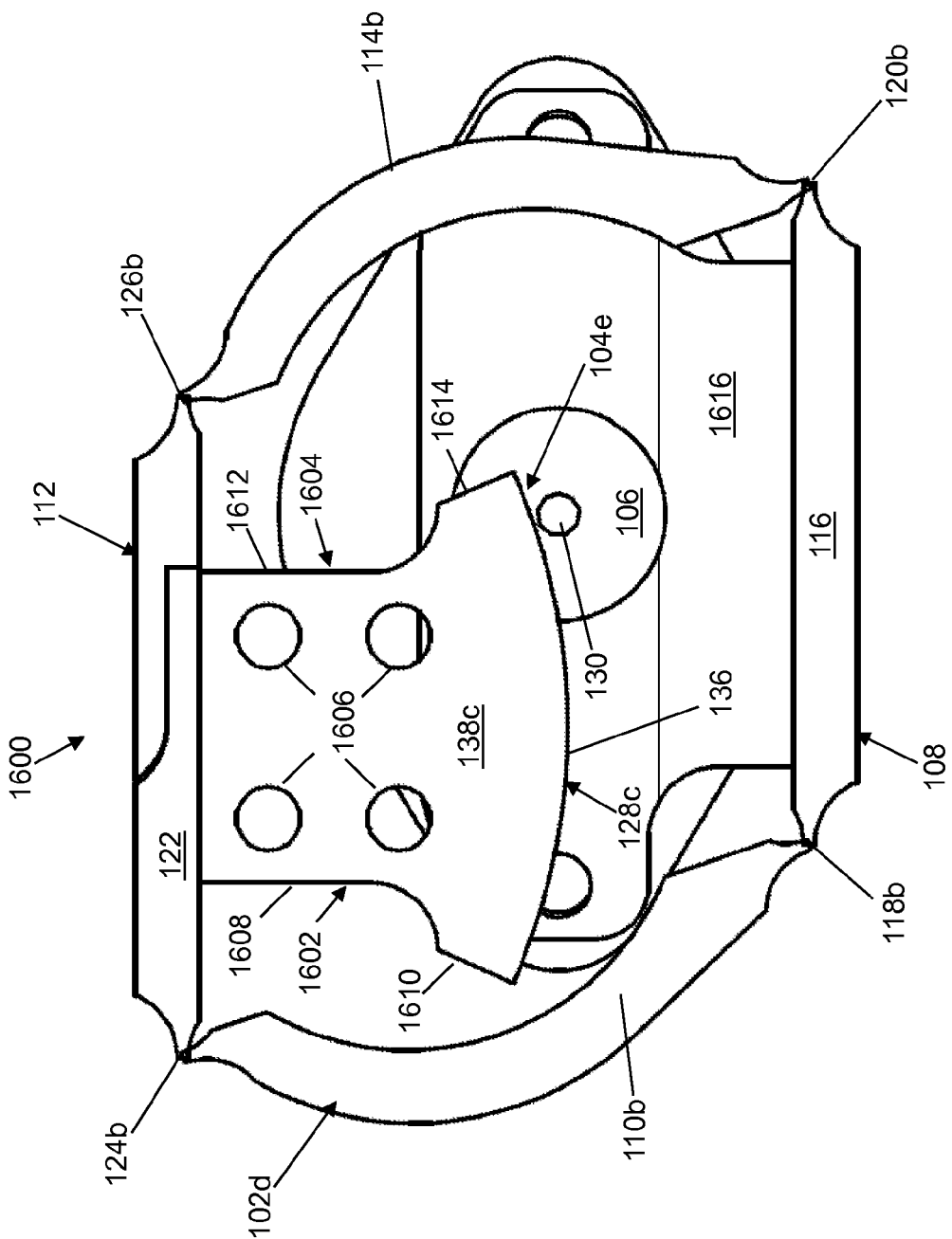
FIG. 16 depicts a front schematic diagram of an actuating device in a translated position in accordance with a seventh illustrative embodiment.
Figure 17A:
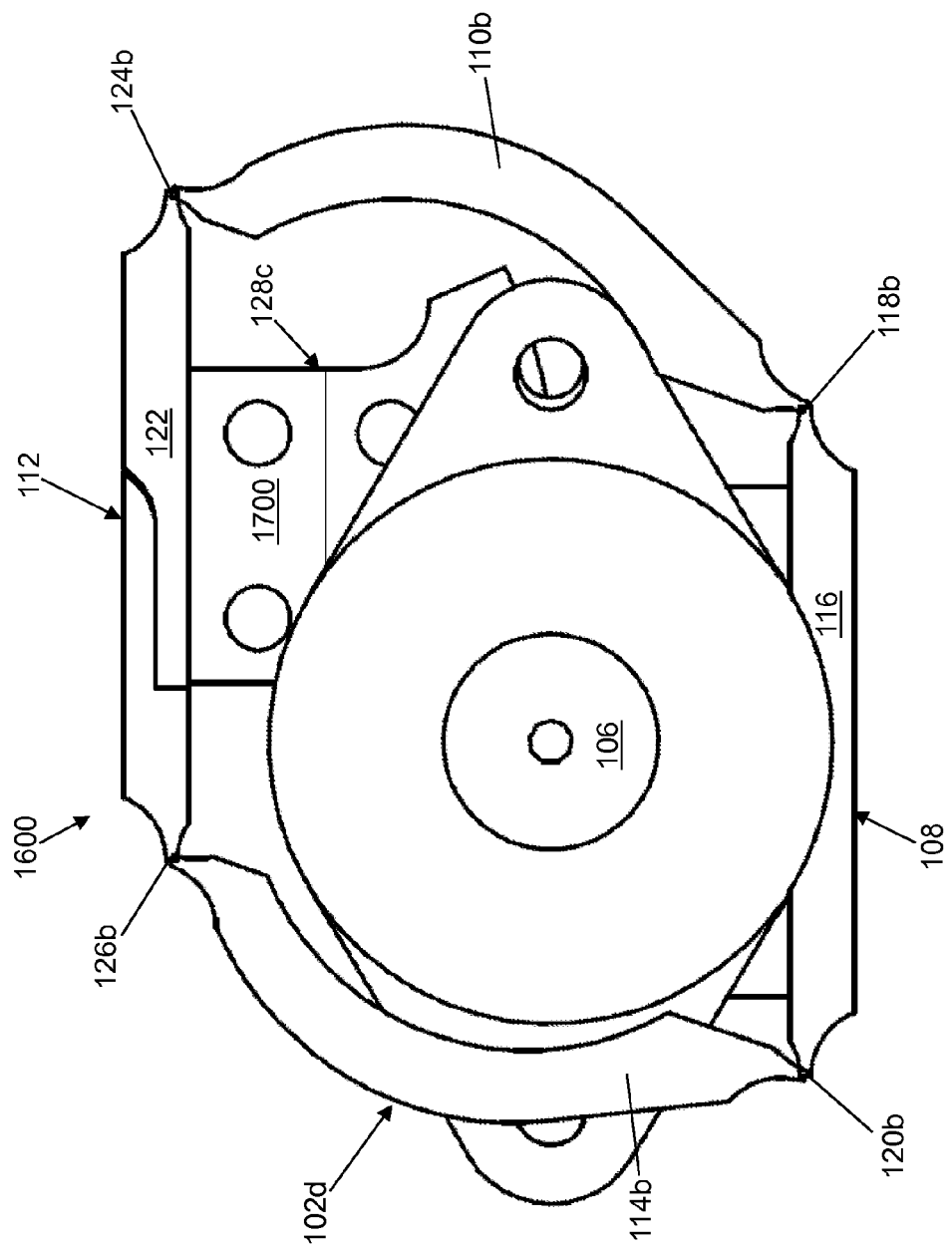
FIG. 17a depicts a back schematic diagram of the actuating device of FIG. 16 in the translated position.
Figure 17B:
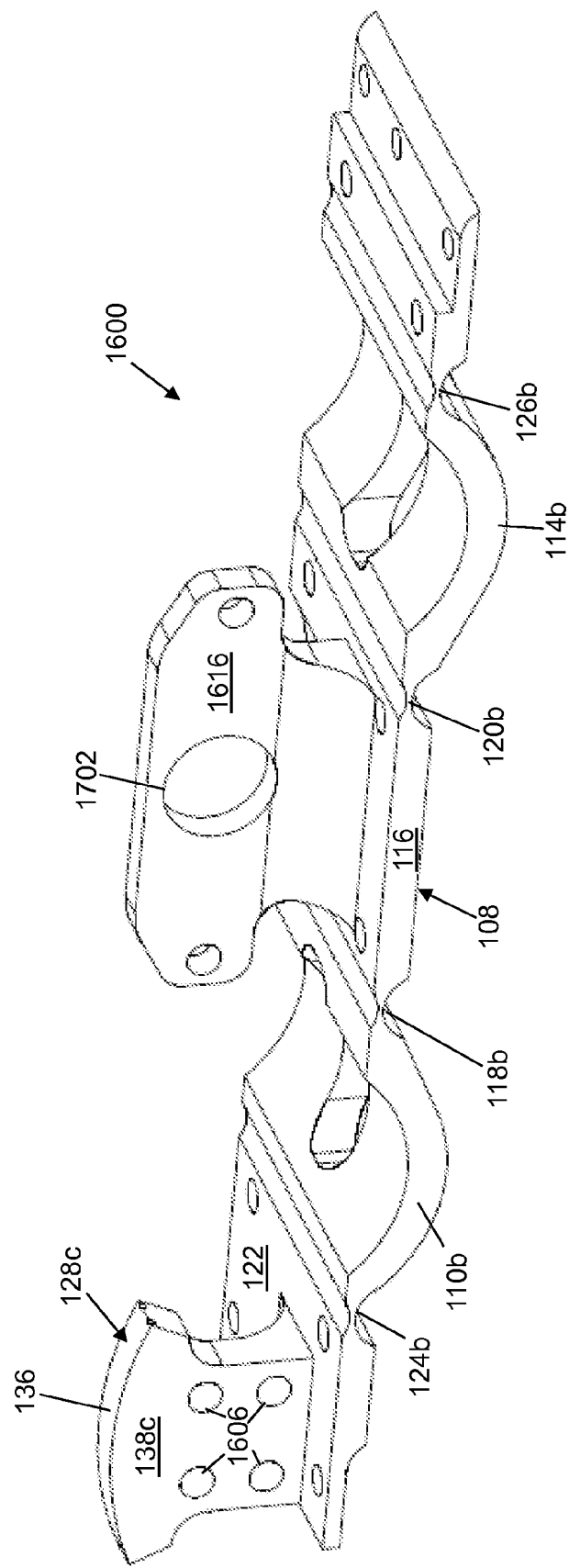
FIG. 17b depicts a disconnected schematic diagram of the actuating device of FIG. 16.

With reference to FIG. 16, a seventh actuating device 1600 is shown in accordance with a seventh illustrative embodiment and in a first translated position. With reference to FIG. 17a, a back schematic view of seventh actuating device 1600 is shown in a first translated position. With reference to FIG. 17b, a disconnected schematic diagram of seventh actuating device 1600 is shown. Seventh actuating device 1600 may include fourth 4-bar linkage 102d, a fifth drive system 104e, and actuator 106. Fourth 4-bar linkage 102d may include base link 108, first curved link 110b, translating link 112, and second curved link 114b. First curved link 110b forms a curved surface between first flexure joint 118b and third flexure joint 124b. Second curved link 114b forms a curved surface between second flexure joint 120b and fourth flexure joint 126b. In the illustrative embodiment of FIG. 16, fifth drive system 104e may include a third drive 128c, shaft 130, and any of the mechanisms for mounting arc surface 136 to shaft 130 discussed herein.

Third drive 128c may include arc surface 136, a third front drive surface 138c, a third side surface 1602, a fourth side surface 1604, and a back drive surface 1700 (shown with reference to FIG. 17a). Third front drive surface 138c, third side surface 1602, fourth side surface 1604, and back drive surface 1700 mount to second translating plate 122b along first edges. Arc surface 136 forms an arc shaped surface and extends between second edges of third front drive surface 138c, third side surface 1602, fourth side surface 1604, and back drive surface 1700. Third drive 128c may be hollow or solid. In the illustrative embodiment of FIG. 16, third front drive surface 138c includes a plurality of holes 1606 used to terminate cable 132. An actuator support wall 1616 extends up from base plate 116 and support actuator 106 and includes a second actuator support surface 1702 (shown with reference to FIG. 17b).

In the illustrative embodiment of FIG. 16, third side surface 1602 includes a seventh attachment side surface 1608 and an eighth attachment side surface 1610 that extends at an arc from seventh attachment side surface 1608. Seventh attachment side surface 1608 extends in a generally perpendicular direction from translating plate 122. Fourth side surface 1604 includes a ninth attachment side surface 1612 and a tenth attachment side surface 1614 that extend at an arc from ninth attachment side surface 1612. Ninth attachment side surface 1612 extends in a generally perpendicular direction from translating plate 122. Eighth attachment side surface 1610 and tenth attachment side surface 1614 form a wedge shape from which arc surface 136 is formed.

Figure 18:
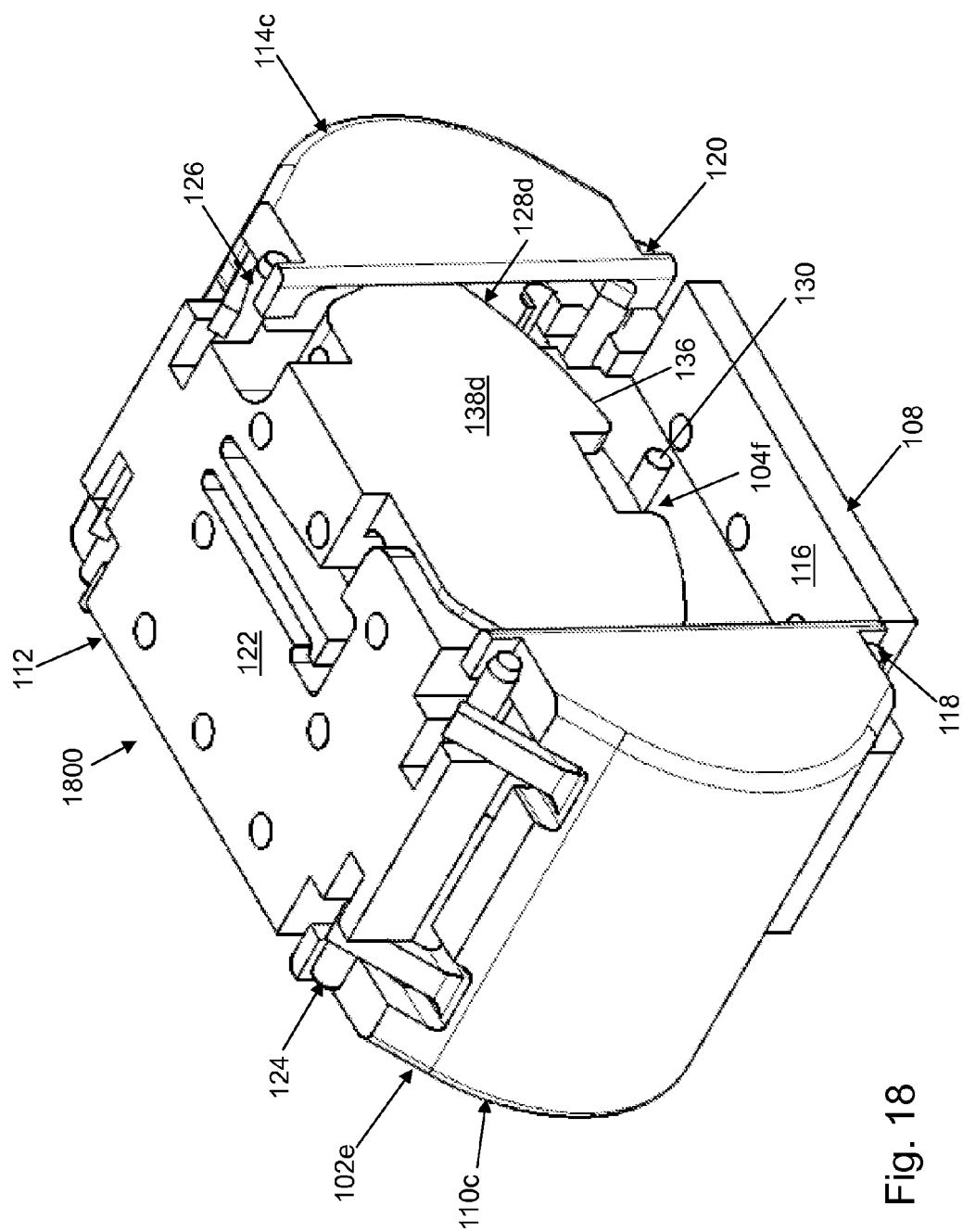
FIG. 18 depicts a side, front perspective diagram of an actuating device in a center position in accordance with an eighth illustrative embodiment.

With reference to FIG. 18, a front, left perspective diagram of an eighth actuating device 1800 is shown in accordance with an eighth illustrative embodiment. Eighth actuating device 1800 may include a fifth 4-bar linkage 102e, a sixth drive system 104f, and actuator 106.

Figure 19:
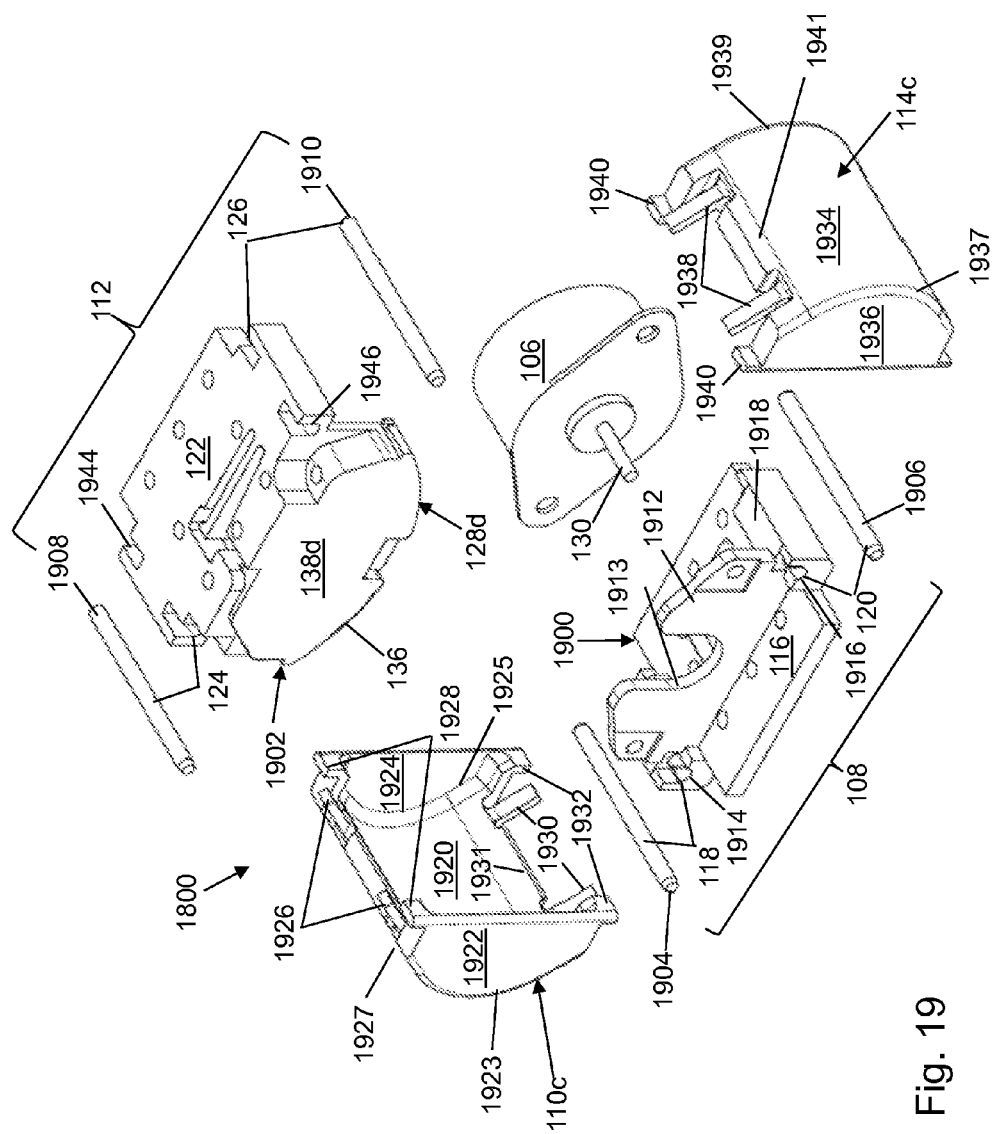
FIG. 19 depicts an exploded diagram of the actuating device of FIG. 18.

With reference to FIG. 19, which shows an exploded view of eighth actuating device 1800, eighth actuating device 1800 may include a base part 1900, a third curved link 110c, a translating part 1902, a fourth curved link 114c, actuator 106, a first shaft 1904, a second shaft 1906, a third shaft 1908, and a fourth shaft 1910. Fifth 4-bar linkage 102e may include base link 108, third curved link 110c, translating link 112, and fourth curved link 114c.

Base part 1900 may include base plate 116, actuator support wall 1912, a first arc shaped socket 1914, a first socket ceiling 2400 (shown with reference to FIG. 24), a second arc shaped socket 1916, and a second socket ceiling 1918. Base link 108 may include base plate 116 that extends between first joint 118 and second joint 120. Base plate 116 is mounted between first joint 118 and second joint 120. First joint 118 may include first shaft 1904, first arc shaped socket 1914, and first socket ceiling 2400. First arc shaped socket 1914 is sized and shaped to hold one end of first shaft 1904. First socket ceiling 2400 is mounted over the middle portion of first shaft 1904 to further hold first shaft 1904 in position. The vertical offset between first arc shaped socket 1914 and first socket ceiling 2400 should be slightly less than the diameter of shaft 1904 to provide a press-fit and prevent shaft 1904 from moving relative to base part 1900. Second joint 120 may include second shaft 1906, second arc shaped socket 1916, and second socket ceiling 1918. Second arc shaped socket 1916 is sized and shaped to hold second shaft 1906. Second socket ceiling 1918 is mounted to extend over at least a portion of second arc shaped socket 1916 to further hold second shaft 1906 in position.

Actuator support wall 1912 is mounted to extend up from base plate 116 in a generally perpendicular direction. Actuator support wall 1912 includes a second actuator support surface 1913 sized and shaped to support actuator 106 relative to arc surface 136 when mounted together to form eighth actuating device 1800. In the illustrative embodiment of FIGS. 18 and 19, actuator support wall 1912 further includes mounting pin holes that align with actuator mounting pin holes to fixedly mount actuator 106 to actuator support wall 1912 which is fixedly mounted to base plate 116. The mounting pin holes may accommodate pins or screws or the like.

Third curved link 110*c* forms a curved surface between first joint 118 and third joint 124 and mounts to base plate 116 at first joint 118 and to translating plate 122 at third joint 124. Fourth curved link 114*c* forms a curved surface between second joint 120 and fourth joint 126. Third curved link 110*c* and fourth curved link 114*c* have the same curvature though mounted to curve in opposite directions. First curved link 110*b* and second curved link 114*b* may be curved to avoid collisions with sixth drive system 104*f* while minimizing the overall size of the assembled device.

In the illustrative embodiment of FIGS. 18 and 19, third curved link 110*c* includes a first curved wall 1920, a third side wall 1922, a fourth side wall 1924, a first pair of retainer clips 1926, a first pair of abutment walls 1928, a second pair of retainer clips 1930, and a second pair of abutment walls 1932. Third side wall 1922 is mounted to extend from first curved wall 1920 along a first edge 1923. Fourth side wall 1924 is mounted to extend from first curved wall 1920 along a second edge 1925 generally opposite first edge 1923. The first pair of retainer clips 1926 extend from a third edge 1927 of first curved wall 1920. A first abutment wall of the first pair of abutment walls 1928 extends from third side wall 1922, and a second abutment wall of the first pair of abutment walls 1928 extends from fourth side wall 1924. The second pair of retainer clips 1930 extend from a fourth edge 1931 of first curved wall 1920. A first abutment wall of the second pair of abutment walls 1932 extends from third side wall 1922, and a second abutment wall of the second pair of abutment walls 1932 extends from fourth side wall 1924. Third shaft 1908 fits within a space defined by the first pair of retainer clips 1926 and the first pair of abutment walls 1928. First shaft 1904 fits within a space defined by the second pair of retainer clips 1930 and the second pair of abutment walls 1932.

In the illustrative embodiment of FIGS. 18 and 19, fourth curved link 114*c* includes a second curved wall 1934, a fifth side wall 1936, a sixth side wall (not shown), a third pair of retainer clips 1938, a third pair of abutment walls 1940, a fourth pair of retainer clips (not shown), and a fourth pair of abutment walls (not shown). Fifth side wall 1936 is mounted to extend from second curved wall 1934 along a first edge 1937. The sixth side wall is mounted to extend from second curved wall 1934 along a second edge 1939 generally opposite first edge 1937. The third pair of retainer clips 1938 extend from a third edge 1941 of second curved wall 1934. A first abutment wall of the third pair of abutment walls 1940 extends from fifth side wall 1936, and a second abutment wall of the third pair of abutment walls 1940 extends from the sixth side wall. The fourth pair of retainer clips extends from a fourth edge (not shown) of second curved wall 1934. A first abutment wall of the fourth pair of abutment walls extends from third side wall 1936, and a second abutment wall of the fourth pair of abutment walls extends from the sixth side wall. Fourth shaft 1910 fits within a space defined by the third pair of retainer clips 1938 and the third pair of abutment walls 1940. Second shaft 1906 fits within a space defined by the fourth pair of retainer clips and the fourth pair of abutment walls.

The retainer clips 1926, 1930, 1938 may be designed to provide a pre-load force large enough to withstand any expected interaction forces without exceeding the yield strength of the material. For example, retainer clips 1926, 1930, 1938 may be pre-loaded in two directions, a first direction is against shaft 130 to prevent motion perpendicular to shaft 130, and a second direction is against an outer wall of the socket ceiling to prevent motion along the axis of shaft 130. In addition, to minimize parasitic frictional forces, the pre-load forces may not be much larger than required for withstanding these interaction forces. A lubricant can be added to the retainer clips 1926, 1930, 1938 or shafts 1904, 1906, 1908, 1910 to reduce friction, or an additive, such as perfluoropolyether (PFPE) synthetic oil, PTFE (Polytetrafluoroethylene), silicone, molybdenum disulfide, or graphite, can be used during a molding process to provide internal lubrication. Alternatively, the pairs of abutment walls 1928, 1932, 1940 and retainer clips 1926, 1930, 1938 can be replaced with simple precision holes with a slip-fit tolerance relative to the shafts 1904, 1906, 1908, 1910. In this case, an additional manufacturing step or tightly controlled injection molding process may be used to make the hole, and a small amount of backlash may result, though the joint should be able to withstand a greater range of interaction forces.

In the illustrative embodiment of FIGS. 18 and 19, sixth drive system 104*f* may include a fourth drive 128*d*, shaft 130, and any of the mechanisms for mounting arc surface 136 to shaft 130 discussed herein. Translating part 1902 may include translating plate 122, fourth drive 128*d*, a third arc shaped socket 1944, a third socket ceiling 2020 (shown with reference to FIG. 20), a fourth arc shaped socket 1946, and a fourth socket ceiling 2022 (shown with reference to FIG. 20). Translating link 112 may include translating plate 122 that extends between third joint 124 and fourth joint 126. Third joint 124 may include third shaft 1908, third arc shaped socket 1944, and third socket ceiling 2020. Third arc shaped socket 1944 is sized and shaped to hold third shaft 1908. Third socket ceiling 2020 is mounted over the middle portion of third shaft 1908 to further hold third shaft 1908 in position. Fourth joint 126 may include fourth shaft 1910, fourth arc shaped socket 1946, and fourth socket ceiling 2022. Fourth arc shaped socket 1946 is sized and shaped to hold fourth shaft 1910. Fourth socket ceiling 2022 is mounted to over the middle portion of fourth shaft 1910 to further hold fourth shaft 1910 in position.

First shaft 1904 is inserted in first arc shaped socket 1914 below first socket ceiling 2400 and between the second pair of retainer clips 1930, and the second pair of abutment walls 1932 to mount base part 1900 to third curved link 110*c*. Second shaft 1906 is inserted in second arc shaped socket 1916 below second socket ceiling 1918 and between the fourth pair of retainer clips, and the fourth pair of abutment walls to mount base part 1900 to fourth curved link 114*c*. Third shaft 1908 is inserted in third arc shaped socket 1944 below third socket ceiling 2020 and between the first pair of retainer clips 1926, and the first pair of abutment walls 1928 to mount translating part 1902 to third curved link 110*c*. Fourth shaft 1910 is inserted in fourth arc shaped socket 1946 below fourth socket ceiling 2022 and between the third pair of retainer clips 1938, and the third pair of abutment walls 1940 to mount translating part 1902 to fourth curved link 114*c*.

Figure 22:
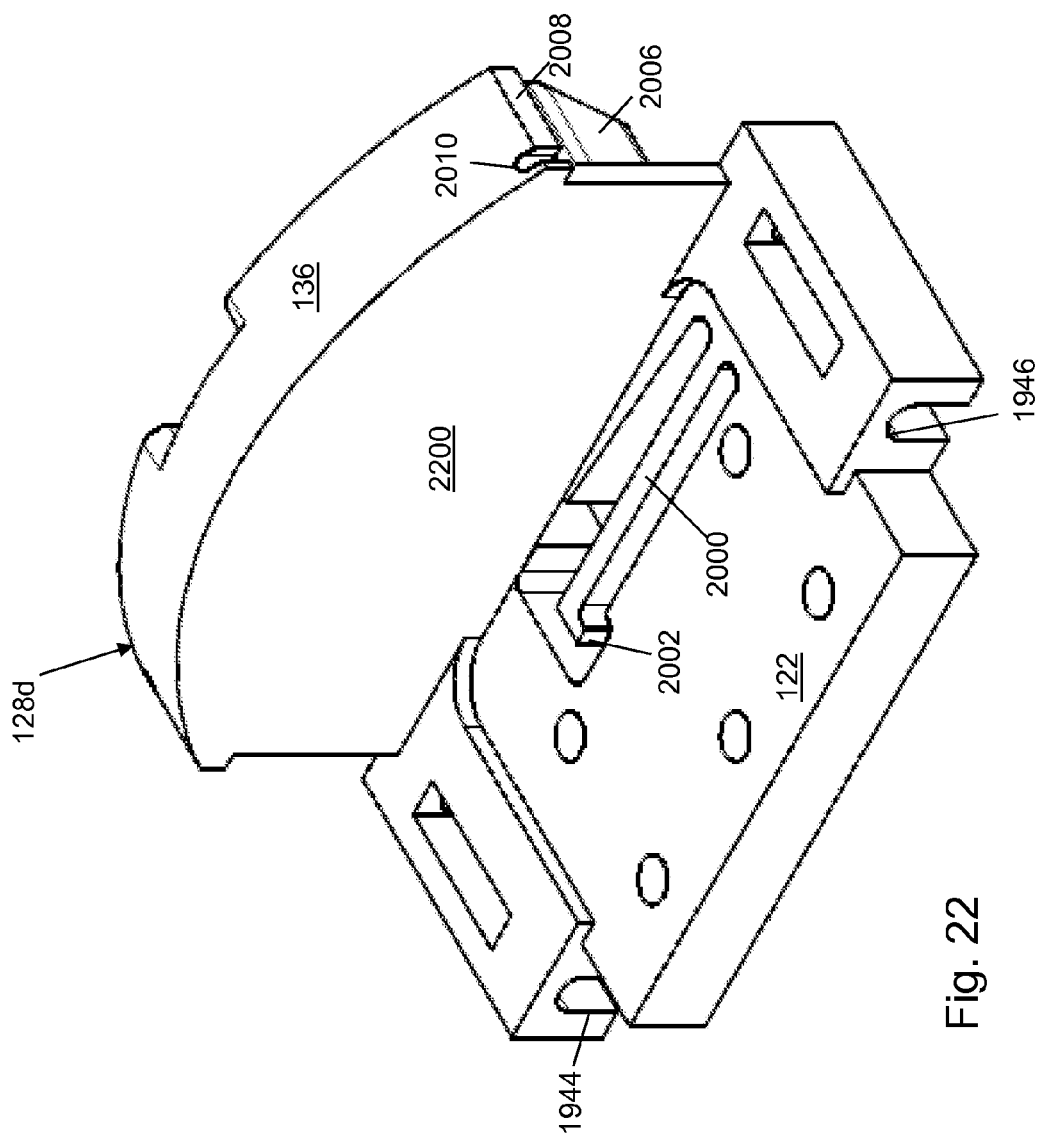
FIG. 22 depicts a right, bottom, back perspective diagram of the translating part of the actuating device of FIG. 18.

With reference to FIGS. 20-22, an enlarged view of translating part 1902 is provided. FIG. 20 depicts a right, top, front perspective diagram of translating part 1902. FIG. 21 depicts a left, top, front perspective diagram of translating part 1902. FIG. 22 depicts a right, bottom, back perspective diagram of translating part 1902.

Translating plate 122 may include an integral flexure spring 2000 cut through the surface of translating plate 122. Fourth drive 128*d* is mounted to extend down from translating plate 122 in a generally perpendicular direction. Fourth drive 128*d* may include arc surface 136, a fourth front drive surface 138*d*, a fifth side surface 2100 (shown with reference to FIG. 21), a sixth side surface 2006, and a second back drive surface 2200 (shown with reference to FIG. 22). Fourth drive 128*d* may be hollow or solid.

In an illustrative embodiment, cable 132, as described with reference to FIGS. 7 and 8, is used in sixth drive system 104*f* to mount fourth drive 128d to shaft 130. A first end of cable 132 is mounted to a tip 2002 of integral flexure spring 2000. A second end of cable 132 is mounted to a termination hole 2004 cut in sixth side surface 2006. Between tip 2002 and termination hole 2004, cable 132 extends along fifth side surface 2100, through a first notch 2102 cut in a first edge 2104 (shown with reference to FIG. 21) of fifth side surface 2100, along a first portion of arc surface 136, around shaft 130, along a second portion of arc surface 136, through a second notch 2010 cut in a first edge 2008 of sixth side surface 2006, and along sixth side surface 2006. Arc surface 136 forms an arc shaped surface and extends between an edge of fourth front drive surface 138d, first edge 2104 of fifth side surface 2100, first edge 2008 of sixth side surface 2006, and an edge of second back drive surface 2200.

Figure 23:
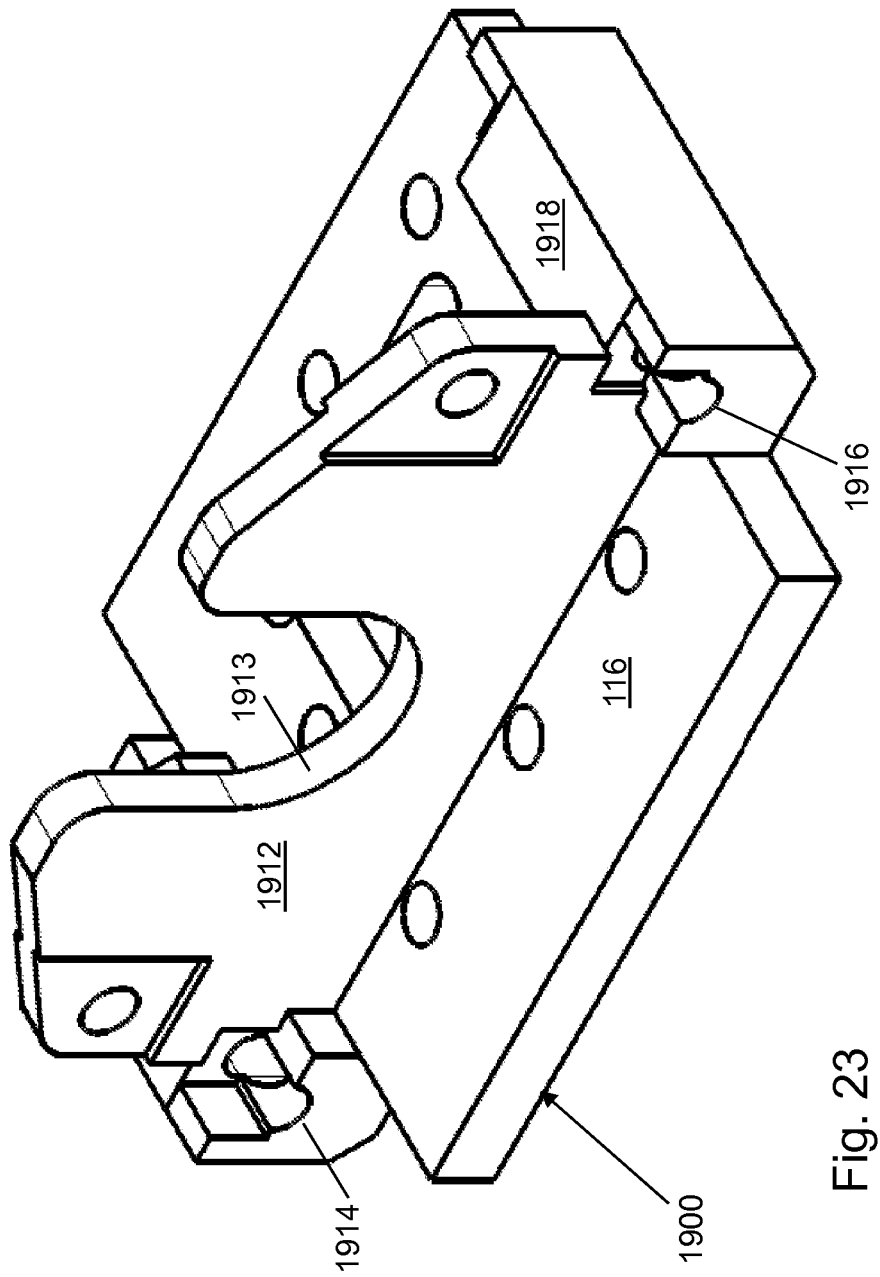
FIG. 23 depicts a right, top, front perspective diagram of a base part of the actuating device of FIG. 18.
Figure 24:
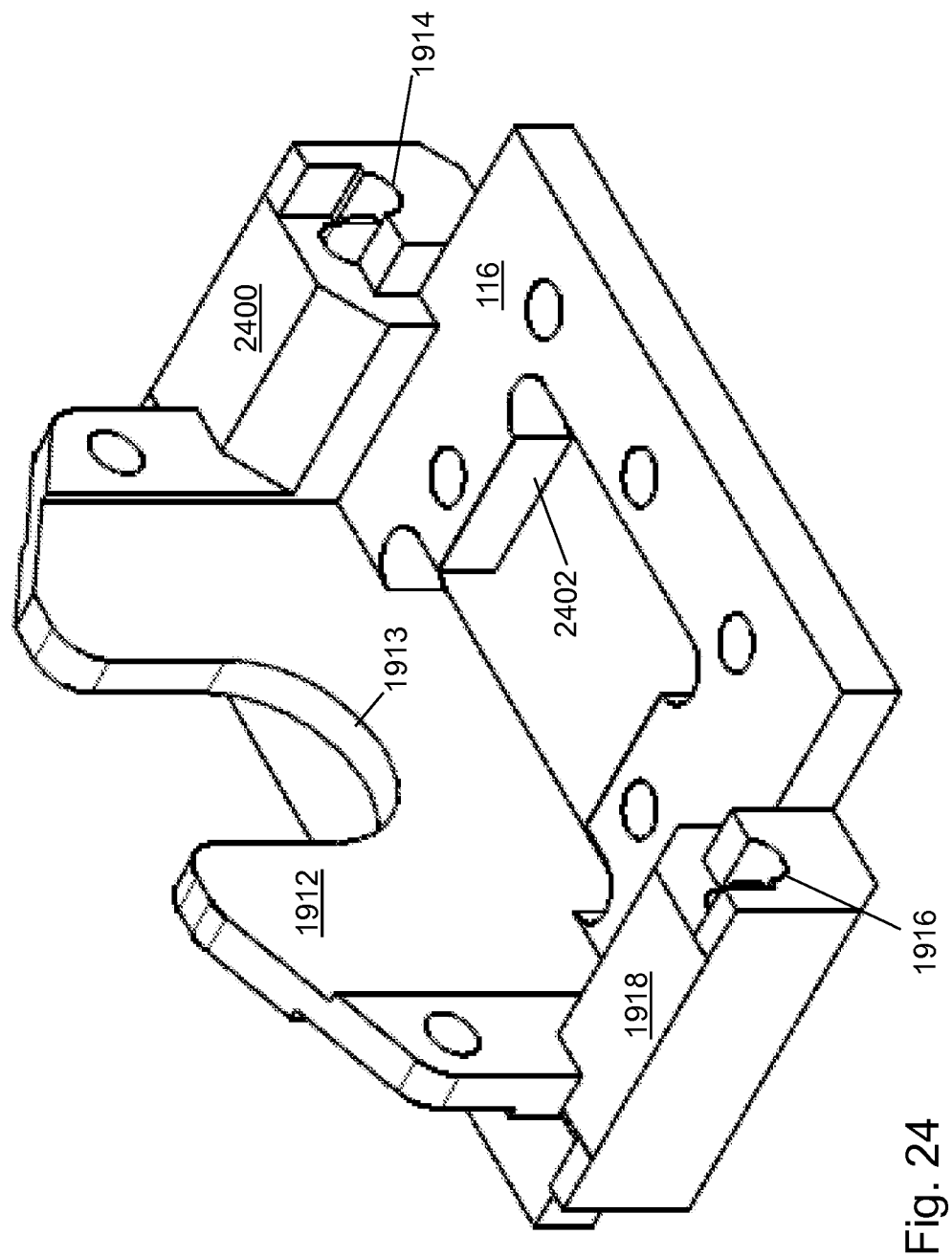
FIG. 24 depicts a right, top, back perspective diagram of the base part of the actuating device of FIG. 18.

With reference to FIGS. 23 and 24, an enlarged view of base part 1900 is provided. FIG. 23 depicts a right, top, front perspective diagram of base part 1900. FIG. 24 depicts a right, top, back perspective diagram of base part 1900. Base plate 116 may include an actuator cutout 2402 cut through the surface of base plate 116 and sized and shaped to hold actuator 106 in position relative to base link 108. Actuator 106 can be mounted to base plate 116 using fasteners, adhesives, ultrasonic welding, etc. Actuator cutout 2402 may further provide an exit pathway for routing of electrical cables.

As an example, eighth actuating device 1800 can be used where a small, low-cost device for precision motion with low interaction forces is desired. Fifth 4-bar linkage 102e may be designed to be injection molded out of acrylonitrile butadiene styrene or similar plastic material using low-cost straight-pull molds. The shafts 1904, 1906, 1908, 1910 of first joint 118, second joint 120, third joint 124, and fourth joint 126, respectively, may be formed of standard mass-produced precision ground dowel pins. Actuator 106 may comprise a stepper motor such as a Portescap 26M048B1B or similar low-cost motor capable of microstepping operation. Press-fit holes for the shafts 1904, 1906, 1908, 1910 of first joint 118, second joint 120, third joint 124, and fourth joint 126, respectively, may be provided on base plate 116 and translating plate 122. Alternatively, the shafts 1904, 1906, 1908, 1910 of first joint 118, second joint 120, third joint 124, and fourth joint 126, respectively, can be inserted into the mold prior to the injection molding process and molded in place.

Eighth actuating device 1800 includes features for preloading and routing cable 132. Cable 132 is first looped around tip 2002 of integral flexure spring 2000, routed around two corners of fifth side surface 2100, and through first notch 2102 leading to arc surface 136. Cable 132 is then wrapped along arc surface 136, wrapped several times around shaft 130, then through second notch 2010. Cable 132 is then pulled tight such that integral flexure spring 2000 deflects by the desired amount and clamped in place by tightening a screw inserted into termination hole 2004. Integral flexure spring 2000 simplifies manufacturing and assembly, but may creep over time depending on the part material and environmental conditions. A metal leaf spring or extension spring may be used instead of integral flexure spring 2000, either molded in place or installed during assembly. If cable 132 has sufficient compliance and low enough creep or stretch over time, a separate spring may not need to be used.

First joint 118, second joint 120, third joint 124, and fourth joint 126 connect the links 108, 110c, 112, and 114c such that the angles of the parallelogram can be deflected by a large amount, for example up to +/−45 degrees. The motion range of eighth actuating device 1800, assuming a +/−45 degree angle range, is approximately 1.4 times the length of the "side" links, third curved link 110c and fourth curved link 114c of fifth 4-bar linkage 102e, which is much larger than the motion range obtainable using a similarly sized leaf-spring flexure device and approaches that of a serial link manipulator with equivalent link lengths.

For some applications of the actuating devices described herein, the relative or absolute position and/or movement between base link 108, first link 110, translating link 112, and second link 114 may be sensed. For example, a rotation of shaft 130 may be sensed using a standard optical encoder, resolver, hall sensors, or other rotational position sensor.

A sensorless electronic technique may also be used to determine the actuator position. Example sensorless techniques are further described in U.S. Pat. No. 6,885,970 titled "Saliency Based Position Estimation in Permanent Magnet Synchronous Motors" and the paper Bendjedia, M. et al, "DSP Implementation of Rotor Position Detection Method for Hybrid Stepper Motors", 2006 Power Electronics and Motion Control Conference, Vol. 3, 1-5 (Aug. 13-16, 2006).

Additionally, it may be desirable to directly sense the position, for example, of translating link 112 relative to base link 108. For example, the simpler cabling scheme of FIGS. 7 and 8 may be preferred, but slippage of cable 132 on shaft 130 might need to be detected to provide precise control of a tool mounted to actuating device 100 (or any of the other illustrative embodiments). In this case, a sensing target can be provided on a surface of base link 108, on a surface of first link 110, on a surface of translating link 112, on a surface of second link 114, on a surface of drive 128, and/or on a surface of actuator 106. A sensor structured to detect a variation in a sensed parameter across the surface of the sensing target may be mounted appropriately to actuating device 100.

Figure 25:
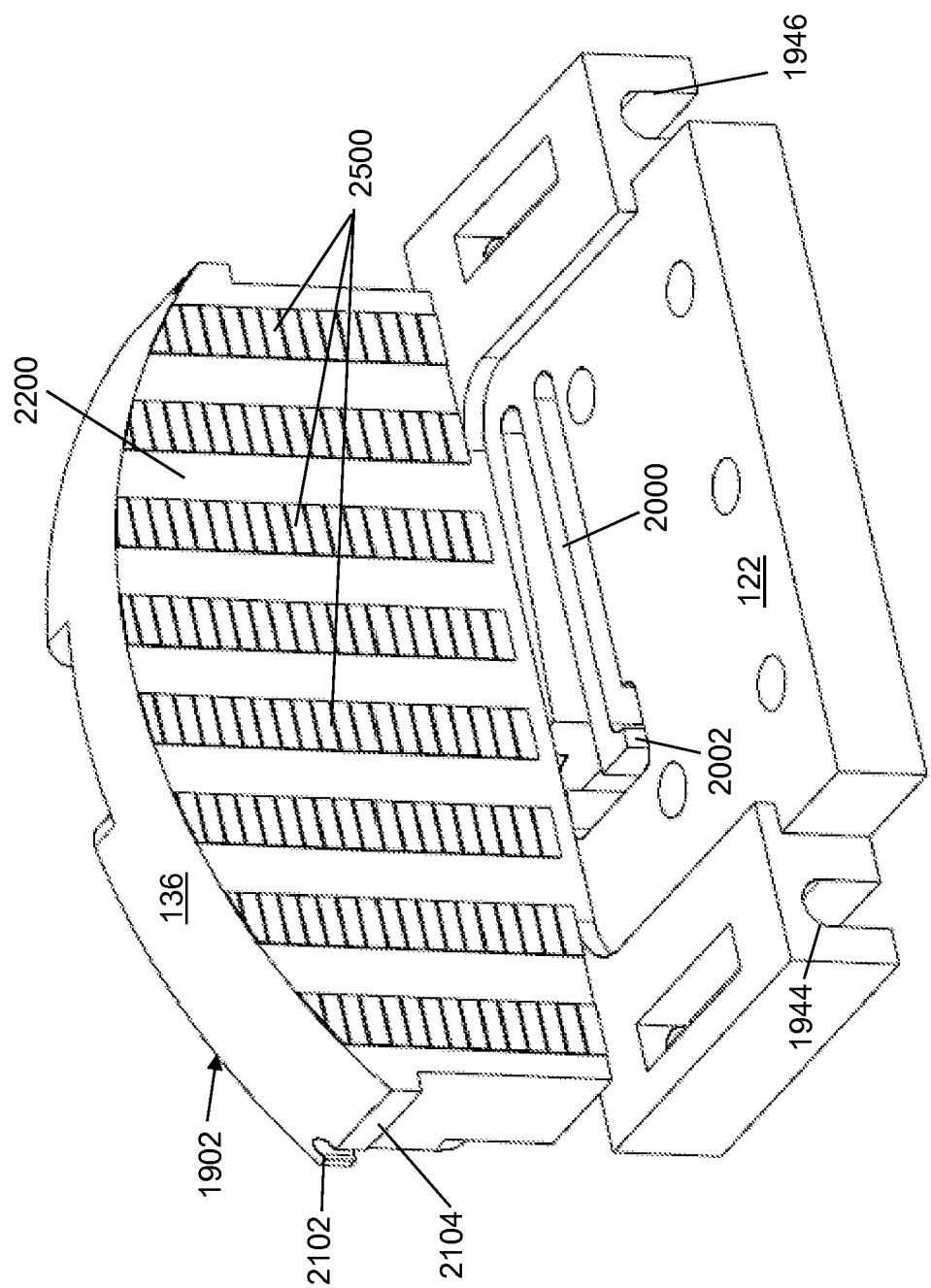
FIG. 25 depicts a right, bottom, back perspective diagram of the translating part of the actuating device of FIG. 18 with encoder markings in accordance with a first illustrative embodiment.
Figure 26:
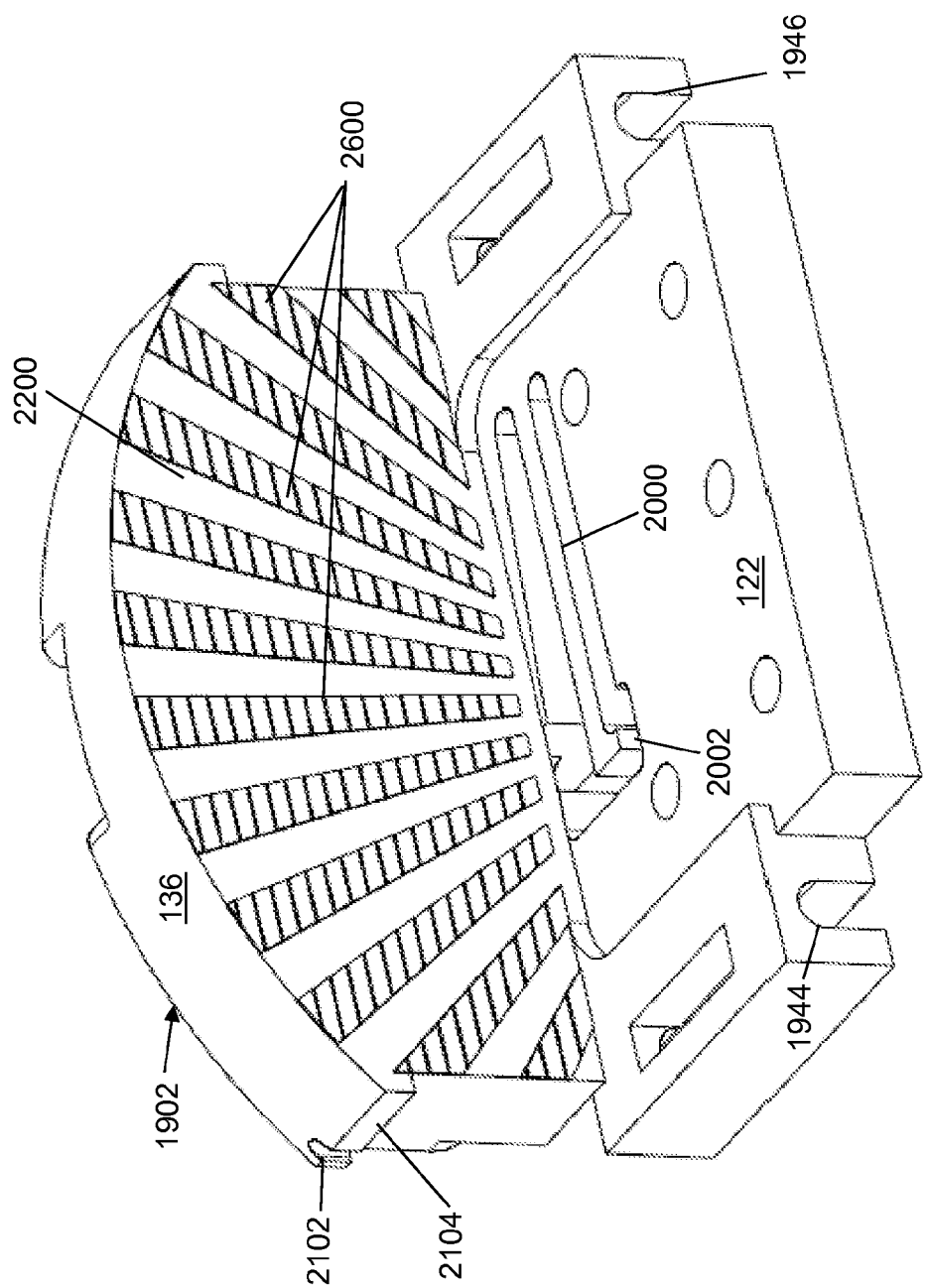
FIG. 26 depicts a right, bottom, back perspective diagram of the translating part of the actuating device of FIG. 18 with encoder markings in accordance with a second illustrative embodiment.

For example, a sensing target may be provided on second back surface 2200 and a sensor mounted near a face of actuator 106 on base link 108, preferably centered above shaft 130. With reference to FIG. 25, a right, bottom, back perspective diagram of translating part 1902 is shown with first encoder markings 2500 on second back surface 2200. With reference to FIG. 26, a right, bottom, back perspective diagram of translating part 1902 is shown with second encoder markings 2600 on second back surface 2200. If it is desirable for the sensor to measure the linear translational motion of actuator 106, a linear scale such as that provided by first encoder markings 2500 may be used. However, if it is desirable to measure the translational motion along the arc traversed, a rotational scale such as that provided by second encoder markings 2600 may be used. Use of first encoder markings 2500 and/or second encoder markings 2600 vary periodically to provide a local position reading. An example sensor includes a reflective optical sensor such as that as AEDR series encoder marketed by Avago Technologies or ChipEncoder marketed by MicroE Systems®.

A continuously varying scale may be provided on the surface of base link 108, on the surface of first link 110, on the surface of translating link 112, on the surface of second link 114, on the surface of drive 128, and/or on the surface of actuator 106 to detect an absolute position. For example, a continuously varying grayscale or color scale may be provided as encoder markings on second back surface 2200. The "color" detected by a reflectance sensor corresponds to an absolute position reading.

Of course, motion, including a direction of motion can be sensed as well based on the sensor absolute/local position determinations and time or may be determined using sensors structured to measure velocity/acceleration directly.

While the linear translational displacement and arc translational displacement are related by a simple relation, it may be preferable to sense one or the other of them directly, for example, to simplify controller computations or maximize sensor resolution. Depending on the type of sensor, first encoder markings 2500 and second encoder markings 2600 may take the form of an adhesive-backed printed pattern, a precision fine-pitch pattern on a plastic or glass scale, an alternating pole magnetic sheet, physical grooves molded into second back surface 2200, a series of ferromagnetic or metallic teeth, alternating materials with varying electrical conductivity or electric permittivity, etc. Thus, a variety of physical characteristics may be provided on the surface of base link 108, on the surface of first link 110, on the surface of translating link 112, on the surface of second link 114, on the surface of drive 128, and/or on the surface of actuator 106 to detect a position/motion of actuating device 100 including a magnetic field strength, a magnetic field direction, a magnetic reluctance, an inductance, a capacitance, a resistance, an optical reflectance, etc. Other types of sensors may be used as well. For example, a radar type or laser interferometric sensor may be used to detect a position or motion of base link 108, of first link 110, of translating link 112, of second link 114, of drive 128, and/or of actuator 106.

Figure 30A:
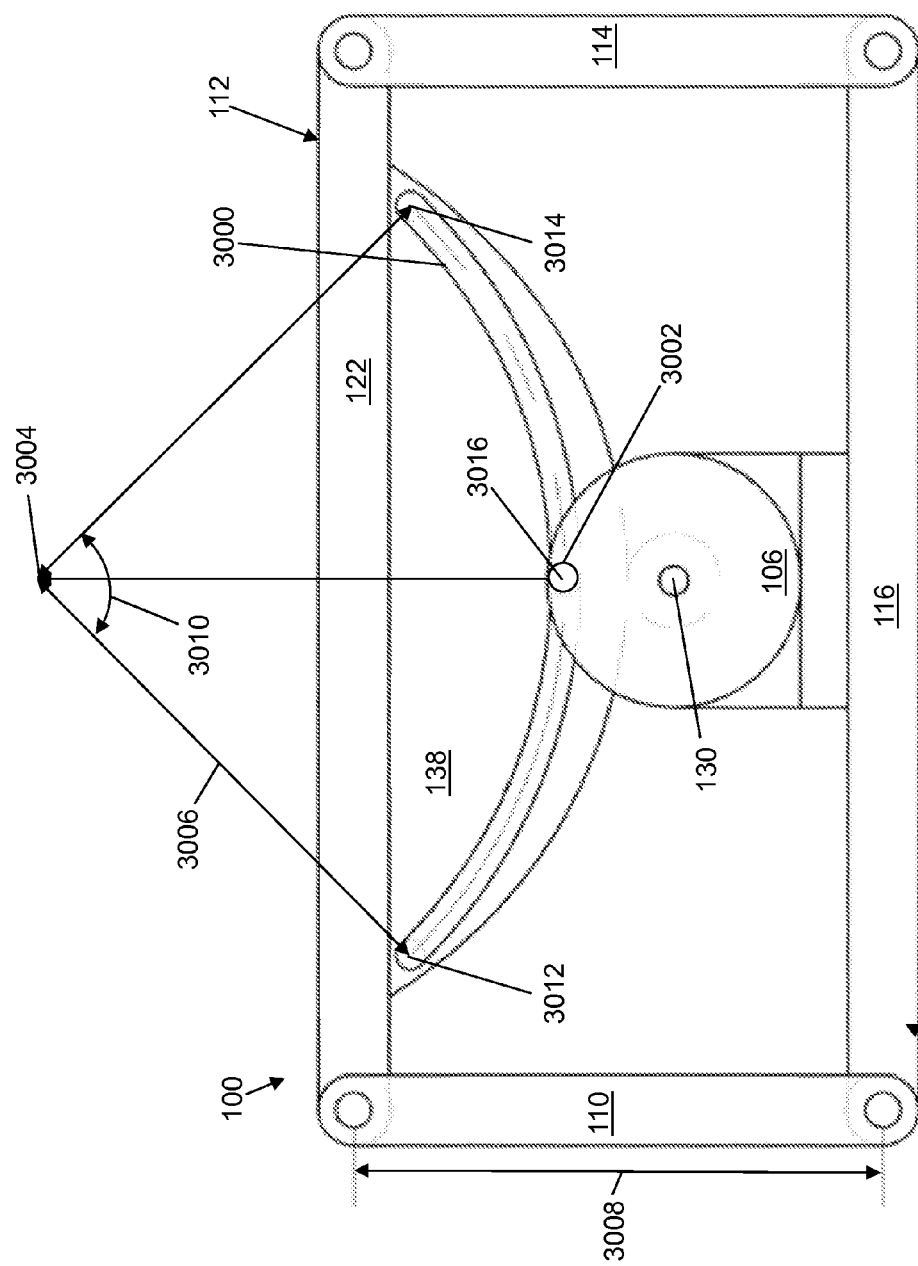
FIG. 30a depicts the front schematic diagram of the actuating device of FIG. 1 in a center position with encoder markings in accordance with a third illustrative embodiment.

In order to reduce costs, it may be desirable to have a sensor scale or target that only covers the minimally required sensing area. This sensing area is easily determined. For example, FIG. 30*a* shows actuating device 100 in a center position with a sensor target 3000 and a sensor 3002. Sensor target 3000 is mounted to front drive surface 138 to form an arc of a circle having a center 3004 and a radius 3006. First link 110 and second link 114 of actuating device 100 have a length 3008 that is approximately equal to radius 3006.

Sensor target 3000 subtends an angle 3010 between a leftmost position 3012 and a rightmost positioned 3014 on either side of a center position 3016. Sensor target 3000 may be encoded in a variety of ways including those described previously as well as other encoding methods as understood by a person of skill in the art.

Sensor 3002 is mounted to base link 108 or actuator 106 preferably above shaft 130. Sensor 3002 is mounted to align with center position 3016 of sensor target 3000 when actuating device 100 is translated to the center position shown with reference to FIG. 30*a*. Sensor 3002 is configured and pointed to detect the encoded characteristic of sensor target 3000 as actuating device 100 translates causing sensor 3002 to align with different positions along sensor target 3000.

Figure 30B:
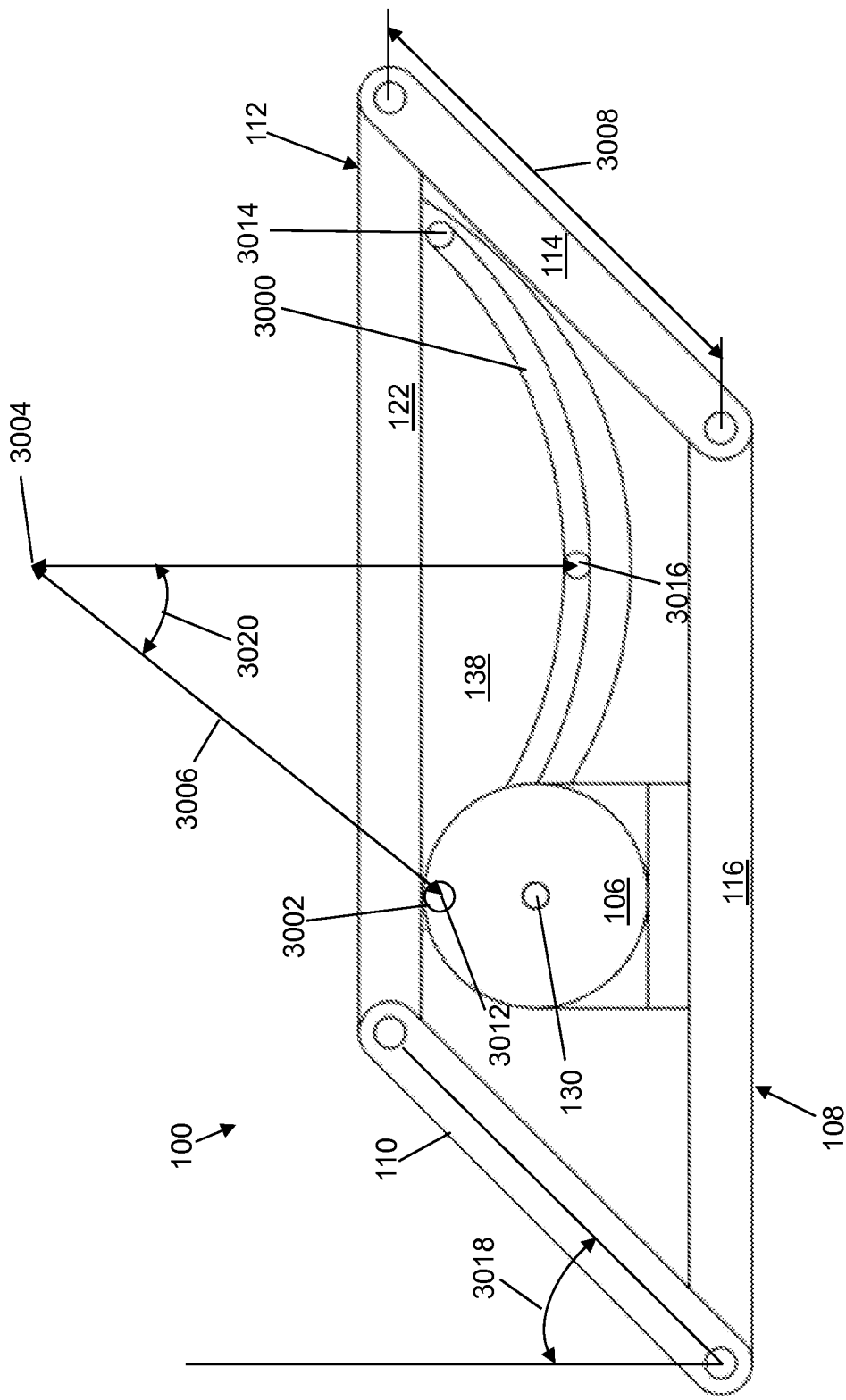
FIG. 30b depicts the front schematic diagram of the actuating device of FIG. 1 in a first translated position with the encoder markings in accordance with the third illustrative embodiment.

With reference to FIG. 30*b*, actuating device 100 is shown with first link 110 and second link 114 rotated to a maximum angle 3018. Maximum angle 3018 is approximately equal to half of angle 3010 and is further equal to half angle 3020. Of course, first link 110 and second link 114 of actuating device 100 also have an angular range of motion equal to maximum angle 3018 in the opposite direction. In the illustrative embodiment of FIG. 30, sensor target 3000 has a round viewing area though other shaped viewing areas may be implemented.

As first link 110 and second link 114 rotate by an amount equal to +/−maximum angle 3018, actuating device 100 moves over its range of motion, and sensor 3002 sweeps along the arc formed by sensor target 3000. The swept area of sensor 3002 is the well-known Minkowski sum of the arc and sensor viewing area. The swept area is the minimal area covered by sensor target 3000 to provide sensing over the entire range of motion of actuating device 100.

In some cases a plurality of sensors may be used. For example, a first sensor may be configured to detect a position or motion of a sensing target attached to shaft 130, while a second sensor may be configured to detect a position of translating link 112. As another example, a sensor configured to detect both a distance and another sensed property is combined with at least one other sensor to recover distance to indicate sensor errors or deflections of the sensed link relative to the link on which the sensor is mounted.

Some sensors are sensitive to the gap between the sensor and the target being sensed, for example, by detecting the root-mean-squared amplitude of a pair of quadrature outputs of a reflective optical sensor, and not just the quadrature angle. This gap may vary based on manufacturing tolerances, but will also change based on transverse flexing of the 4-bar linkage, reflecting interaction forces. For applications where multiple actuators of this type are stacked in differing directions, combining the multiple gap measurements can serve as a crude multi-axis low-cost force or collision detection.

A variety of control techniques may be used. For example, a feedback signal may be generated by a sensor for closed-loop control of actuator 106, a feedback signal may be generated by a sensor for fault detection and open-loop control of actuator 106, a feedback signal may be generated by a sensor for compensating for imperfections in the transmission (e.g. gear backlash, cable slip, cable stretch, etc) as understood by a person of skill in the art. Example control techniques are further described in U.S. Pat. No. 7,683,565 titled Method and Apparatus for Controlling a Haptic Device.

If actuator 106 is used in an application where it will experience a constant load force, for example, a gravity load, a counterbalance can be installed to reduce the torque requirements of actuator 106. This counterbalance may be a hanging weight on a pulley, a constant force spring, a linear spring, etc.

For some scientific and medical applications, it may be desirable to fabricate the described actuating devices out of components that can withstand steam autoclaving. For example, the 4-bar linkage and drive can be fabricated out of stainless steel, anodized aluminum, or a high-temperature plastic such as polyetherimide or polypropylene. The joints can be polypropylene "living hinges", high-temperature plastic bushings, or stainless steel ball bearings. Similar to commercially available autoclavable motors, actuator 106 should be sealed with corrosion-resistant outer surfaces and have high temperature magnets, wiring, and electronic components. Any sensors should be able to withstand high temperatures and humidity (e.g. hall sensors detecting the position of high-temperature magnets). Cable 132 may formed of material that is resistant to corrosion and high temperatures, such as stainless steel, tungsten, or liquid crystal polymer (Vectran).

For high-volume, low-cost applications, the described actuating devices can be fabricated with integral "living hinges" with the base link, the translating link, and the two side links formed as a single injection molded part, such as that shown in FIG. 17*b*. Note that the designs shown in FIGS. 16-26 do not show draft angles (slopes) on vertical and other walls necessary for straight-pull injection molding, but could be easily adapted by one skilled in the art. Where many operational cycles are desired, a high fatigue resistant polymer may be used, such as polyethylene or polypropylene. Gear teeth used to form arc surface 136 could be designed into the molds, eliminating the need for a separate part, and resulting in an actuating device with only three easy to assemble low-cost components: an injection molded flexure with integral hinges and drive gear teeth, actuator 106 such as a stepper motor with integral shaft 130, and a pinion gear for shaft 130.

Figure 27:
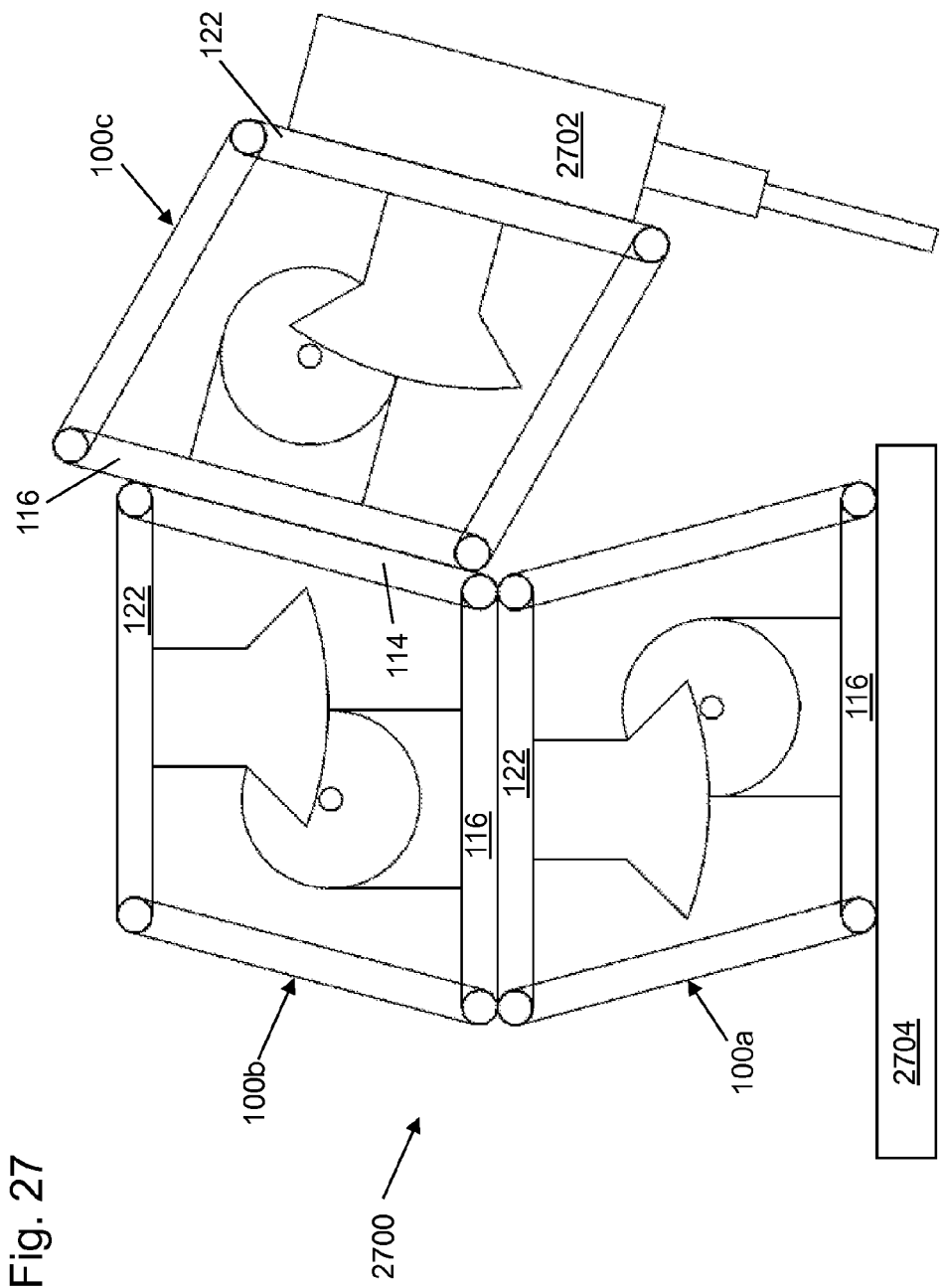
FIG. 27 depicts a front schematic diagram of a plurality of the actuating devices of FIG. 1 arranged to control a position and an orientation of a tool within a plane in accordance with an illustrative embodiment.

For applications where it is desirable to both translate and reorient an object, the described actuating devices can be used as rotational actuators by using one of the side links of the 4-bar linkage as the output link. For example, with reference to FIG. 27, a combined actuating device 2700 may include a first actuating device 100a, a second actuating device 100b, and a third actuating device 100c. First actuating device 100a, second actuating device 100b, and third actuating device 100c are mounted to control the position and orientation of tool 2702 within a plane, with second actuating device 100b providing the orientation control. Thus, the described actuating devices are well suited for use as modular actuating devices that can be combined and configured at assembly for rotational or translational use.

Additionally, any link of the 4-bar linkages described herein may be mounted to a surface external to the 4-bar linkage such that the link moves with the external surface. For example, as shown with reference to FIG. 27, base plate 116 of first actuating device 100a is indicated as mounted to an external surface 2704. Base plate 116 of second actuating device 100b is indicated as mounted to translating plate 122 of first actuating device 100a, which is external to the 4-bar linkage of second actuating device 100b. Base plate 116 of third actuating device 100c is indicated as mounted to second link 114 of second actuating device 100b, which is external to the 4-bar linkage of third actuating device 100c. External surface 2704, of course, may be fixed or moveable or mounted to another object that is moveable. Thus, actuating device 100 may have mounting features on up to all four links such that actuating device 100 can be installed by the user or system integrator in a variety of configurations.

Figure 28B:
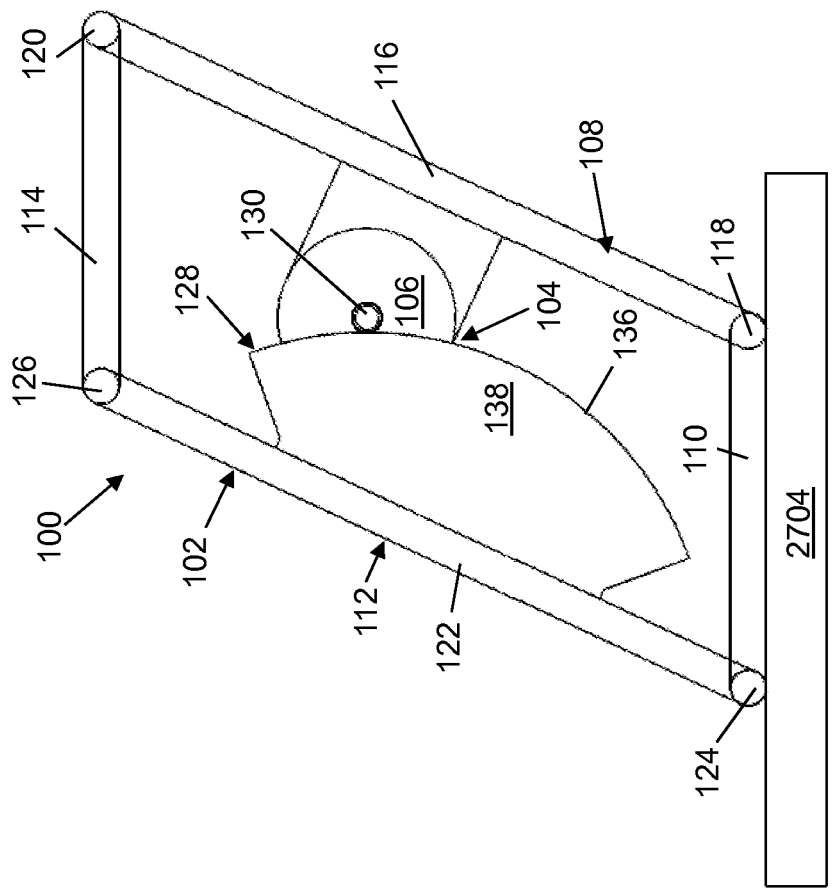
FIG. 28b depicts the front schematic diagram of the actuating device of FIG. 28a in a first translated position.
Figure 28A:
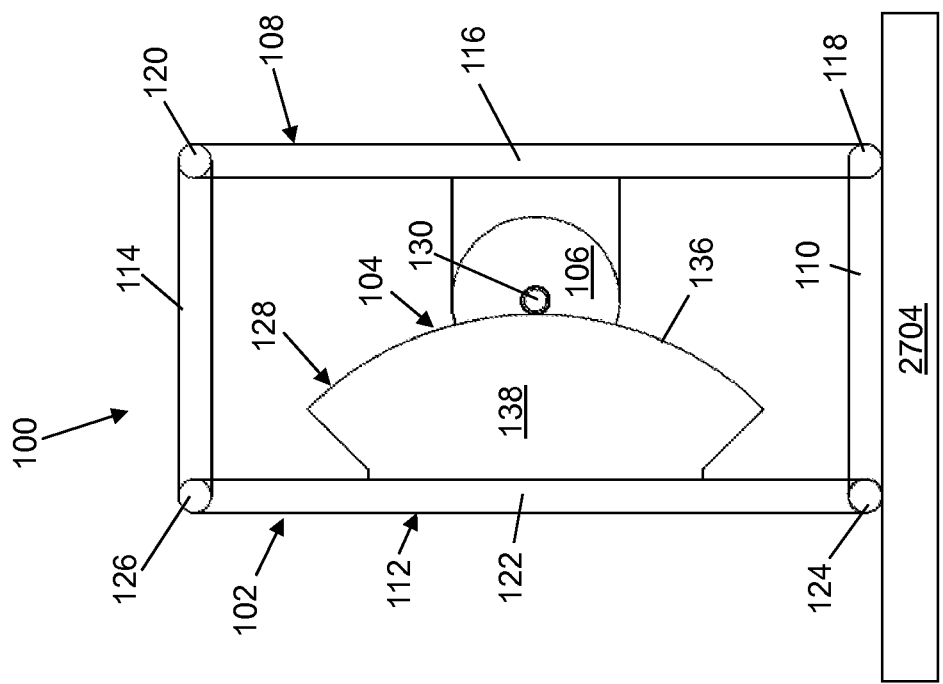
FIG. 28a depicts a front schematic diagram of the actuating device of FIG. 1 in a center position with a side link mounted to an external surface in accordance with an illustrative embodiment.

For further illustration, with reference to FIG. 28a, a front view of actuating device 100 is shown in accordance with an illustrative embodiment with first link 110 mounted to external surface 2704. Though first link 110 is mounted to external surface 2704, first link 110 remains mounted to third joint 124 to allow rotation of first link 110 relative to translating plate 122 at third joint 124. Second link 114, of course, also remains mounted to fourth joint 126 to allow rotation of second link 114 relative to translating plate 122 at fourth joint 126. With reference to FIG. 28b, actuating device 100 is shown in a first translated position. Actuator 106 rotates shaft 130 which in turn translates arc surface 136 of drive 128 along an arc. Thus, as shaft 130 rotates, the tangent of arc surface 136 nearest actuator 106 stays aligned with the direction of motion, allowing efficient use of the actuator torque and precision. Rotation of arc surface 136 of drive 128 results in translation of second link 114 while first link 110 remains fixed. Thus, in this illustrative embodiment, translating plate 122 rotates and second link 114 translates. However, it is translation of shaft 130 along arc surface 136 that is mounted to translating plate 122 that causes second link 114 to translate.

In the illustrative embodiment of FIGS. 28a and 28b, there is a 2:1 link length ratio between first link 110/second link 114 and base plate 116/translating plate 122 and a +/−45 degree range of motion though, of course, other ratios and ranges of motion may be used based on the intended usage of actuating device 100. Though having the same basic structure as that shown in FIG. 1, the mounting of actuating device 100 as shown in FIGS. 28a and 28b supports tailoring to different applications.

With reference to FIGS. 29a-29i, schematic diagrams of a plurality of combinations of the actuating devices of FIG. 1 arranged to control a position and an orientation of a tool within a workspace volume are provided. Generally, any workspace volume may be definable using combinations of a plurality of the actuating devices of FIG. 1, or any of the other illustrative embodiments described herein. The tool may be any device for cutting, drilling, milling, tapping, reaming, boring, engraving, welding, soldering, etching, carving, slicing, depositing, extruding, heating, cooling, grasping, pushing, squeezing, holding, probing, blowing, spraying, measuring, cleaning, polishing, painting, etc. The tool may also incorporate additional actuation devices or tool support mechanisms as described in this disclosure or as understood by a person of skill in the art. With reference to FIGS. 29j-29l, schematic diagrams of a plurality of combinations of the actuating devices of FIG. 1 arranged to provide locomotion are provided.

Figure 29B:
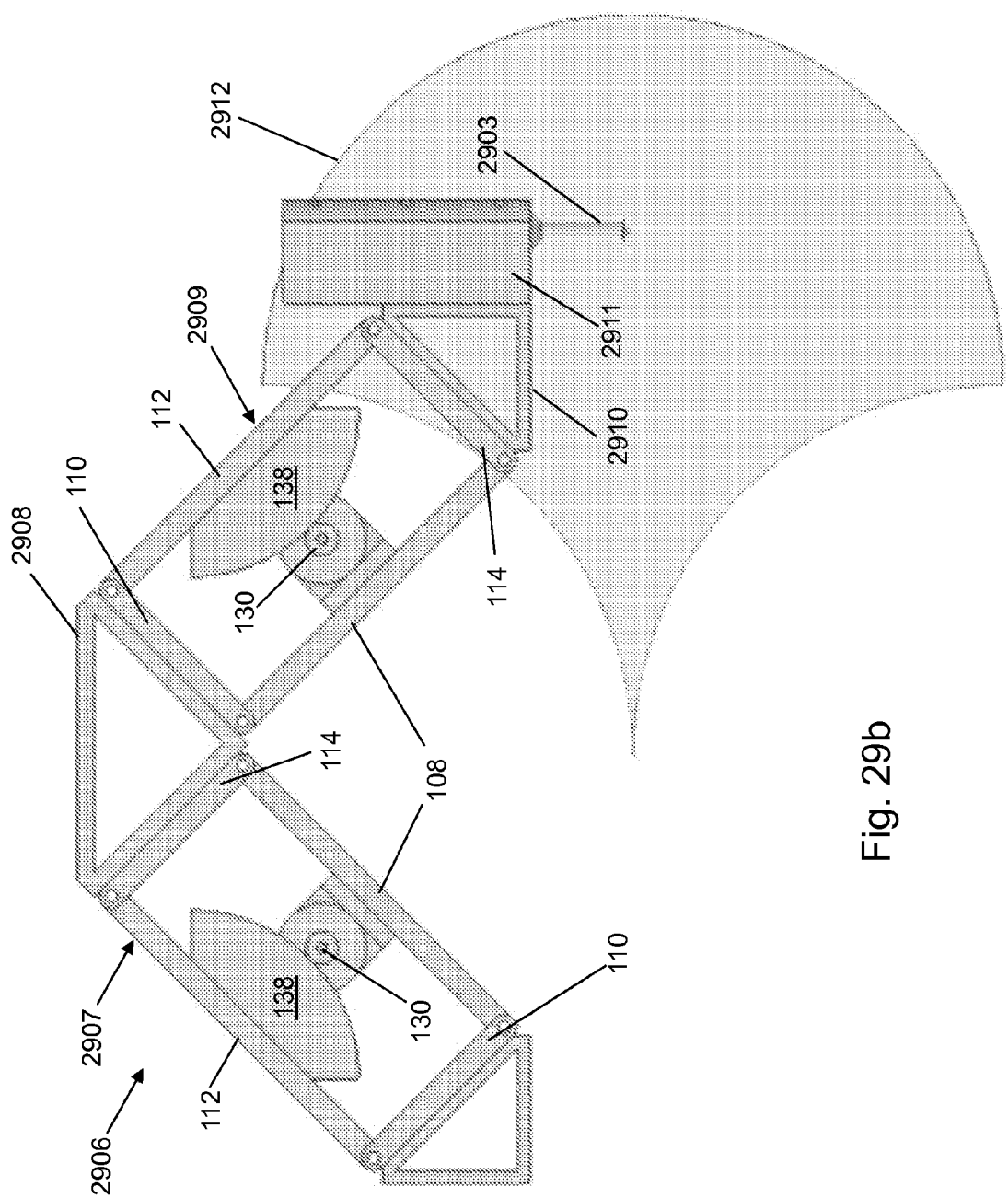

FIGS. 29a-29b show two-DoF devices constructed from two actuating devices of FIG. 1. FIGS. 29c-29g show three-DoF (3DoF) devices constructed from three actuating devices of FIG. 1. FIG. 29h shows a 3DoF device constructed from four actuating devices of FIG. 1. More than three actuating devices of FIG. 1 results in a redundant device, which adds cost and complexity. Nevertheless such arrangements may be useful for increasing the workspace volume or allowing a serial chain of actuating devices of FIG. 1 to maneuver around obstructions. FIG. 29i shows two actuating devices of FIG. 1 mounted on a rotary joint. FIG. 29j shows six actuating devices of FIG. 1 mounted to each other to maneuver as biped robot legs. FIG. 29k shows twelve actuating devices of FIG. 1 mounted to each other to maneuver as quadruped robot legs. FIG. 29l shows twelve actuating devices of FIG. 1 mounted to each other in series.

With reference to FIG. 29a, a first combined actuating device 2900 may include a first actuating device 2901 and a second actuating device 2902. Second link 114 of first actuating device 2901 mounts to second link 114 of second actuating device 2902. First actuating device 2901 and second actuating device 2902 are mounted to control the position and orientation of a tool 2903 within a first workspace volume 2904. Tool 2903 is mounted to first link 110 of second actuating device 2902. First workspace volume 2904 provides a square-shaped workspace in the plane defined by second link 114 of first actuating device 2901 and a relatively large deviation in the direction generally perpendicular to second link 114 of first actuating device 2901.

With reference to FIG. 29b, a second combined actuating device 2906 may include a first actuating device 2907, a first mounting device 2908, a second actuating device 2909, a second mounting device 2910, and a tool support device 2911. First mounting device 2908 and second mounting device 2910 form right triangles. Second link 114 of first actuating device 2907 mounts to a first leg of first mounting device 2908. First link 110 of second actuating device 2902 mounts to a second leg of first mounting device 2908. The hypotenuse leg of second mounting device 2910 mounts to second link 114 of second actuating device 2909. Tool support device 2911 mounts to a leg of second mounting device 2910. Tool 2903 extends from tool support device 2911. First actuating device 2907 and second actuating device 2909 are mounted to control the position and orientation of tool 2903 within a second workspace volume 2912. All motion of tool 2903 stays in one plane. First workspace volume 2904 and second workspace volume 2912 have the same area though different shapes. In alternative embodiment, first mounting device 2908 and second mounting device 2910 may be arranged to form a triangle that is not a right triangle.

Figure 29C:
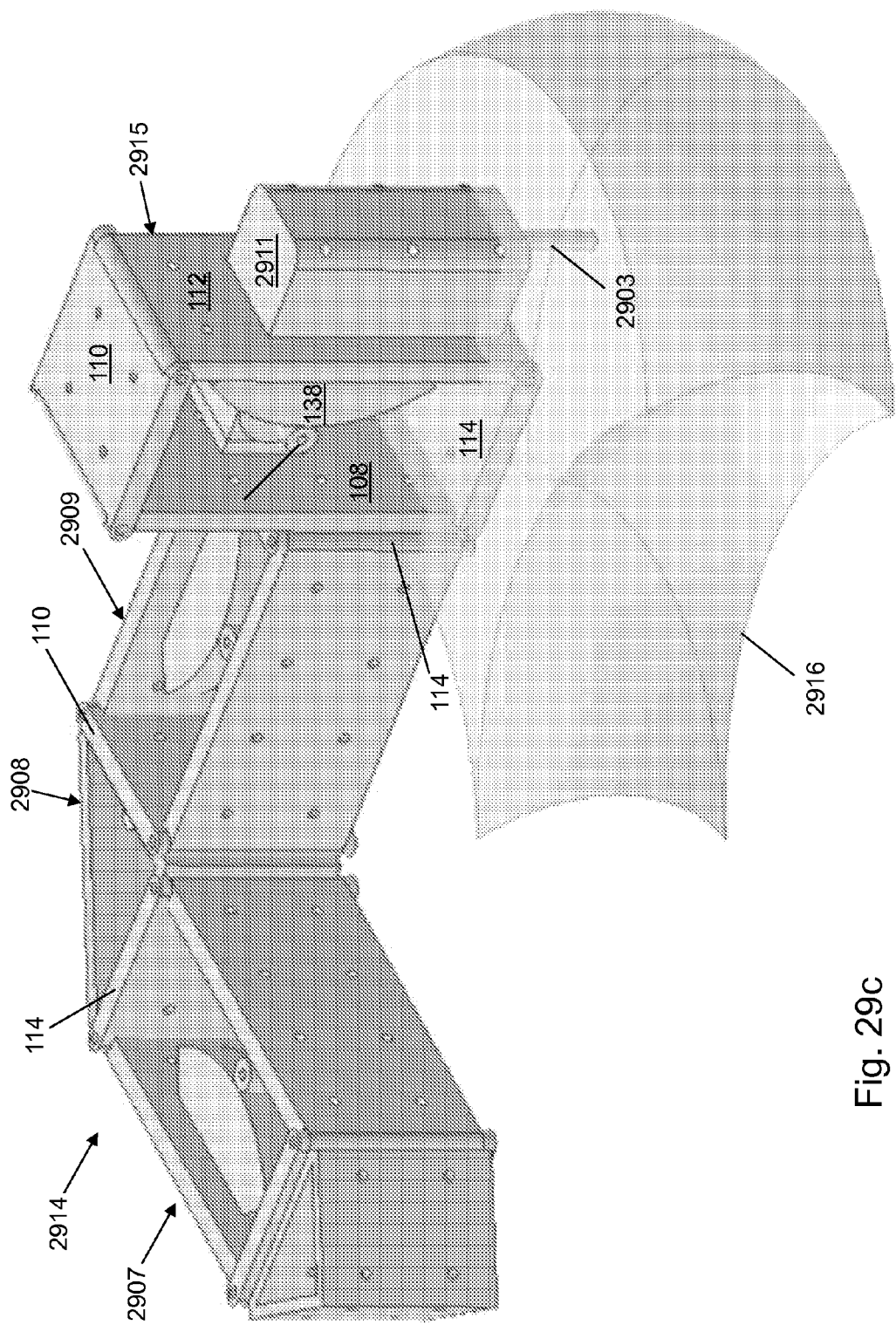

With reference to FIG. 29c, a third combined actuating device 2914 may include first actuating device 2907, first mounting device 2908, second actuating device 2909, a third actuating device 2915, and tool support device 2911. Second link 114 of first actuating device 2907 mounts to the first leg of first mounting device 2908. First link 110 of second actuating device 2909 mounts to the second leg of first mounting device 2908. Base link 108 of third actuating device 2915 mounts to second link 114 of second actuating device 2909.

Tool support device 2911 mounts to translating link 112 of third actuating device 2915. First actuating device 2907, second actuating device 2909, and third actuating device 2915 are mounted to control the position and orientation of tool 2903 within a third workspace volume 2916.

With reference to FIG. 29d, a fourth combined actuating device 2918 may include a first actuating device 2919, a second actuating device 2920, a first mounting device 2921, a third actuating device 2922, and tool support device 2911. First mounting device 2921 forms a right triangle. Second link 114 of first actuating device 2919 mounts to second link 114 of second actuating device 2920. First link 110 of second actuating device 2920 mounts to a first leg of first mounting device 2921. First link 110 of third actuating device 2922 mounts to a second leg of first mounting device 2921. Tool support device 2911 mounts to second link 114 of third actuating device 2922. First actuating device 2919, second actuating device 2920, and third actuating device 2922 are mounted to control the position and orientation of tool 2903 within a fourth workspace volume 2923.

Figure 29E:
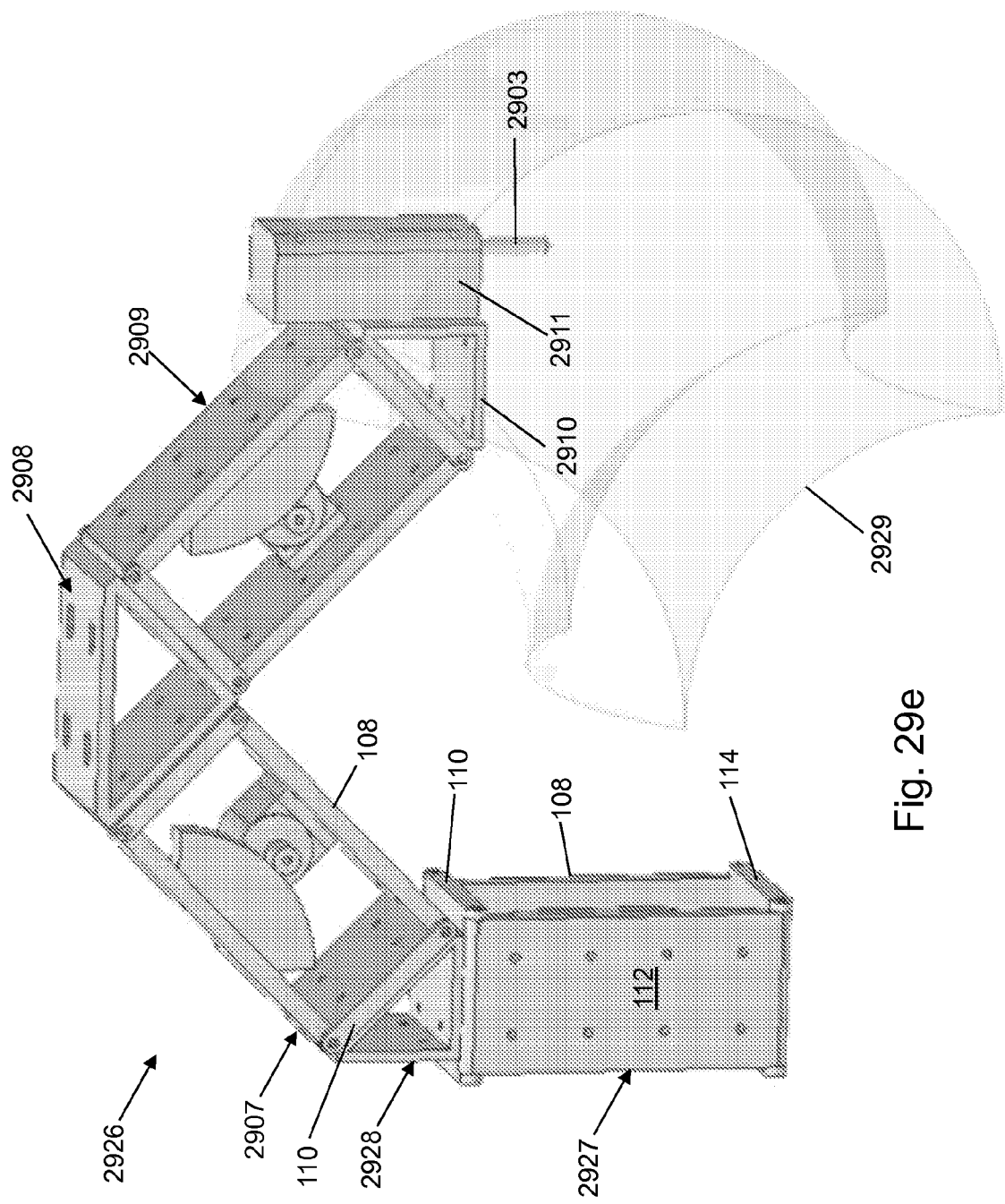

With reference to FIG. 29e, a fifth combined actuating device 2926 may include first actuating device 2907, first mounting device 2908, second actuating device 2909, second mounting device 2910, a third actuating device 2927, a third mounting device 2928, and tool support device 2911. Third mounting device 2928 forms a right triangle. First link 110 of third actuating device 2927 mounts to a first leg of third mounting device 2928. First link 110 of first actuating device 2907 mounts to the hypotenuse leg of third mounting device 2928. First actuating device 2907, second actuating device 2909, and third actuating device 2927 are mounted to control the position and orientation of tool 2903 within a fifth workspace volume 2929.

Figure 29F:
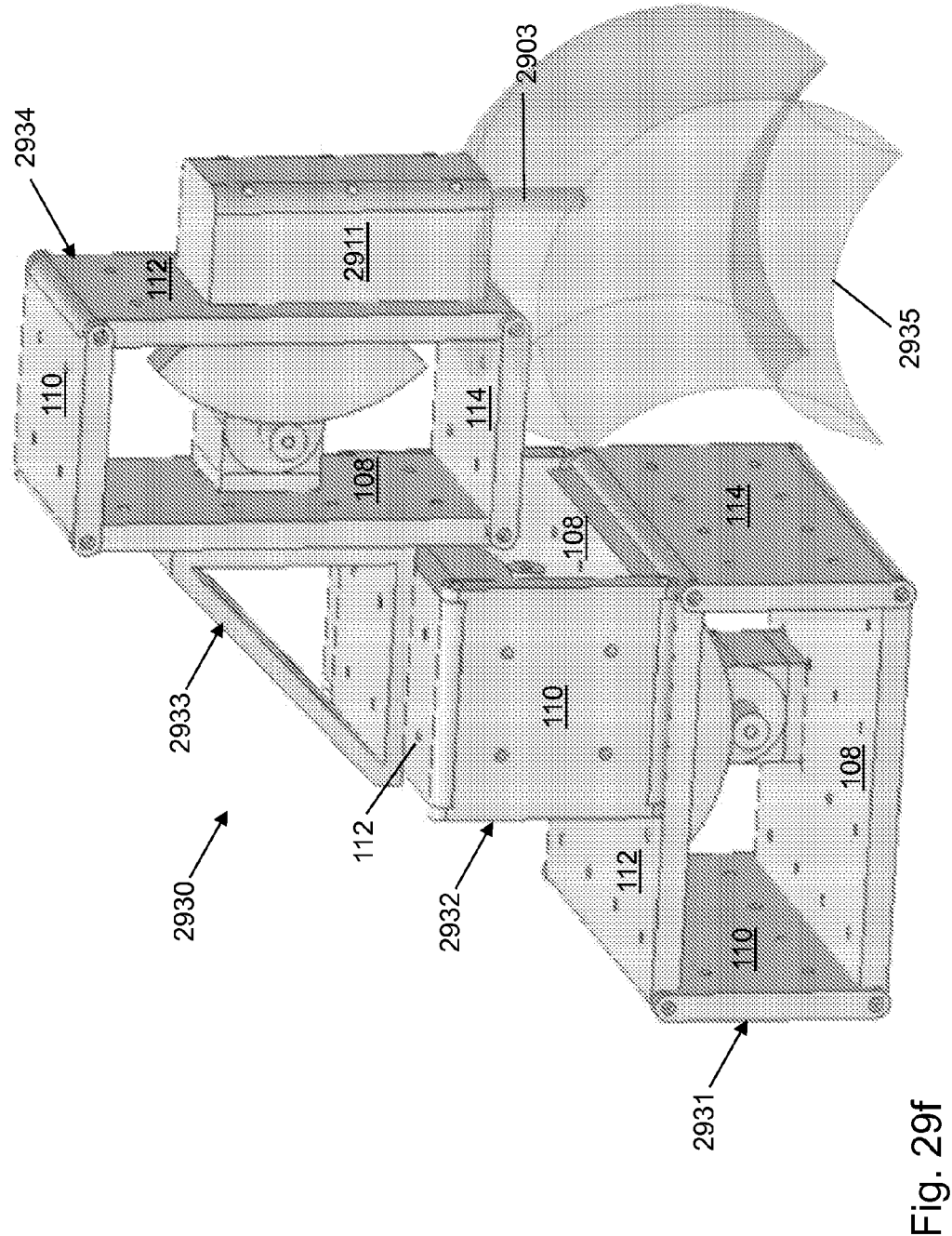

With reference to FIG. 29f, a sixth combined actuating device 2930 may include a first actuating device 2931, a second actuating device 2932, a first mounting device 2933, a third actuating device 2934, and tool support device 2911. First mounting device 2933 forms a right triangle. Translating link 112 of first actuating device 2931 mounts to base link 108 of second actuating device 2932. Translating link 112 of second actuating device 2932 mounts to a first leg of first mounting device 2933. Base link 108 of third actuating device 2934 mounts to a second leg of first mounting device 2933. Tool support device 2911 mounts to translating link 112 of third actuating device 2934. First actuating device 2931, second actuating device 2932, and third actuating device 2934 are mounted to control the position and orientation of tool 2903 within a sixth workspace volume 2935.

Figure 29G:
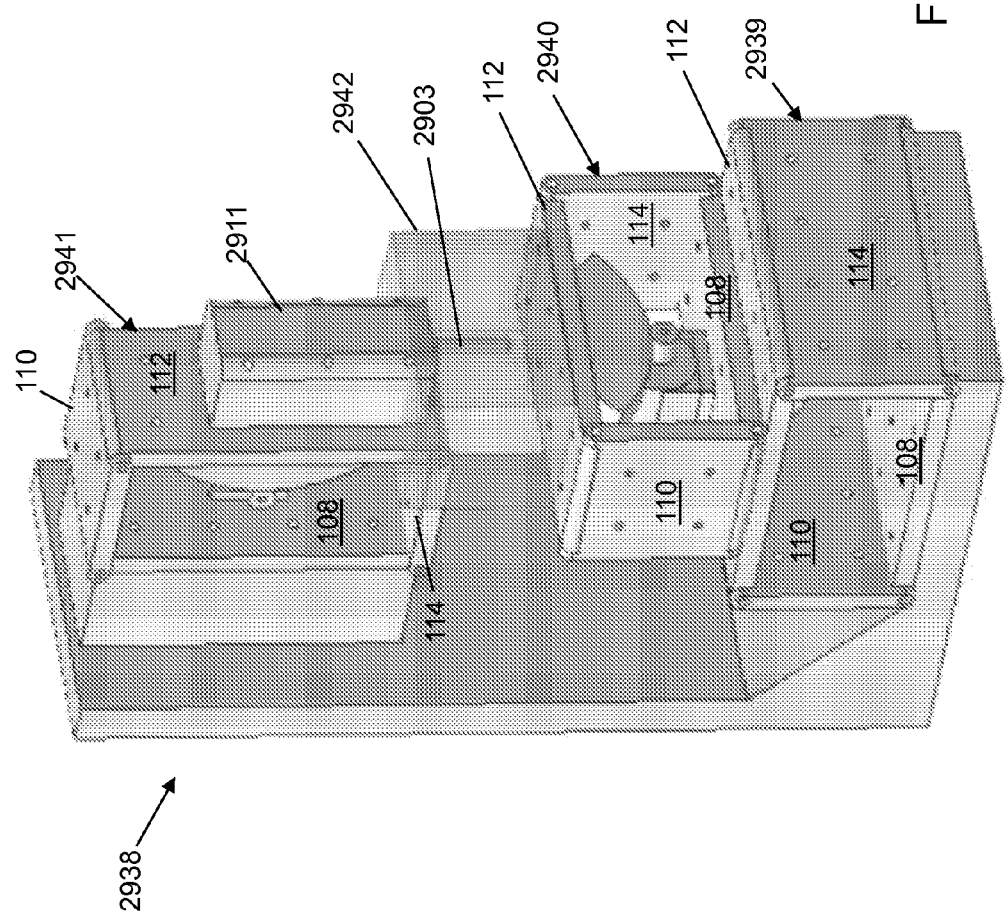
Figure 29H:
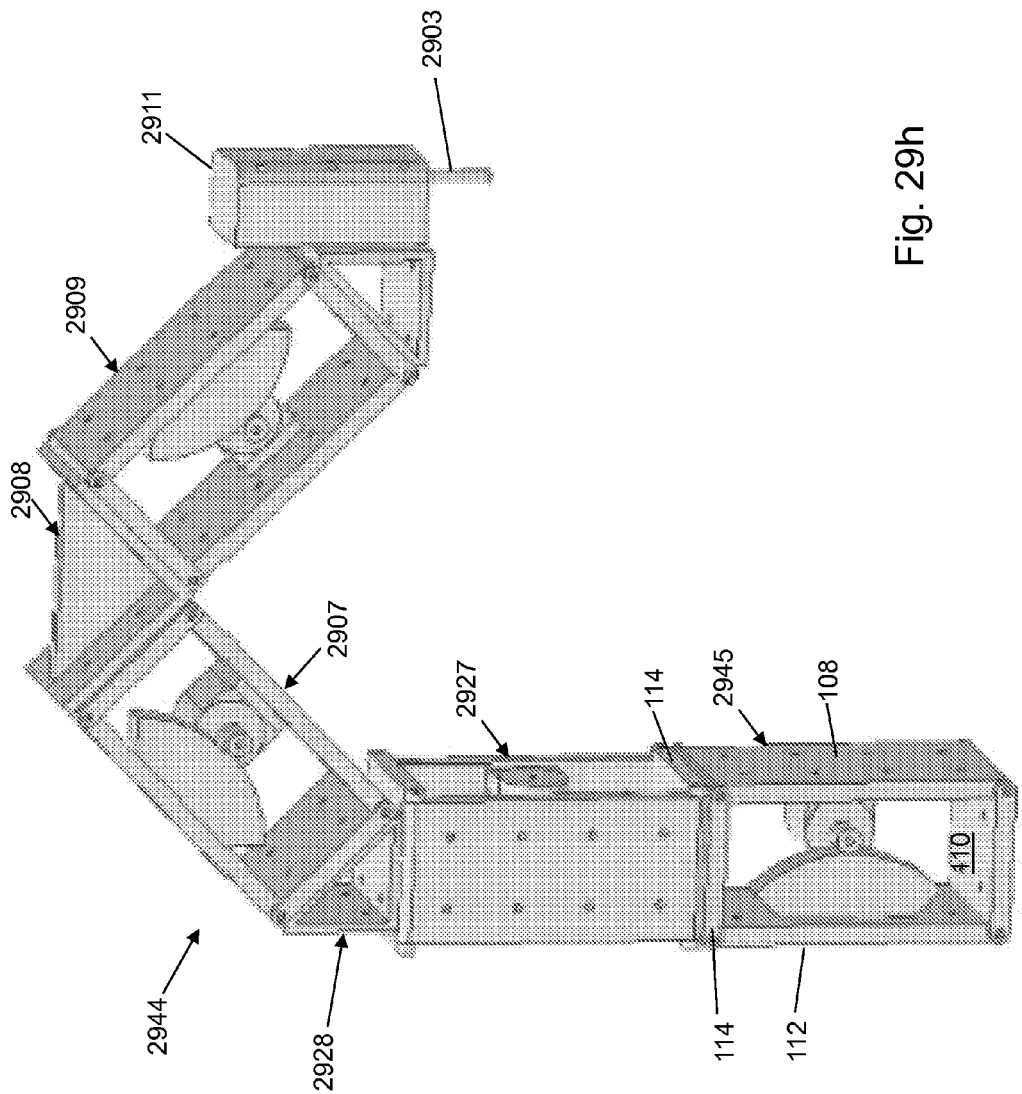
Figure 29I:
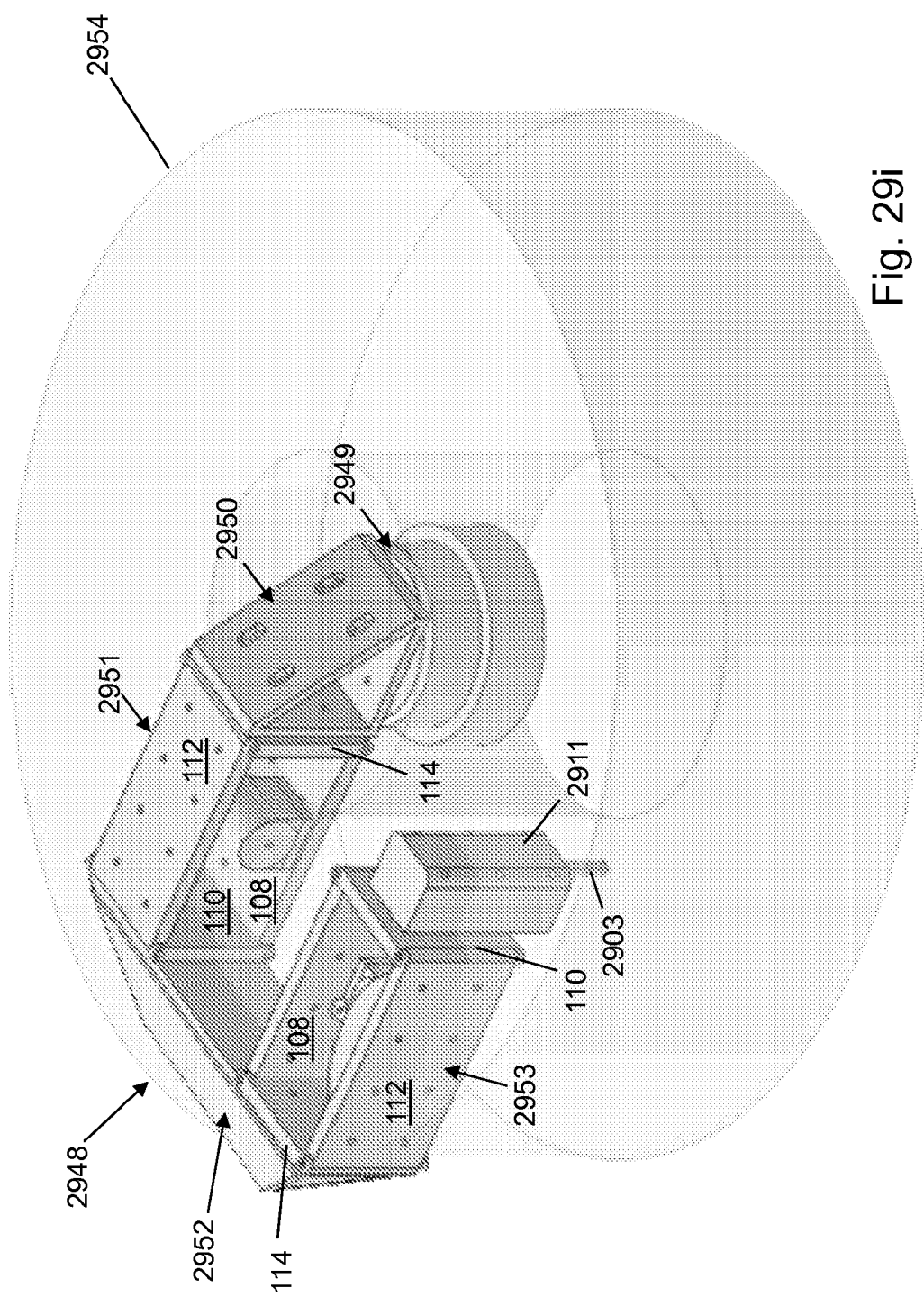
Figure 29J:
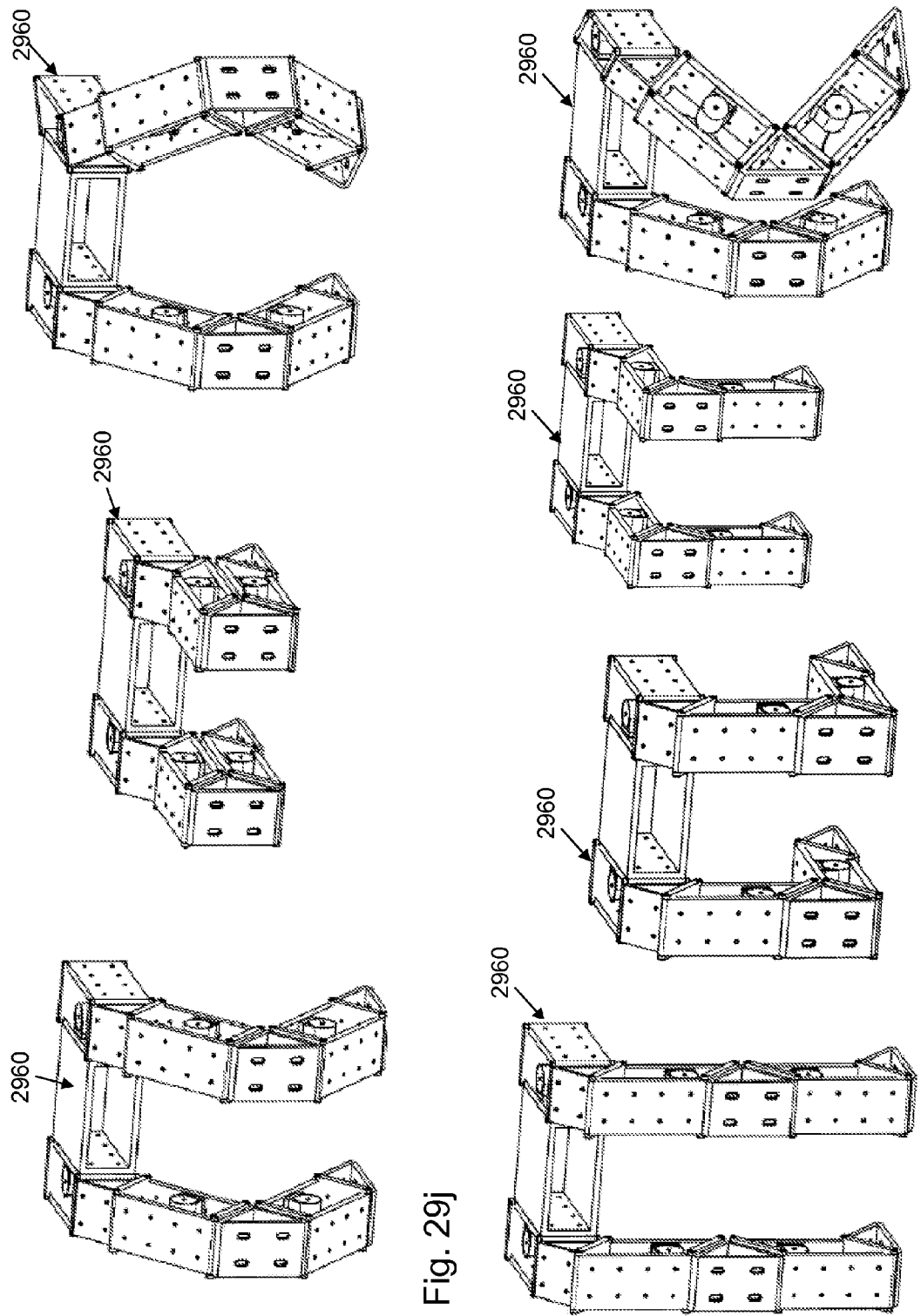
Figure 29K:
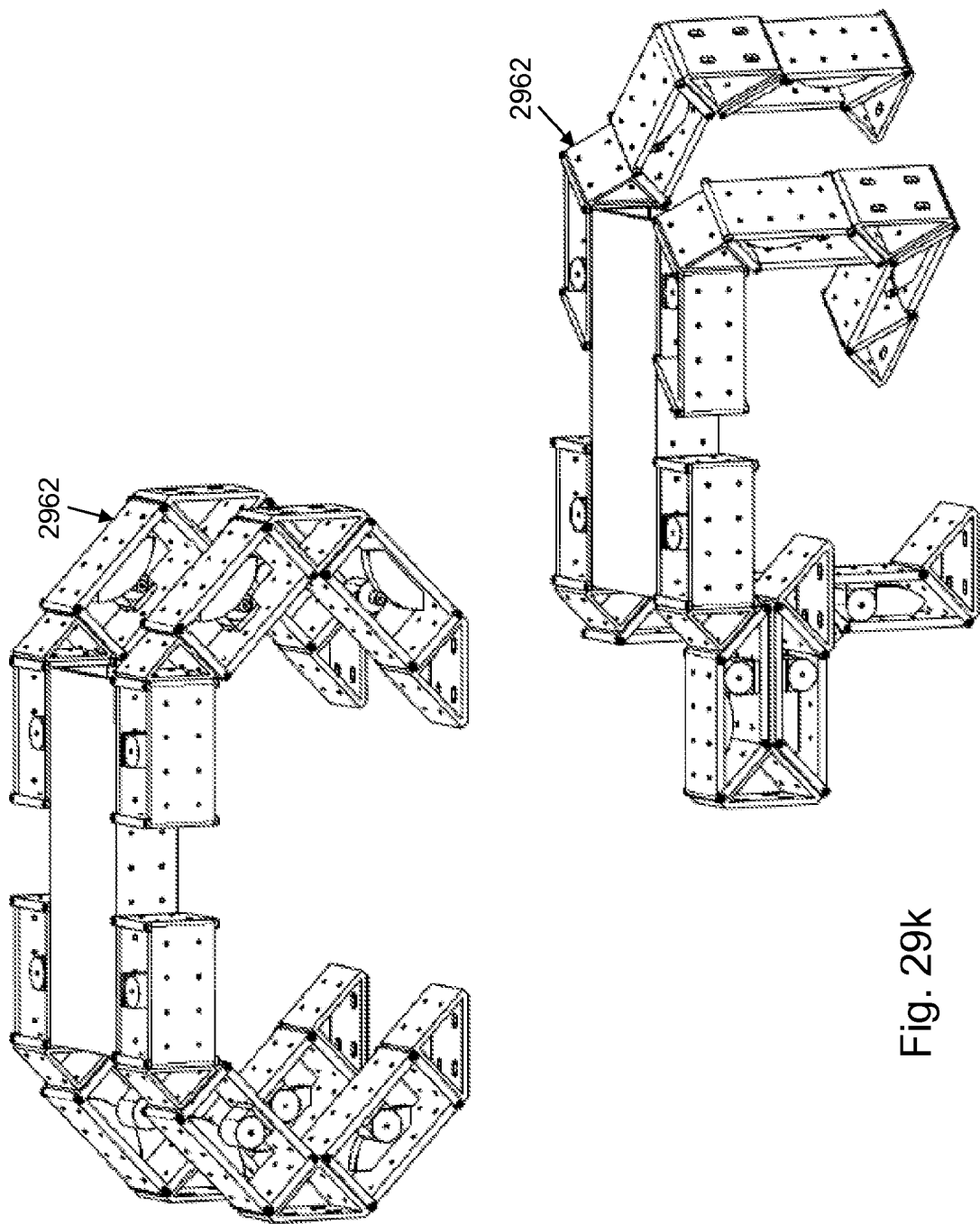
Figure 29I:
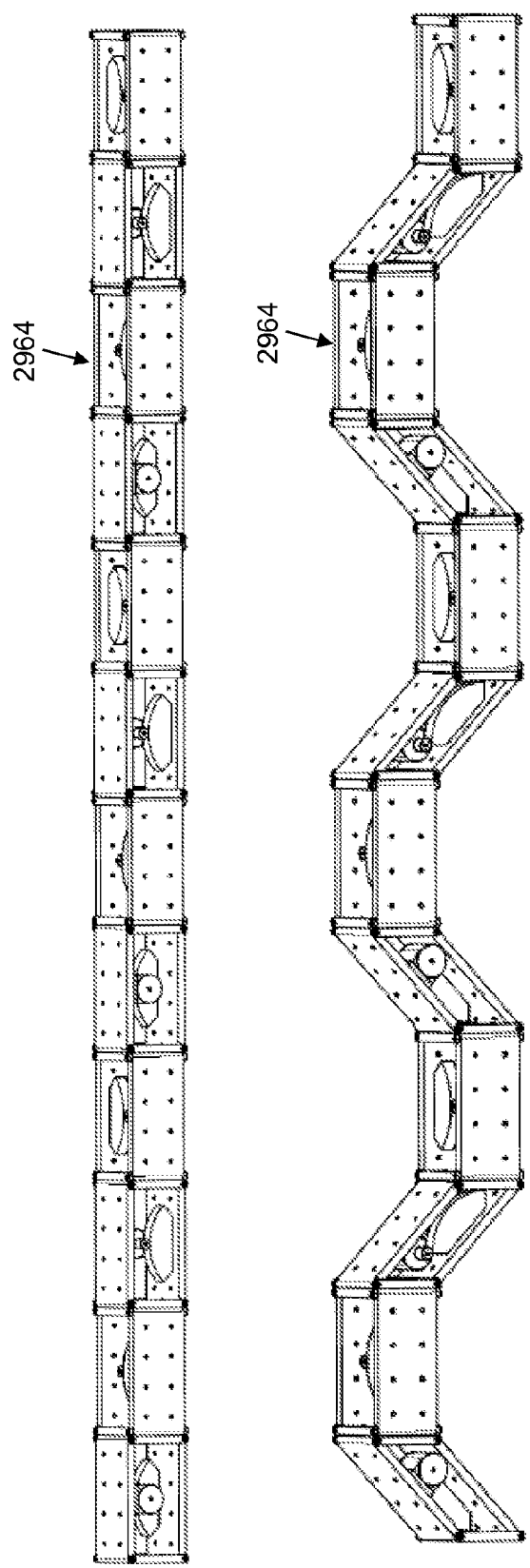

With reference to FIG. 29g, a seventh combined actuating device 2938 may include a first actuating device 2939, a second actuating device 2940, a third actuating device 2941, and tool support device 2911. Translating link 112 of first actuating device 2939 mounts to base link 108 of second actuating device 2940. Tool support device 2911 mounts to translating link 112 of third actuating device 2941. First actuating device 2939, second actuating device 2940, and third actuating device 2941 are mounted to control the position and orientation of tool 2903 within a seventh workspace volume 2942 that moves with translating link 112 of second actuating device 2940. Thus, seventh workspace volume 2942 moves in space with translating link 112 of second actuating device 2940. In an alternative embodiment, third actuating device 2941 may be replaced by a linear actuator of conventional design, for example, a linear motion bearing driven by a ball screw. This alternative embodiment may be useful for cases where the vertical motion of tool 2903 must be precisely linear, for example, for boring or reaming operations.

With reference to FIG. 29h, an eighth combined actuating device 2944 may include first actuating device 2907, first mounting device 2908, second actuating device 2909, second mounting device 2910, third actuating device 2927, third mounting device 2928, a fourth actuating device 2945, and tool support device 2911. Second link 114 of fourth actuating device 2945 mounts to second link 114 of third actuating device 2927. First actuating device 2907, second actuating device 2909, third actuating device 2927, and fourth actuating device 2945 are mounted to control the position and orientation of tool 2903.

With reference to FIG. 29i, a ninth combined actuating device 2948 may include a rotary joint 2949, a first mounting device 2950, a first actuating device 2951, a second mounting device 2952, a second actuating device 2953, and tool support device 2911. First mounting device 2950 forms a right triangle. A first leg of first mounting device 2950 mounts to rotary joint 2949. Second link 114 of first actuating device 2951 mounts to a second leg of first mounting device 2950. First link 110 of first actuating device 2951 mounts to a first end of a planar surface of second mounting device 2952. Second link 114 of second actuating device 2953 mounts to a second end of the planar surface of second mounting device 2952. Tool support device 2911 mounts to first link 110 of second actuating device 2953. Rotary joint 2949, first actuating device 2951, and second actuating device 2953 are mounted to control the position and orientation of tool 2903 within a ninth workspace volume 2954.

With reference to FIG. 29j, a tenth combined actuating device 2960 is shown comprised of two serial arrangements of three actuating devices connected to form a biped leg pair. In a clockwise direction starting at the top left, tenth combined actuating device 2960 is shown in a neutral position, in a fully flexed position, with a right leg externally rotated, with the right leg internally rotated, in a sitting position, in a kneeled position, and in a fully extended position. Tenth combined actuating device 2960 includes a "foot" that remains parallel to the "body" without requiring a separate ankle joint, which is useful when tenth combined actuating device 2960 moves over fairly flat terrain. Such an arrangement minimizes excess motion of the body of tenth combined actuating device 2960.

With reference to FIG. 29k, an eleventh combined actuating device 2962 is shown comprised of four serial arrangements of three actuating devices connected to form a quadruped. The top figure shows eleventh combined actuating device 2962 in a neutral position. The bottom figure shows eleventh combined actuating device 2962 with each serial arrangement of three actuating devices positioned differently: 1) partially seated, 2) partially kneeled, 3) partially fully flexed, and 4) partially fully extended.

With reference to FIG. 29l, a twelfth combined actuating device 2964 is shown comprised of a serial arrangement of twelve actuating devices connected to form a "snake". The top figure shows twelfth combined actuating device 2964 in a fully extended position. The bottom figure shows twelfth combined actuating device 2964 in a horizontal wave position. Alternative embodiments may include fewer or additional actuating devices to provide the desired device size and workspace.

In alternative embodiments, the mounting devices may be L-shaped brackets instead of triangles and may incorporate gusset plates for improved rigidity.

Control electronics, computing, and a power source may each be supplied remotely or may be integrated into any of the actuating devices described. For example, a printed circuit board with a microcontroller, motor drivers, power conditioning, and appropriate input/output connections may be mounted to the base link of the actuating device. A battery suitable for providing power for the actuation devices, the microcontroller, and the sensor may also be mounted on the base link of the actuating device. A bus with only a few wires (e.g. i2c, SPI, CAN bus, etc.) or wireless communications (e.g. Wi-Fi, ZigBee, Bluetooth, Wireless USB, etc.) may be used for communications between multiple actuating devices to provide for coordinated motion.

Optional covers may be used to provide a cleaner appearance and help shield the actuating device from liquids, dust, or other environmental problems that may interfere with the proper functioning of the actuating device. Thin injection molded or thermoformed plastic covers may be attached to one or more links of the 4-bar linkage, covering the otherwise open areas on the front and back of the actuating device and near the joints. Seals made of rubber, silicone, or other material, can be attached to the inside surfaces of the covers to provide additional environmental protection, although with added friction.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An actuating device comprising:
a first actuating device comprising
a first base link comprising a first base plate, a first joint, and a second joint, wherein the first base plate extends between the first joint and the second joint;
a first link mounted to the first joint to allow rotation of the first link relative to the first base plate at the first joint;
a second link mounted to the second joint to allow rotation of the second link relative to the first base plate at the second joint;
a first translating link comprising a first translating plate, a third joint, and a fourth joint, wherein the first translating plate extends between the third joint and the fourth joint, further wherein the first link is mounted to the third joint to allow rotation of the first link relative to the first translating plate at the third joint, and further wherein the second link is mounted to the fourth joint to allow rotation of the second link relative to the first translating plate at the fourth joint;
a first shaft configured to mount to a first actuator such that the first actuator causes rotation of the first shaft, wherein, when operating the first actuating device, a position of the first shaft is fixed relative to the first base plate; and a first drive comprising a first arc surface, wherein the first drive is mounted to the first translating link such that, when operating the first actuating device, a position of the first arc surface is fixed relative to the first translating plate, and further wherein the first shaft is mounted to the first arc surface to cause translation of the first translating link relative to the first base link as the first shaft rotates; and
a second actuating device comprising
a second base link comprising a second base plate, a fifth joint, and a sixth joint, wherein the second base plate extends between the fifth joint and the sixth joint;
a third link mounted to the fifth joint to allow rotation of the third link relative to the second base plate at the fifth joint;
a fourth link mounted to the sixth joint to allow rotation of the fourth link relative to the second base plate at the sixth joint;
a second translating link comprising a second translating plate, a seventh joint, and an eighth joint, wherein the second translating plate extends between the seventh joint and the eighth joint, further wherein the third link is mounted to the seventh joint to allow rotation of the third link relative to the second translating plate at the seventh joint, and further wherein the fourth link is mounted to the eighth joint to allow rotation of the fourth link relative to the second translating plate at the eighth joint;
a second shaft configured to mount to a second actuator such that the second actuator causes rotation of the second shaft, wherein, when operating the second actuating device, a position of the second shaft is fixed relative to the second base plate; and
a second drive comprising a second arc surface, wherein the second drive is mounted to the second translating link such that, when operating the second actuating device, a position of the second arc surface is fixed relative to the second translating plate, and further wherein the second shaft is mounted to the second arc surface to cause translation of the second translating link relative to the second base link as the second shaft rotates;
wherein the second actuating device is mounted to the first actuating device.

2. The actuating device of claim 1, wherein the first link is mounted to the third link.

3. The actuating device of claim 1, wherein the first base link is mounted to the second base link.

4. The actuating device of claim 1, wherein the first base link is mounted to the third link.

5. The actuating device of claim 1, wherein the first base link is mounted to the second translating link.

6. The actuating device of claim 1, wherein the first translating link is mounted to the third link.

7. The actuating device of claim 1, wherein the first translating link is mounted to the second translating link.

8. The actuating device of claim 1, further comprising a tool mounted to a tool support device, wherein the tool support device is mounted to the second actuating device.

9. The actuating device of claim 8, wherein the tool support device is mounted to the third link.

10. The actuating device of claim 8, wherein the tool support device is mounted to the second base link.

11. The actuating device of claim 8, wherein the tool support device is mounted to the second translating link.

12. The actuating device of claim 1, further comprising a tool mounted to a tool support device and a mounting support device, wherein the mounting support device comprises a first leg and a second leg mounted to the first leg at an angle, wherein the second leg is mounted to the second actuating device, and the tool support device is mounted to the first leg.

13. The actuating device of claim 12, wherein the mounting support device is mounted to the third link.

14. The actuating device of claim 12, wherein the mounting support device is mounted to the second base link.

15. The actuating device of claim 12, wherein the mounting support device is mounted to the second translating link.

16. The actuating device of claim 1, further comprising a mounting support device, wherein the mounting support device comprises a first leg and a second leg mounted to the first leg at an angle, wherein the first actuating device is mounted to the first leg, and the second actuating device is mounted to the second leg.

17. The actuating device of claim 1, further comprising:
a sensor mounted to the first base link; and
a sensor target mounted to the first translating link, wherein the sensor target includes encoding and the sensor is configured to detect the encoding.

18. The actuating device of claim 17, wherein the first drive further includes a surface that extends from an edge of the arc surface towards the first translating plate, wherein the sensor target is mounted on the surface.

19. The actuating device of claim 18, wherein the sensor target is shaped to form an arc of a circle having a radius equal to a length of the first link between the first joint and the third joint.

20. The actuating device of claim 17, wherein the sensor target is mounted to the arc surface.

\* \* \* \* \*